(12) United States Patent
Penfold

(10) Patent No.: US 10,348,874 B2
(45) Date of Patent: *Jul. 9, 2019

(54) SYSTEM AND METHOD FOR IMPROVING A PHOTOGRAPHIC CAMERA FEATURE ON A PORTABLE ELECTRONIC DEVICE

(71) Applicant: Conor Penfold, Somis, CA (US)

(72) Inventor: Conor Penfold, Somis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,051

(22) Filed: Apr. 9, 2018

(65) Prior Publication Data

US 2018/0338022 A1  Nov. 22, 2018

Related U.S. Application Data

(63) Continuation of application No. 15/600,150, filed on May 19, 2017, now Pat. No. 10,015,295.

(51) Int. Cl.

| | |
|---|---|
| *H04M 1/02* | (2006.01) |
| *H04N 5/225* | (2006.01) |
| *H04N 5/232* | (2006.01) |
| *H04M 1/72* | (2006.01) |
| *H04M 1/725* | (2006.01) |
| *G03B 17/56* | (2006.01) |
| *G03B 3/10* | (2006.01) |
| *A45C 11/00* | (2006.01) |
| *G03B 17/38* | (2006.01) |

(52) U.S. Cl.
CPC ............ *H04M 1/0264* (2013.01); *G03B 3/10* (2013.01); *G03B 17/561* (2013.01); *G03B 17/565* (2013.01); *H04M 1/7253* (2013.01); *H04N 5/2254* (2013.01); *H04N 5/2257* (2013.01); *H04N 5/23212* (2013.01); *H04N 5/23222* (2013.01); *A45C 2011/002* (2013.01); *G03B 17/38* (2013.01); *G03B 2215/056* (2013.01)

(58) Field of Classification Search
None
See application file for complete search history.

(56) References Cited

U.S. PATENT DOCUMENTS

| | | | | |
|---|---|---|---|---|
| 10,015,295 | B1* | 7/2018 | Penfold | ............... H04M 1/0264 |
| 2012/0062691 | A1* | 3/2012 | Fowler | .................. F16M 11/10 |
| | | | | 348/36 |
| 2012/0120267 | A1* | 5/2012 | Kuroda | .................. F16M 11/10 |
| | | | | 348/211.9 |

(Continued)

*Primary Examiner* — William B Perkey
(74) *Attorney, Agent, or Firm* — Fitzsimmons IP Law

(57) ABSTRACT

A system and method is provided for affixing a first mobile device (e.g., a smartphone, etc.) having a camera feature to a stand (e.g., a tripod) having a motor, where a second mobile device (e.g., a tablet, etc.) is used to control at least the motor, thereby adjusting the first mobile device in relation to the stand. In another embodiment, the second mobile device is further used to control other features, such as shutter, flash, focus, etc. In a first embodiment, this is accomplished via a single wireless communication channel between the second mobile device and either the first mobile device or the stand and a second (e.g., wired or wireless) communication channel between the first mobile device and the stand. In a second embodiment, this is accomplished via a plurality of wireless communication channels between the second wireless device and the first mobile device and/or the stand.

20 Claims, 40 Drawing Sheets

(56) References Cited

U.S. PATENT DOCUMENTS

| | | | | |
|---|---|---|---|---|
| 2012/0195585 A1* | 8/2012 | Wagner | ............... | F16M 11/041 |
| | | | | 396/428 |
| 2013/0229569 A1* | 9/2013 | Bevirt | ................... | F16M 11/12 |
| | | | | 348/373 |
| 2013/0343743 A1* | 12/2013 | Yen | ....................... | F16M 11/10 |
| | | | | 396/428 |
| 2016/0202598 A1* | 7/2016 | Griffey | ............... | G03B 17/561 |
| | | | | 396/58 |
| 2016/0269648 A1* | 9/2016 | Hayashi | ............ | H04N 5/23203 |
| 2017/0330346 A1* | 11/2017 | Oshima | .................. | G03B 17/00 |
| 2018/0035056 A1* | 2/2018 | Jindal | ............... | H04N 5/23293 |
| 2018/0335684 A1* | 11/2018 | Strauser | .............. | G03B 17/561 |

\* cited by examiner

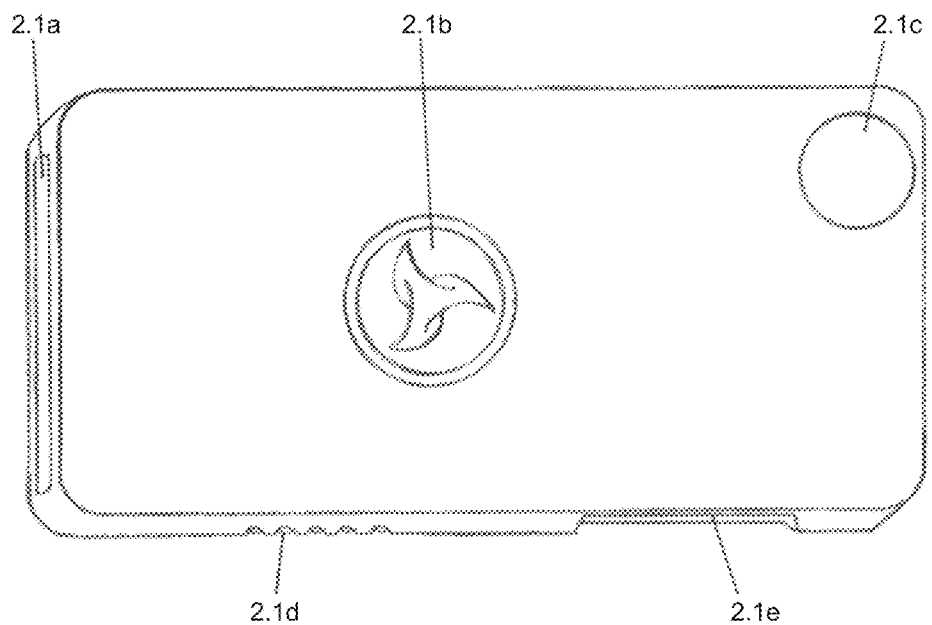
Figure 2.1
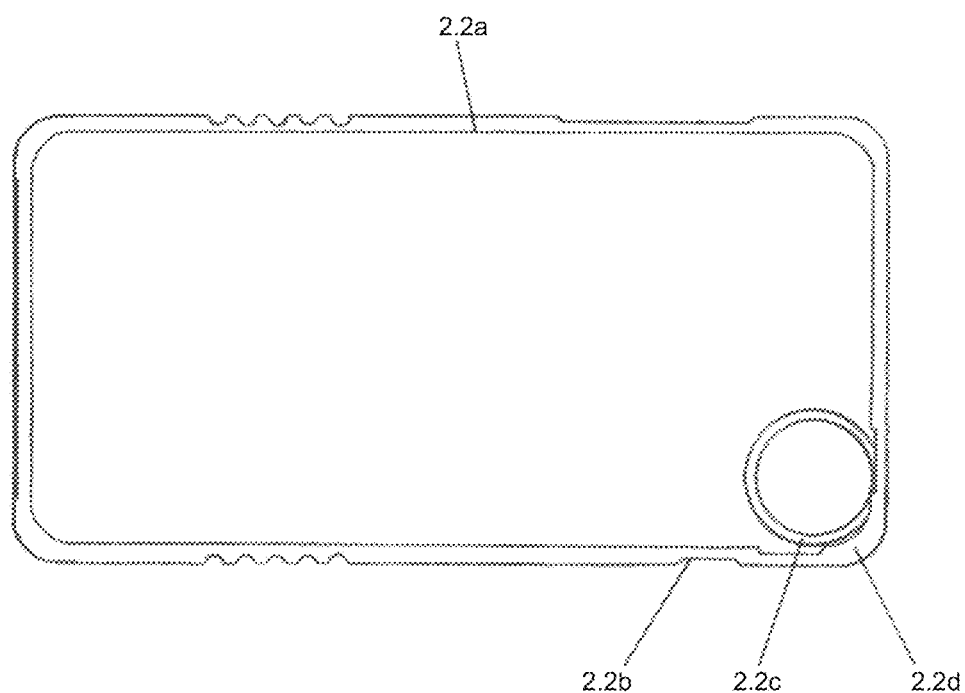
Figure 2.2

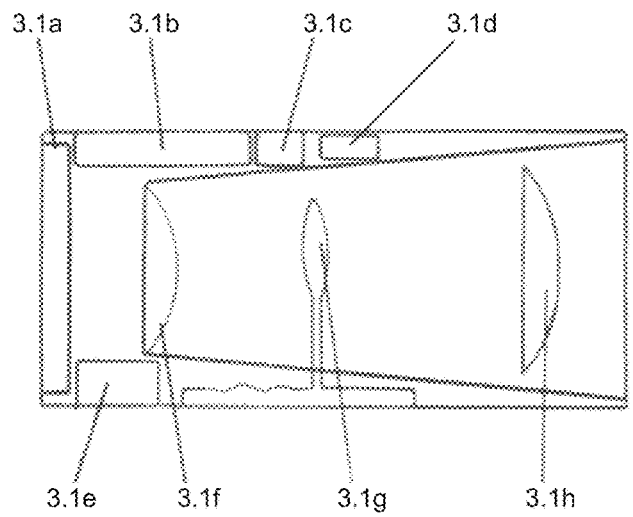
Figure 3.1
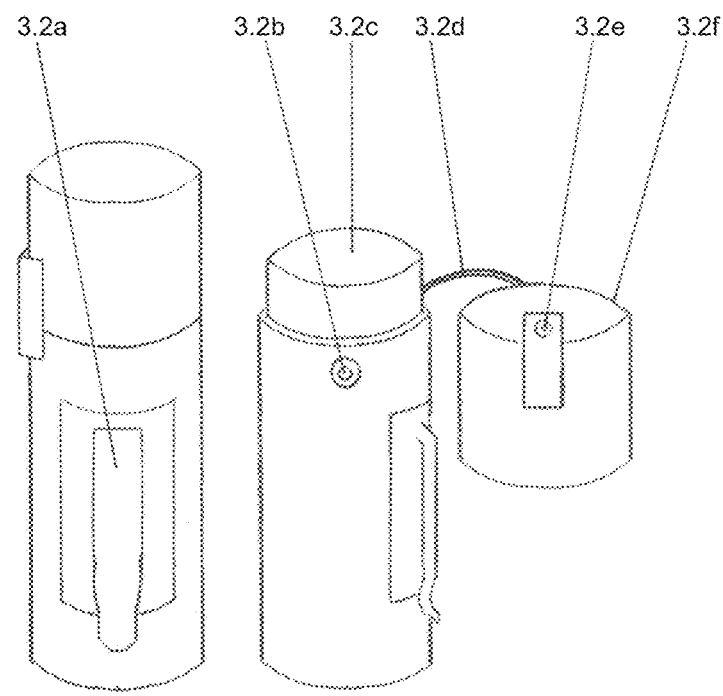
Figure 3.2

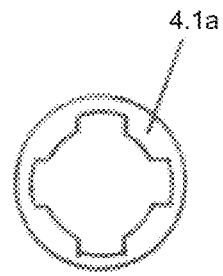
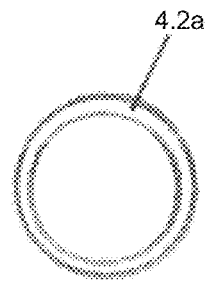
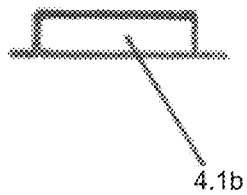
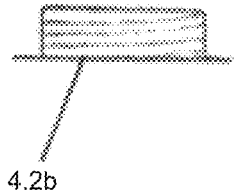
Figure 4.1               Figure 4.2
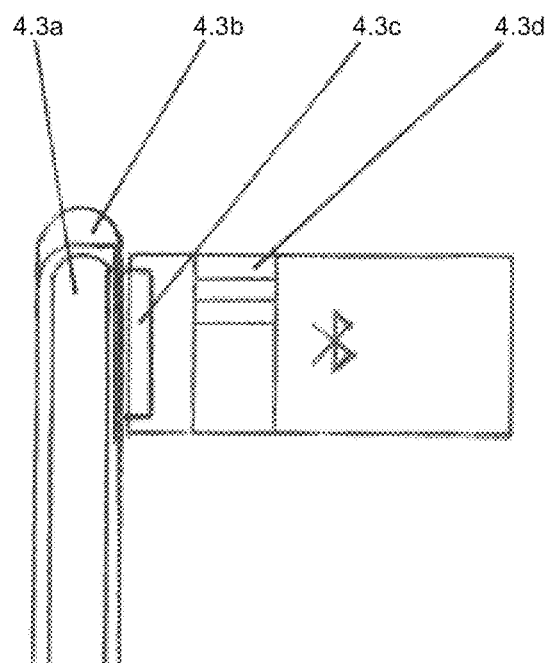
Figure 4.3

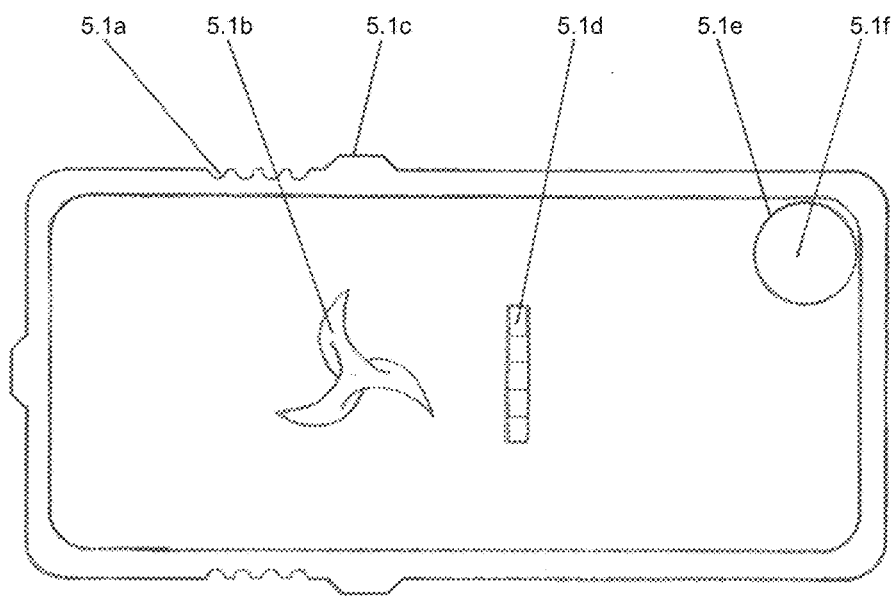
Figure 5.1
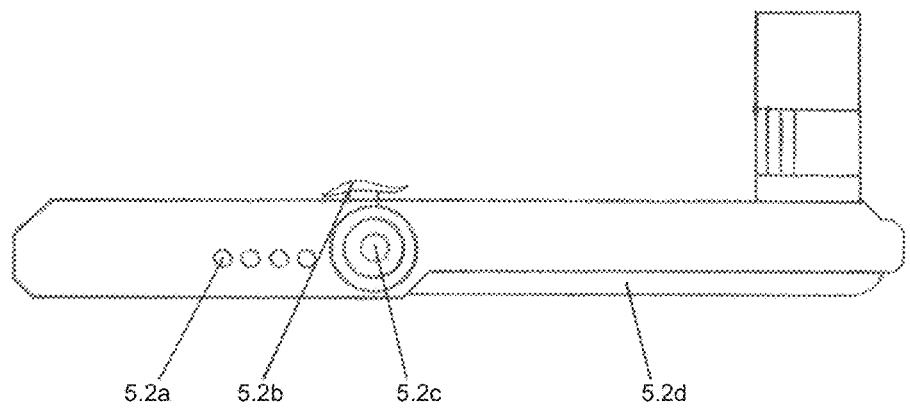
Figure 5.2

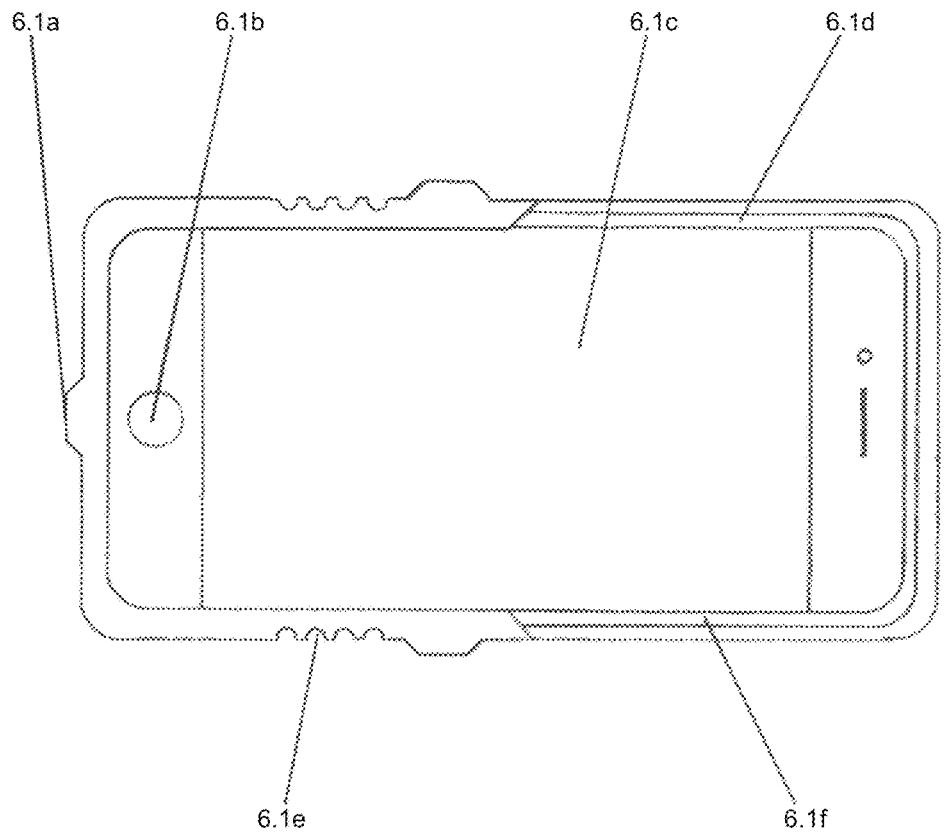
Figure 6.1
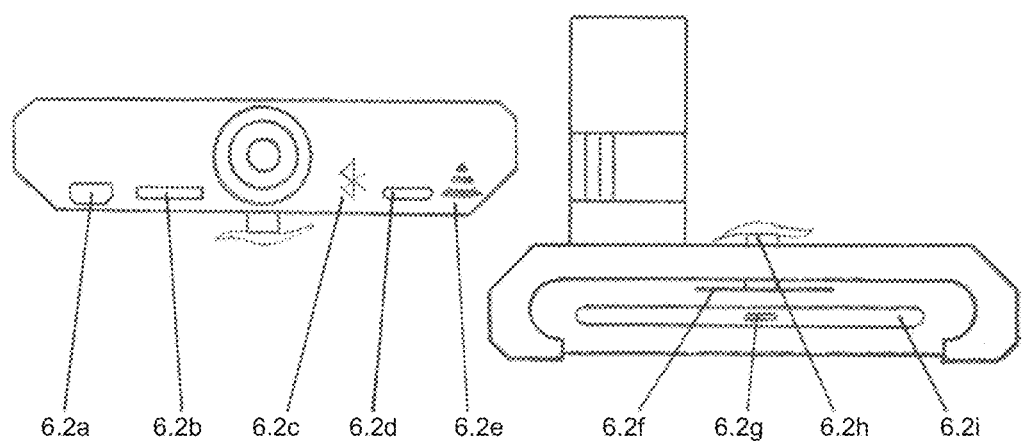
Figure 6.2

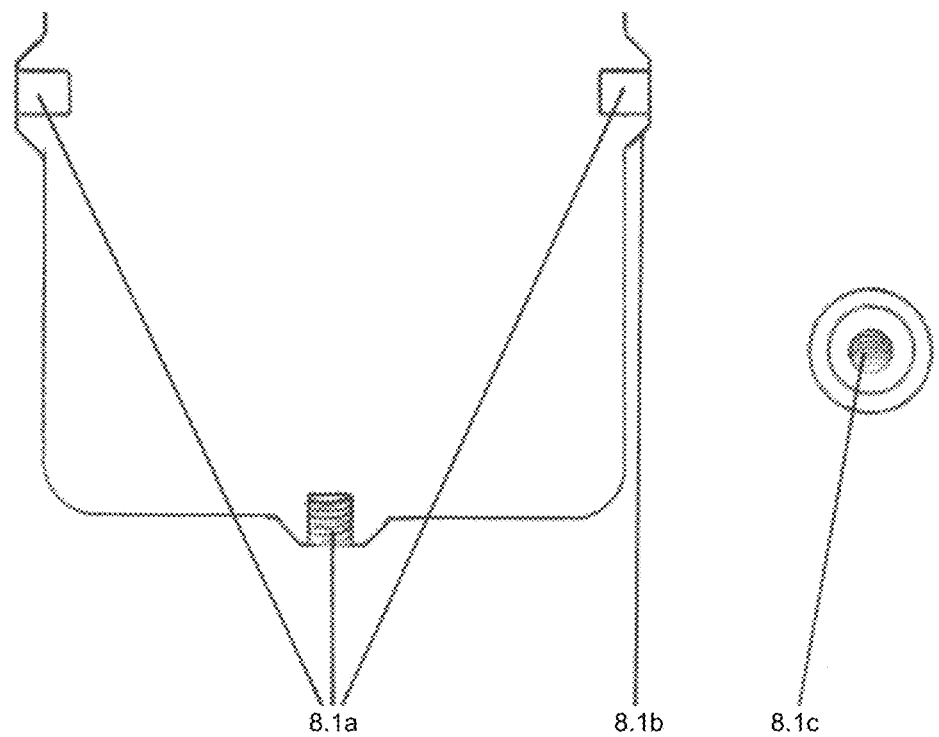
Figure 8.1
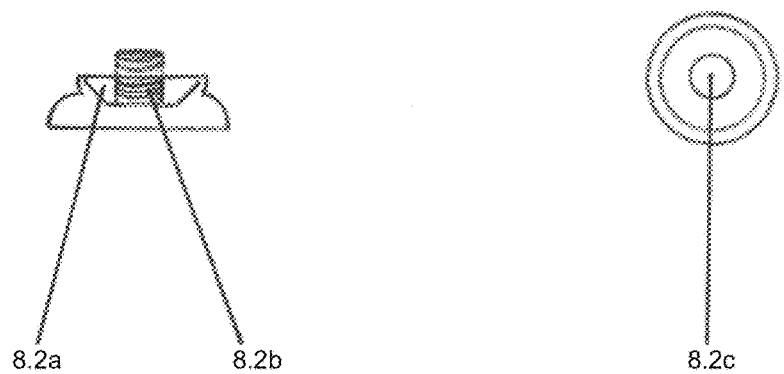
Figure 8.2

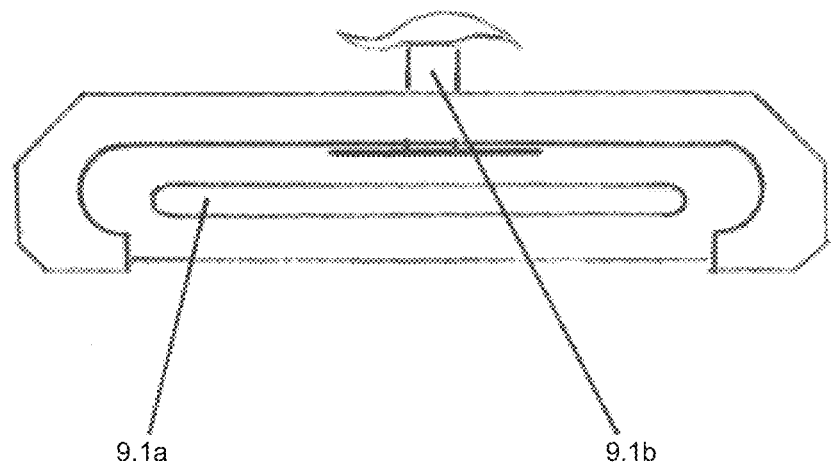
Figure 9.1
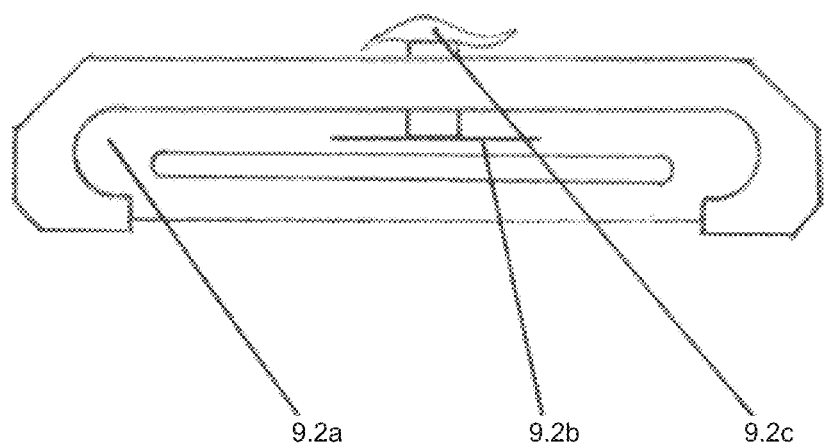
Figure 9.2

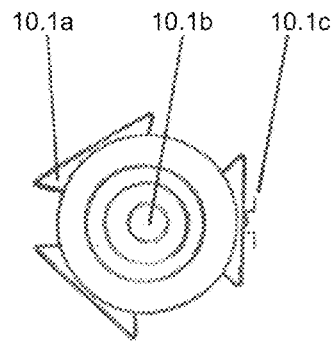
Figure 10.1
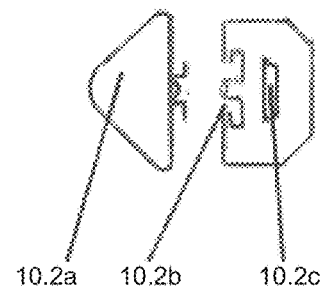
Figure 10.2
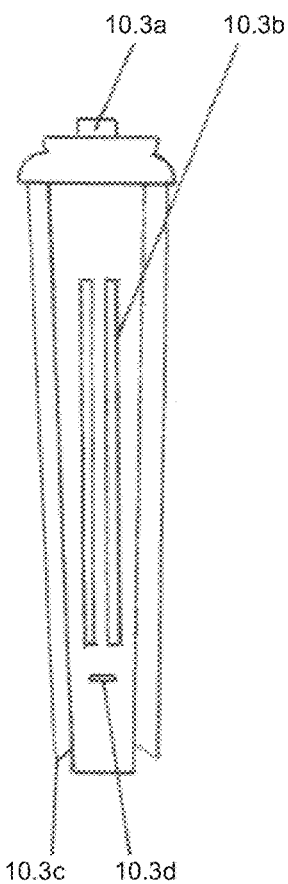
Figure 10.3
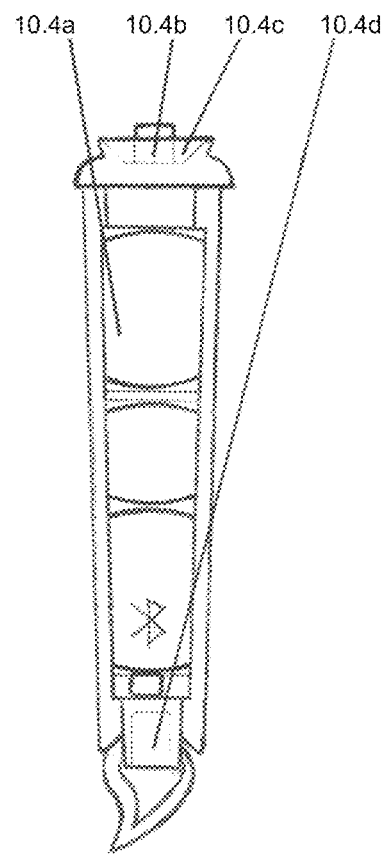
Figure 10.4

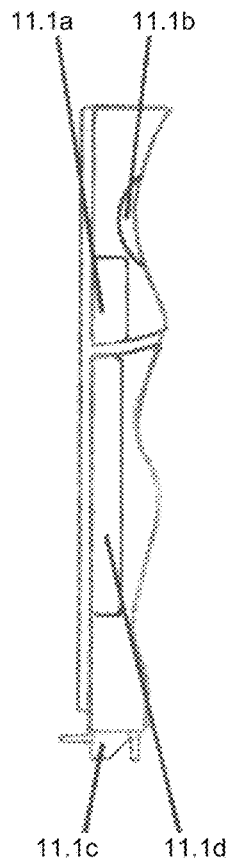
Figure 11.1
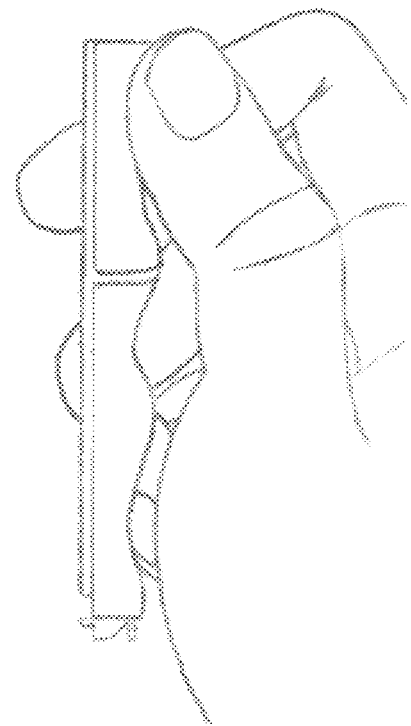
Figure 11.2
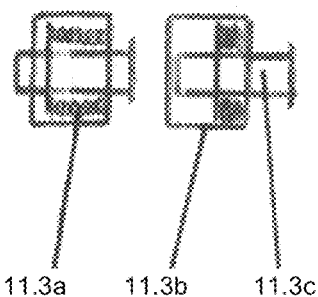
Figure 11.3
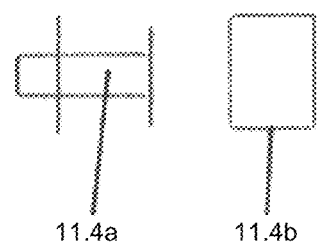
Figure 11.4

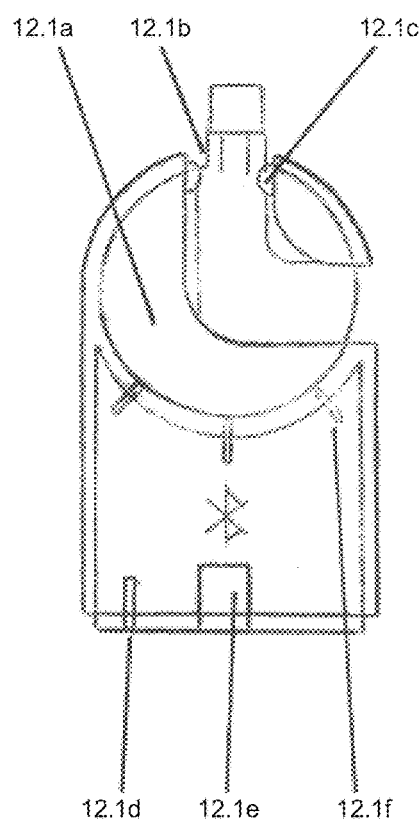 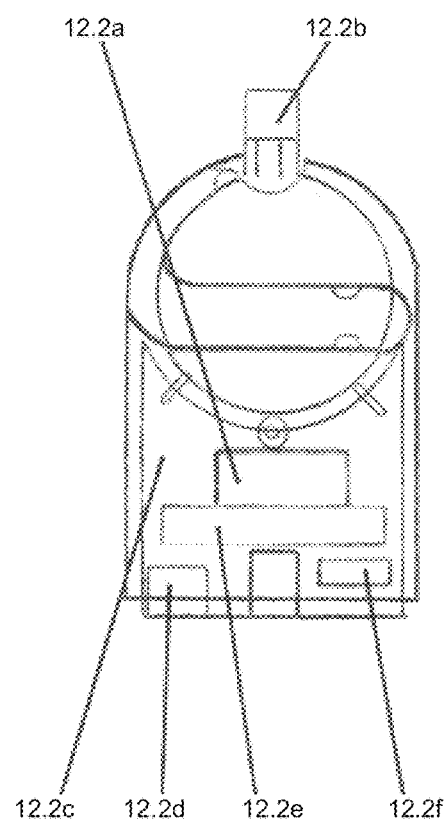
Figure 12.1    Figure 12.2

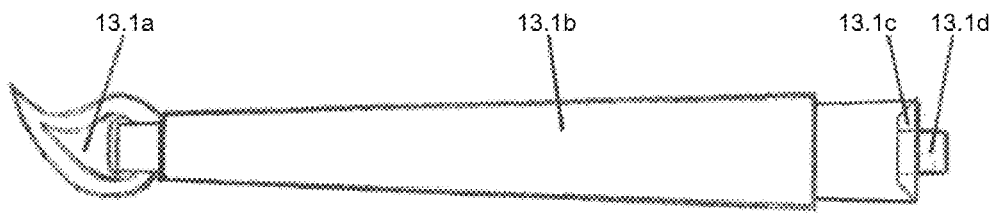
Figure 13.1
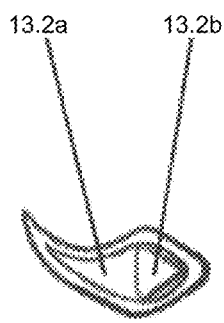
Figure 13.2
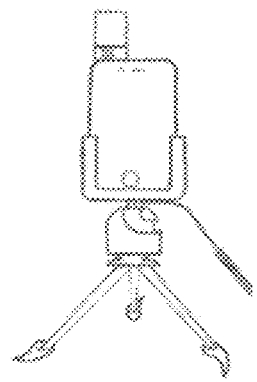
Figure 13.3
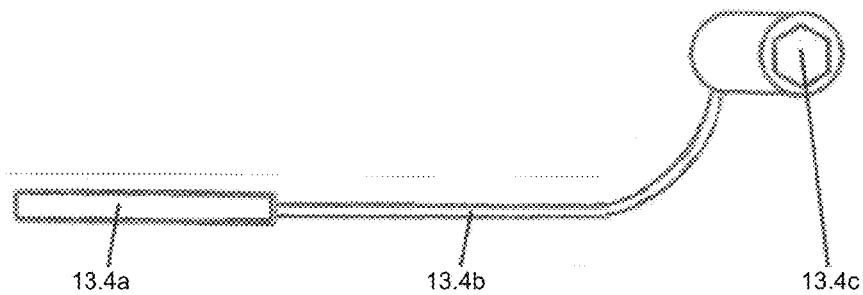
Figure 13.4

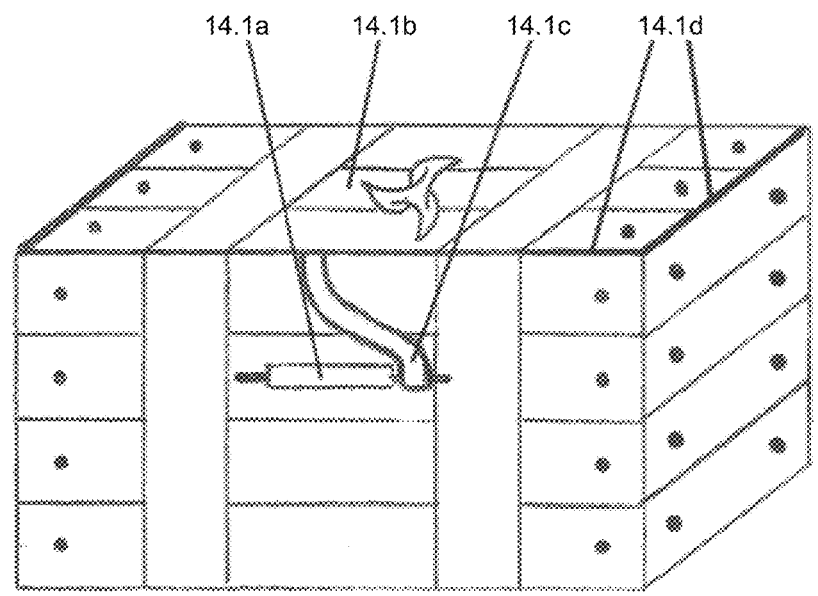
Figure 14.1
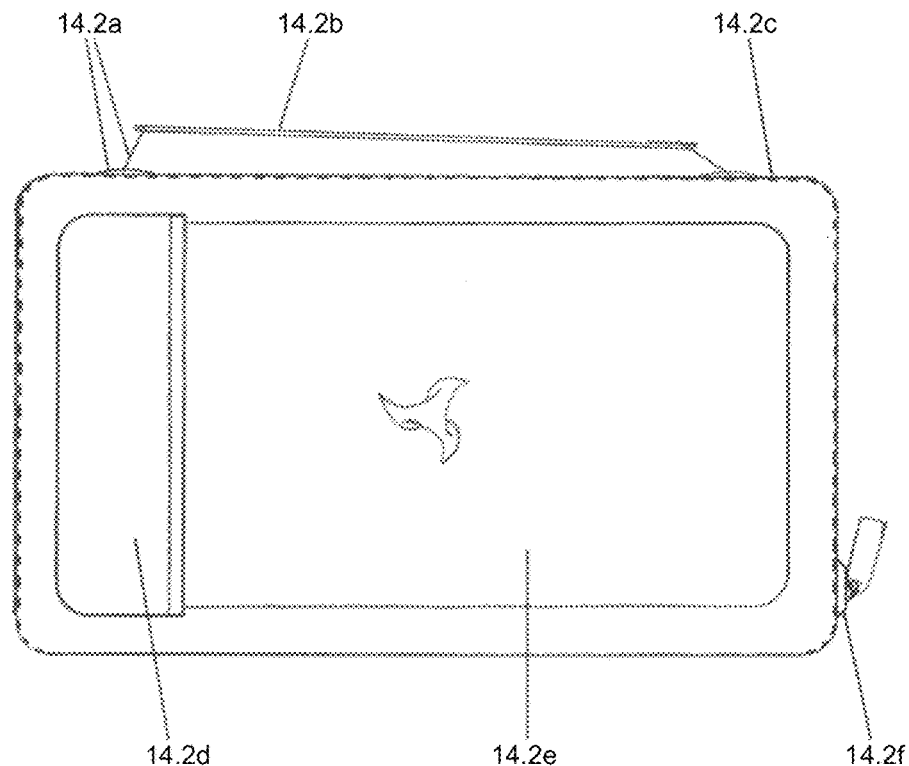
Figure 14.2

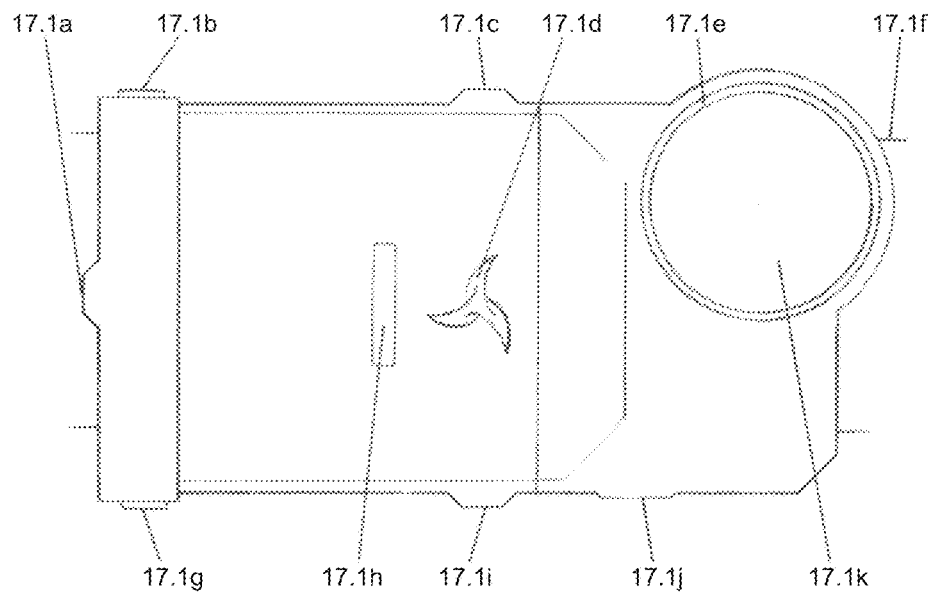
Figure 17.1
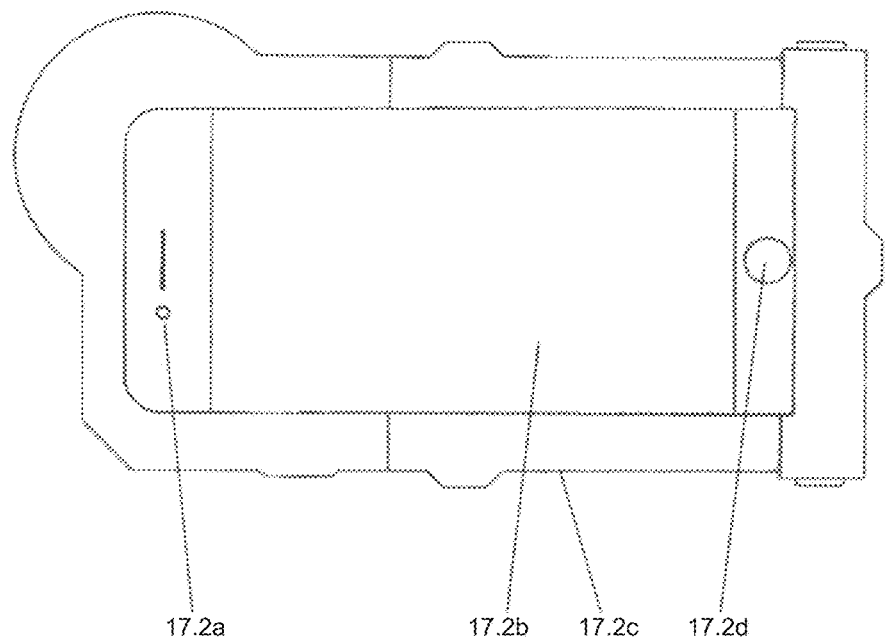
Figure 17.2

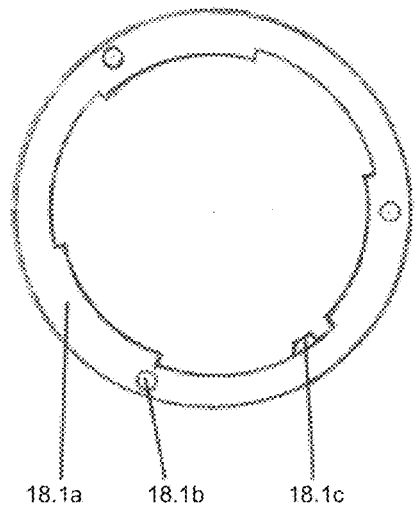
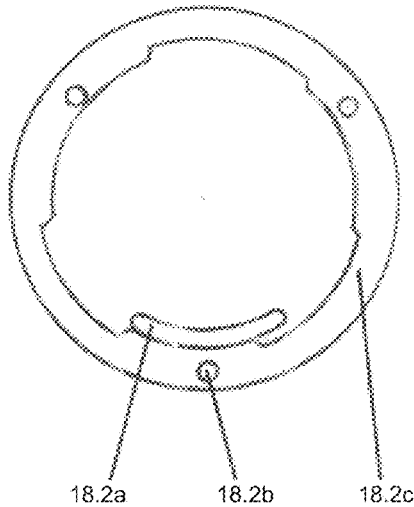
Figure 18.1          Figure 18.2
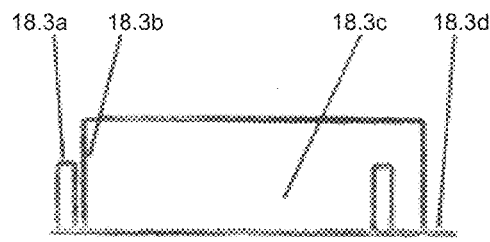
Figure 18.3

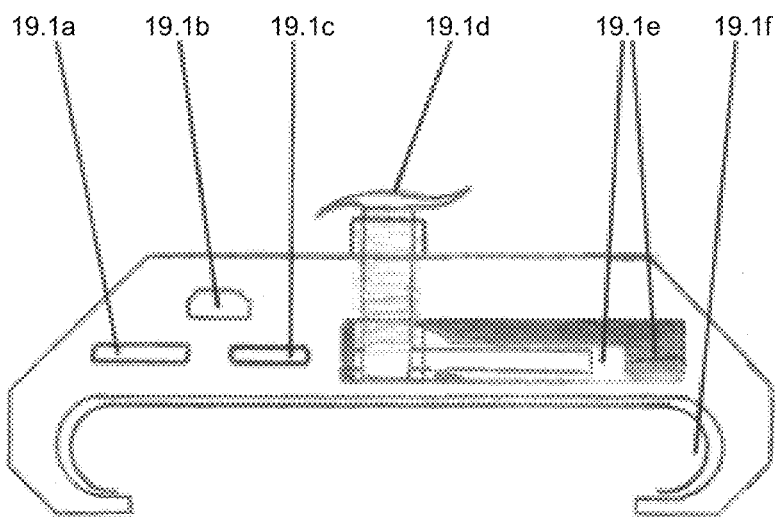
Figure 19.1
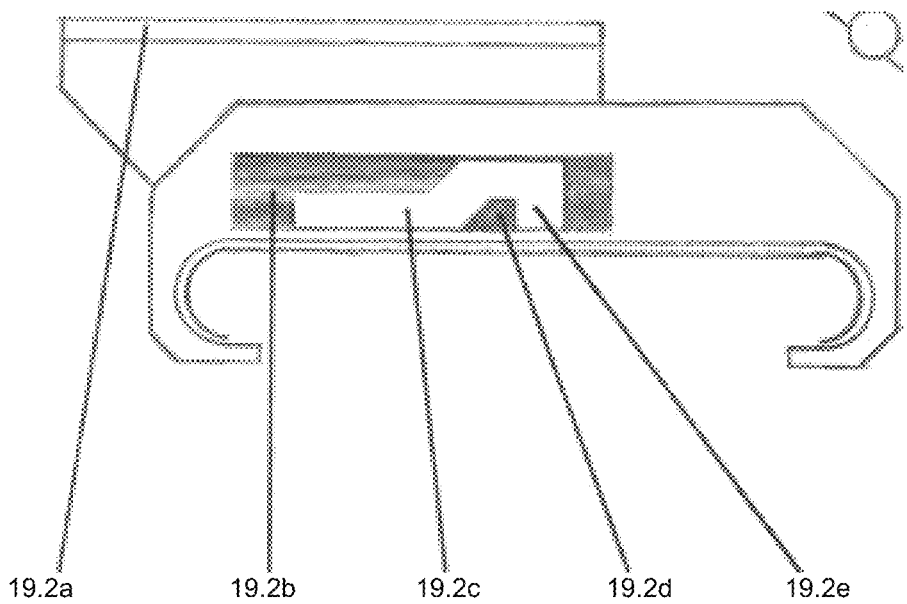
Figure 19.2

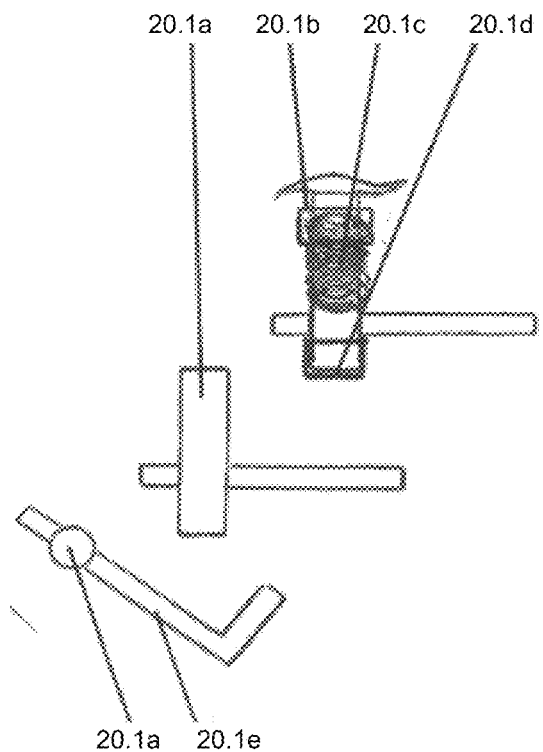
Figure 20.1
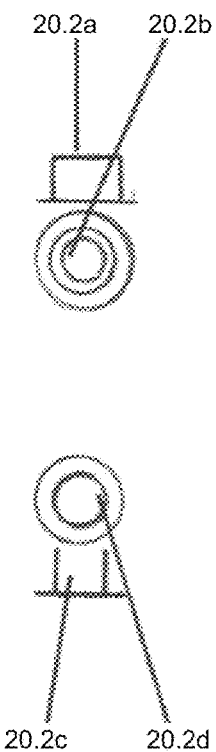
Figure 20.2
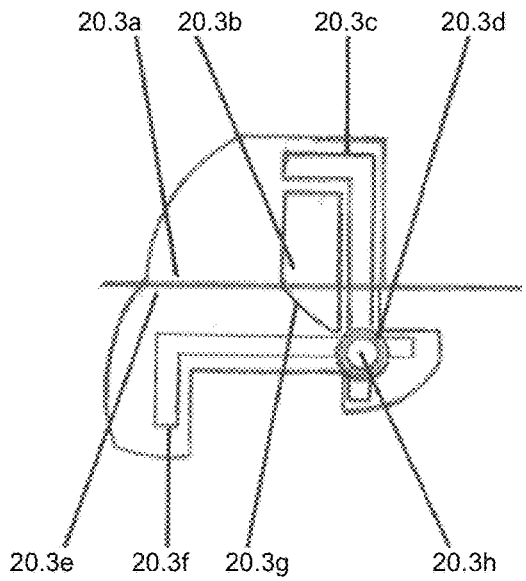
Figure 20.3

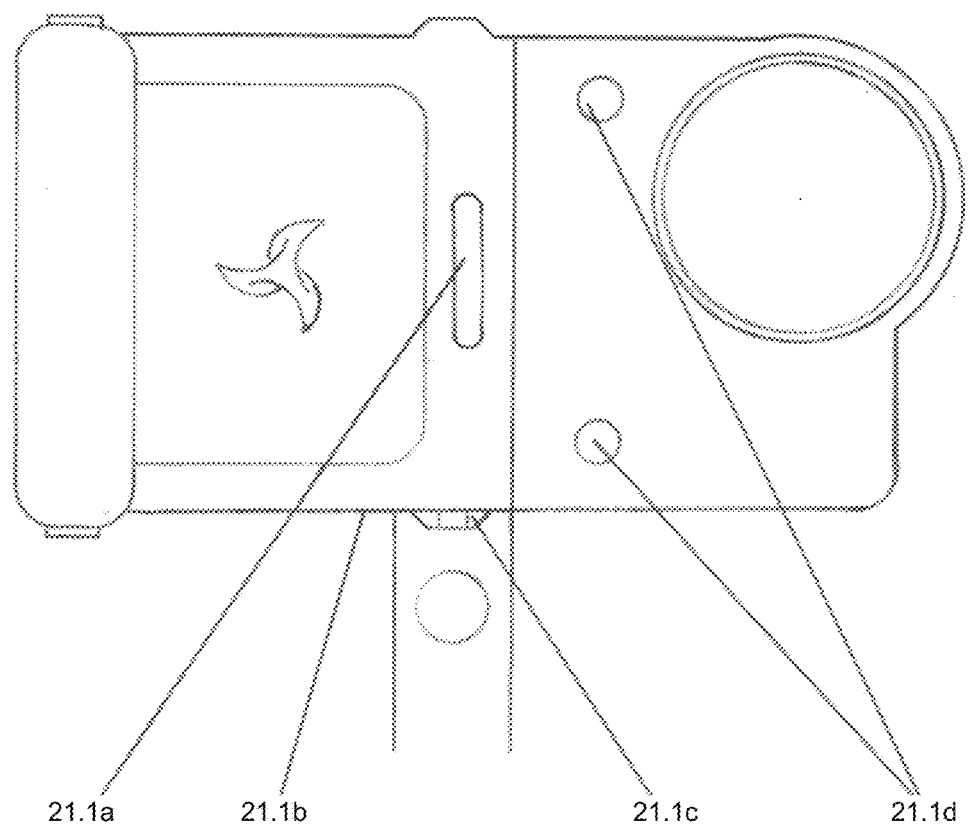
Figure 21.1
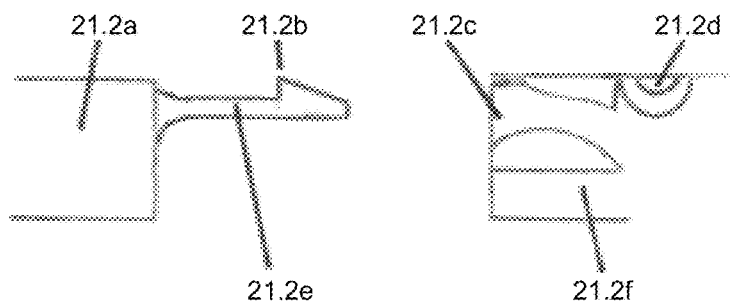
Figure 21.2

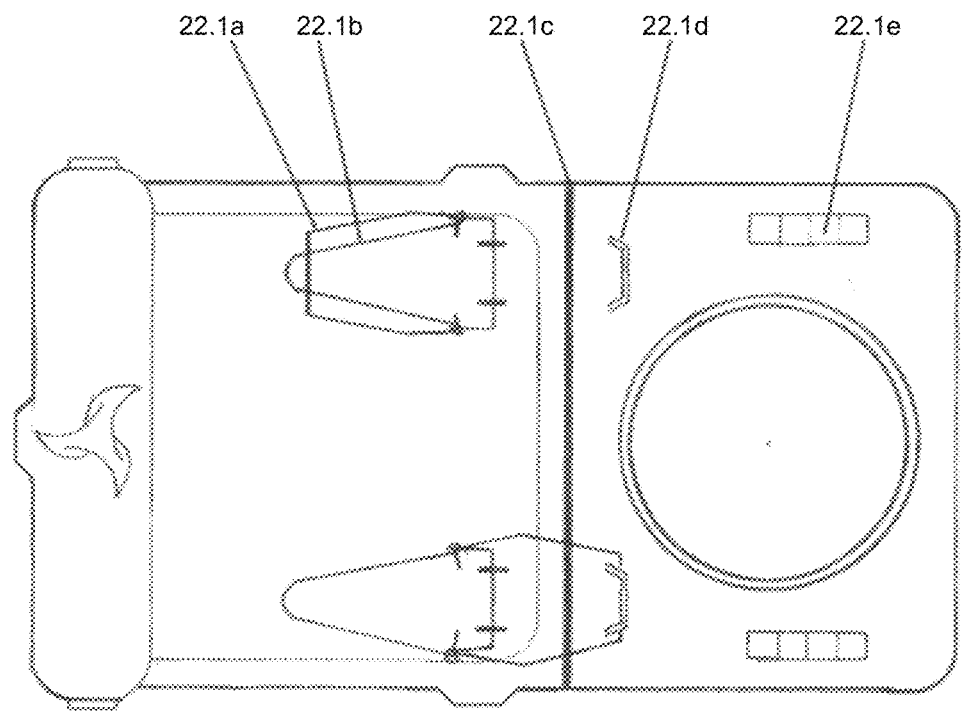
Figure 22.1
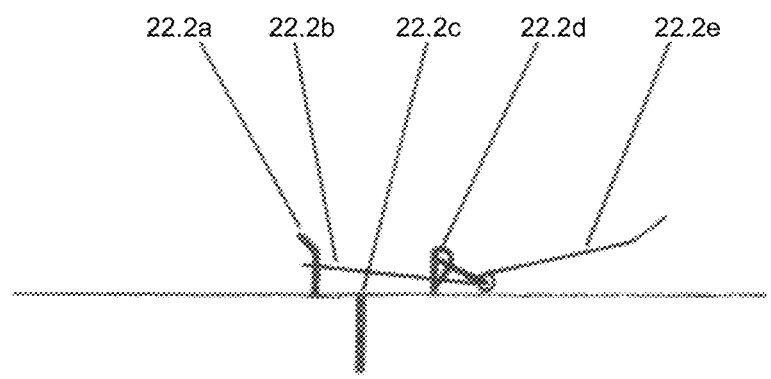
Figure 22.2

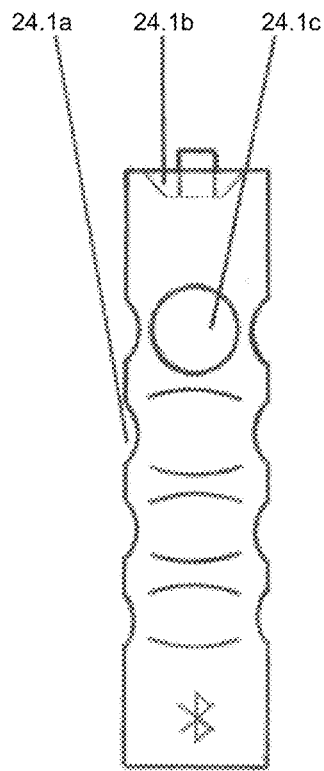 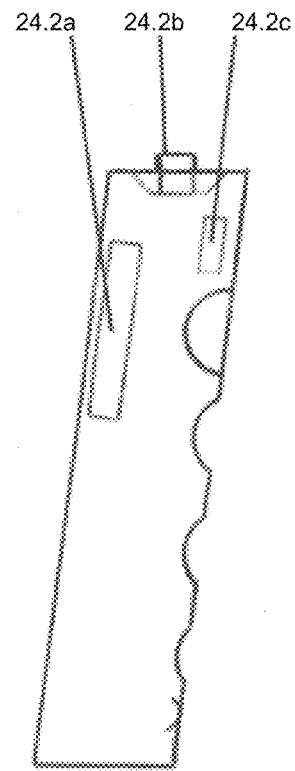
Figure 24.1  Figure 24.2
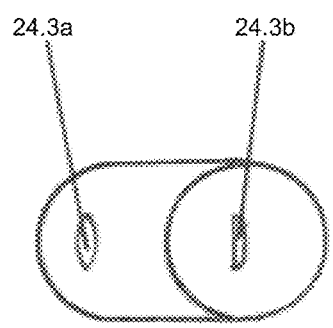
Figure 24.3

25a  25b  25c  25d  25e

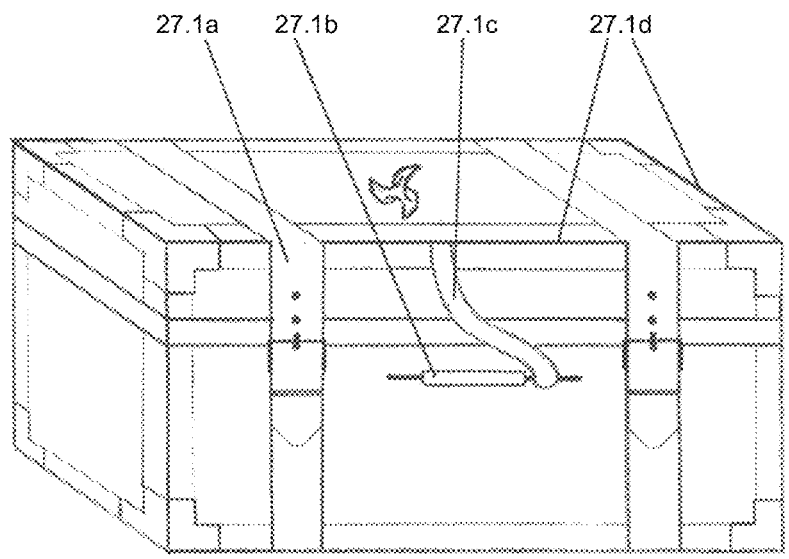
Figure 27.1
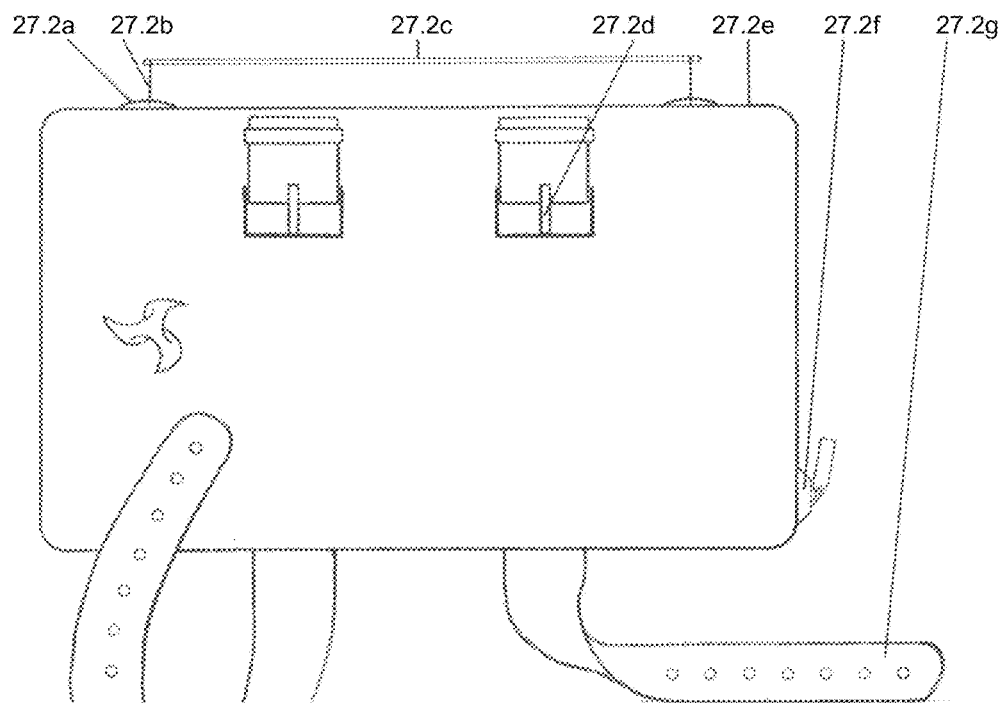
Figure 27.2

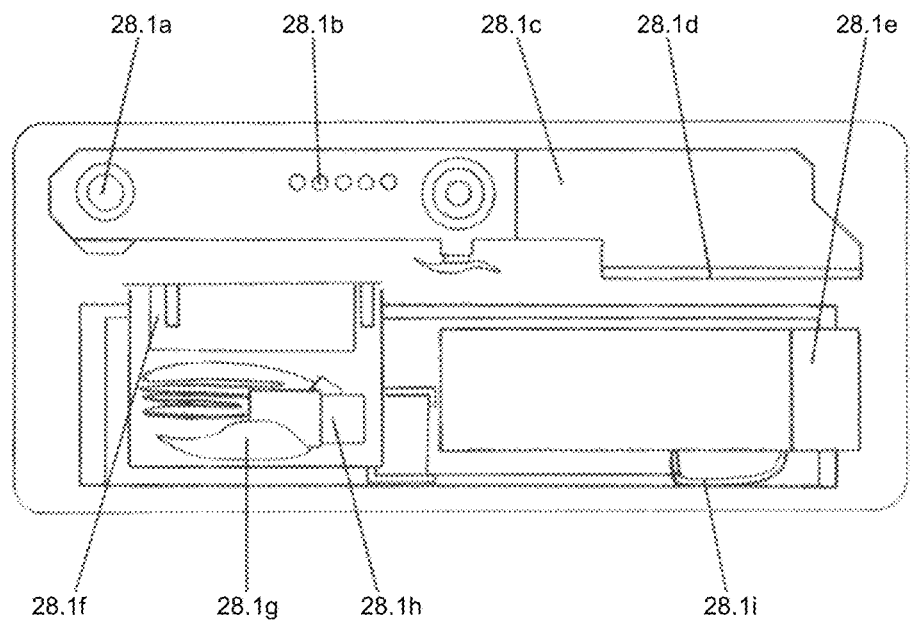
Figure 28.1
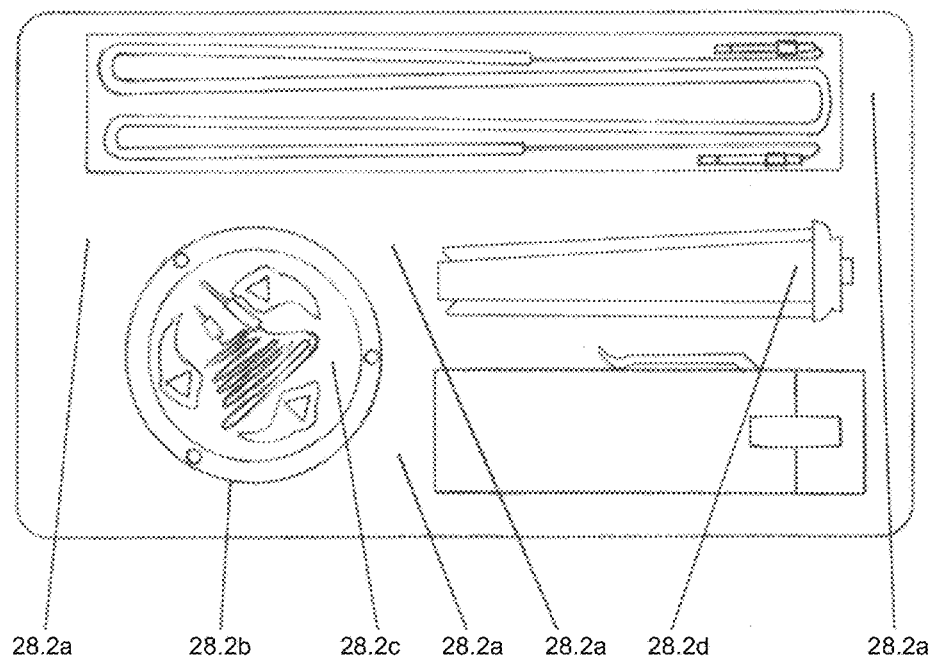
Figure 28.2

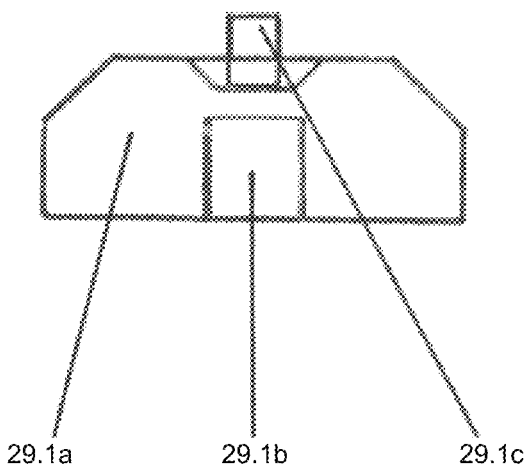
Figure 29.1
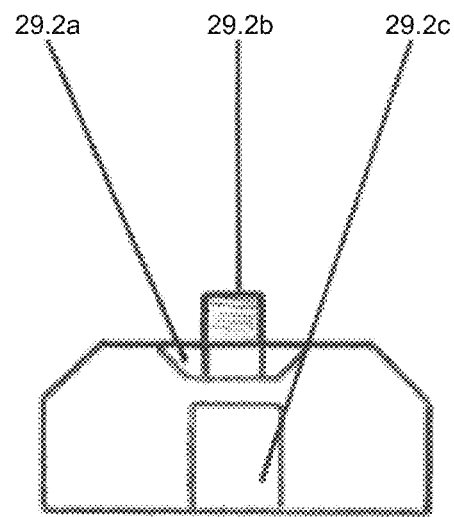
Figure 29.2

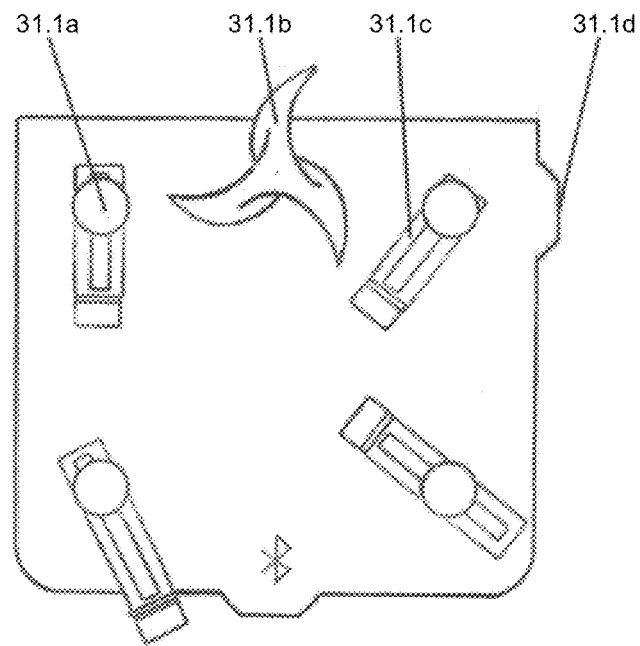
Figure 31.1
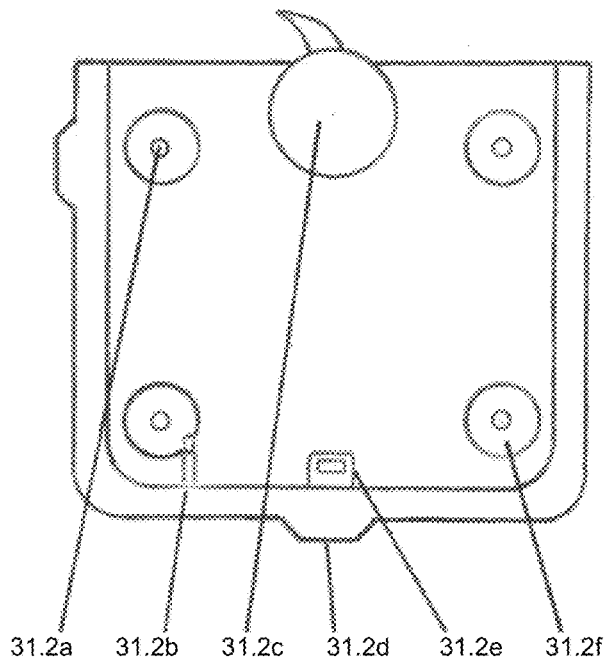
Figure 31.2

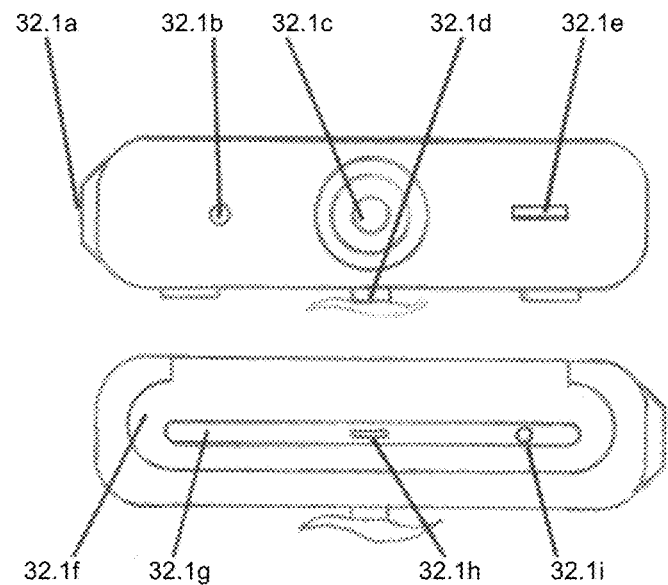
Figure 32.1
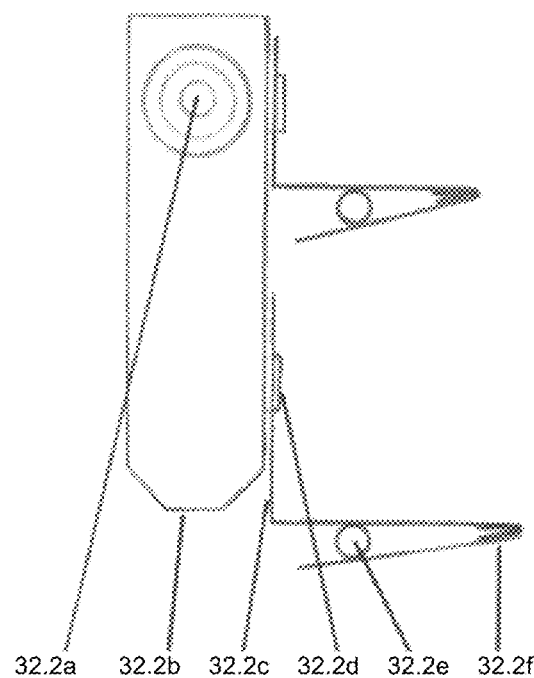
Figure 32.2

SYSTEM AND METHOD FOR IMPROVING A PHOTOGRAPHIC CAMERA FEATURE ON A PORTABLE ELECTRONIC DEVICE

RELATED APPLICATIONS DATA

This application is a continuation of Ser. No. 15/600,150, which was filed on May 19, 2017, the subject matter of which is incorporated by reference herein in its entirety.

COPYRIGHT AND TRADEMARK NOTICE

This patent document contains material subject to copyright and trademark (collectively "Intellectual Property") protection. The Intellectual Property owner, Conor Penfold, has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention relates to cell phone casing technology, and more particularly, to a system and method for using a case and/or skin having various components for improving and/or enhancing a camera (e.g., photographic, video, etc.) feature of a portable electronic device, such as a smartphone.

2. Description of Related Art

Battery boosting cases were among the first to incorporate any kind of wiring into a phone case. When a phone's battery diminished, the cases would use built-in rechargeable batteries to charge the phone. The booster case itself would also need to be charged, in order to provide further power for a phone. Since then, solar-powered battery charging pads have emerged that utilize sunlight in order to charge a battery, which in turn recharges a cell phone or electronic device. While not a phone case, in and of itself, the charging pad utilized a similar concept to the battery boosters, providing electronic integration with a cell phone. Cell phone enhancing technology, while constantly improving, has failed to incorporate more than a few basic functions into a particular casing.

As it concerns cell phone camera lenses, cases that enhance photography do exist in the market, however, limitations on lens quality and electronic integration with the phone itself prevent it from doing anything other than subtle magnification of the photo being taken (the terms photo(s) and image(s) will henceforth be used loosely and is intended to include regular photos, square, burst, videos, slow-motion videos and panoramas). Products with lens attachments include the Samsung Galaxy™ s7 Edge Camera Lens Accessories Kit, Samsung Converter Lens Kit, Camera Lens Kit for iPhone 6 Camera, and others. Interestingly, many of the lens kits available only accommodate one phone model. Clip-on lenses are available, that can improve photo quality, yet they lack any higher-level integration with the cell phone.

The Motorola Hasselblad True Zoom phone enables a focusing camera lens to be attached, however, the lens only clips-on to one phone model and can't be applied to other phone makes and models. Additionally, only one type of lens from one lens maker may be used with the product. Ultimately, the clip-on lens for the Motorola phone doesn't go beyond the magnification of photos much either. The photo backup feature is limited to Google Photos™ cloud storage based entirely upon the phone's internal components and doesn't incorporate any storage hardware that is compatible with existing digital cameras (SD or micro SD cards).

In the field of cell phone casing technology, there seems to be a lack of advanced electronic incorporation to further the cell phone experience. Internal components, allowing for memory storage, Bluetooth/Wi-Fi integration, HDMI output ports and more, have simply not yet emerged on the market. Additionally, while some cases send battery charge to the phone's battery, as of yet, none seem to send data to the phone via the internal electrical port (lightning, micro USB, USB-C), which could have interesting applications.

To date, there are no phone cases enabling a person to attach their own semi/professional camera lens and vastly improve the cell phone's own camera, particularly in the long distance photography department. Furthermore, there aren't any cases designed and on the market that attempt to maximize the interaction, in terms of hardware and phone software, that a case can potentially have with the phone itself. Ideally, there would be a product that can combine the convenience of a cell phone camera with the picture quality of a digital camera lens.

For many photography enthusiasts, of all interest and equipment levels, the conveniences provided by the cell phone camera can outweigh the loss in picture quality from that of a traditional digital camera. Even people who own quality camera equipment often opt for the easier method of using their phone, rather than getting out the casing and equipment required for a more elaborate camera set-up. Even under circumstances that warrant the full camera pack being brought out, there are inconveniences to a traditional digital camera that could be resolved using a cell phone in place of the digital camera body. For instance, needing to connect the SD card to a computer in order to view, download, crop/edit and finally email, post online or transfer photos to other devices. Using a cell phone rather than the digital camera body, one could do all of that and more without sacrificing as much in the picture quality department.

An additional drawback, for many photography enthusiasts largely ignored by the camera-manufacturing world, is the lack of options for left-handed people. The cell phone would provide a simple solution to accommodate all left-handers. Being that a cell phone can detect its own horizontal and vertical orientation, it can be flipped and won't result in a library of upside-down photos. With the addition of a shutter release where a left-handed person would ideally grip a camera's body, an entire group of people could be easily accommodated in a unique way that the camera industry seemed unwilling to do. Until recently that is, when around 2013 Canon was considered by some as revolutionary for finally introducing the EOS 7D Left-Handed DSLR Camera. Although there are now some options for left-handed people, many already have equipment that could easily be adapted using a cell phone instead of the traditional camera body.

SUMMARY OF THE INVENTION

The focus of the present invention is to provide a method for utilizing semi/professional camera equipment with the cell phone's built in camera. With phone cameras constantly improving, the ability to enhance that quality even more so will be in high demand. Merging the convenience of a cell phone with the improved lens quality of a digital camera would be an ideal middle ground that would satisfy millions of photographers, parents, bird watchers, sunset lovers, moon gazers and the like.

Capture Professional ("Cap Pro") Photography™ aims to provide that enhanced photography experience for the cell phone camera in the form of an electronic hard case. In addition to a focusing lens, electronic components built into the case will integrate with the cell phone's software/hardware to synergistically improve the entire photography experience.

In one iteration of the hard case design, a phone skin that acts as a bumper will be used for cushioning and positioning. The skin would also protect the phone from scratching and incorporate a lens-mounting ring in order to attach a lens. The phone and skin are inserted into a hard case (the Cap Pro case) and kept in perfect position for using lens attachments. The Cap Pro case, which may come packaged in a convenient carry case with its own unique tools and gadgets, could be made without skin incorporation, although having a skin adds variability in the form of a streamlined version.

The Cap Pro case features a unique lens that can be focused remotely via Bluetooth and motorized components or manually on the lens itself. Lens will be accompanied by a case for protection and transport purposes. The multifunctional tripod consists of a remote control attached to one of the legs, with the remote acting as a handle grip and shutter release. When deployed as a tripod, the remote can be removed for use as a Bluetooth-controlled shutter release. Additionally, the tripod pivot mechanism will also have Bluetooth and motorized components that enable control of the pivot remotely. Three tripod leg extensions, three rubber shoes, a pivot arm, micro-USB to USB charging cord and lens wipe are among the other items included in the Cap Pro carry case.

When the phone, case and lens are all attached, picture and video quality will be drastically improved. An additional remote design would double as a handle or grip, screw into the hard case and be a Bluetooth-controlled shutter release. Used either vertically or horizontally, the handle would improve camera stability and ease of use. If the case is mounted to a tripod, the remote could still be used at another screw insertion point or remotely via Bluetooth components. The remote may have its own carry case that provides protection and easy access. The remote with case, in addition to a neck strap and tripod for charging dock purposes, will be among other items that may be included in the Cap Pro carry case.

The phone and cases may interact via a Wi-Fi network created by the case and a wired line into the phone using the internal electrical port (lightning, micro USB, USB-C port, etc.). Bluetooth accessories would connect to the phone as any Bluetooth gadget does through phone settings. The case may have a rechargeable battery used to power the internal components and for use as a battery charger for the phone. Various options for battery charging settings can be modifiable, such as power save mode and prioritizing recharging options for cell phone and accessories. The flash, memory device, Bluetooth and Wi-Fi components may all be powered by the case's battery.

Case and accessories with rechargeable batteries maintain some level of functionality even if the battery loses charge. The Cap Pro tripod will still function as a tripod and handle if the remote's battery is drained. Similarly, the tripod pivot will still operate manually using the pivot arm, as will the lens' focusing ring. The Cap Pro remote can still be used as a handle for balancing and hardwiring via screw insertion points allow the button press mechanism to send a signal to the phone, in the absence of battery charge. The unique battery-powered accessories that accompany the casings will each still serve a purpose. The battery built into the case can recharge accessories via screw insertion points when battery charge diminishes. The case can also be set-up as a charging dock, when connected to a power source. Additionally, when the case exhausts its battery power, the central purpose of obtaining enhanced photos will remain. Another interesting facet of the accessory batteries is the ability to charge through two different mechanisms. Each accessory can easily be charged through a micro-USB port plugged into a wall socket. Accessories with wired screw insert mechanisms will also, via charging docks and the Cap Pro accessory charger, be able to recharge through the screw itself.

Adapters, that enable further use of camera equipment, will exist in order for people to get the most of the cell phone camera adapter experience. As it pertains to tripods on the market, there are two main sizes for insertion screws. As a result, two adapters will be available in order to mount Cap Pro equipment onto the differing tripods. The female end of the adapter will fit into the existing tripod screw, which then attach to the Cap Pro cases, pivots, etc. via the Cap Pro threaded male adapter screw. While not related to an adapter per se, case designs will also allow for use of neck straps, continuing the theme of utilizing any and all camera equipment a person may already own.

As future phone models change in size or camera positioning and technology evolves, so will the exterior architecture and internal mechanisms of the Cap Pro case. With adapters being central to the invention, future adapters will allow for use of older Cap Pro equipment (lens, remote, etc.) with the updated model casings.

A more complete understanding of a system and method for using a case and/or skin having various components for improving and/or enhancing a camera (e.g., photographic, video, etc.) feature of a portable electronic device, such as a smartphone, will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIGS. 2.1 and 2.2 provide exterior and interior views of a Cap Pro skin that can be affixed to a cellular telephone, such as a smartphone, in accordance with certain embodiments of the present invention;

FIGS. 3.1 and 3.2 depict a lens and a corresponding case in accordance with certain embodiments of the present invention, where the lens can be affixed to (e.g., attached to, removed from) a Cap Pro case or skin, such as the one illustrated in FIGS. 2.1 and 2.2;

FIGS. 4.1 and 4.2 depict mounting rings in accordance with certain embodiments of the present invention, where a mounting ring can be used to affix a lens (see, e.g., FIG. 3.1) to a Cap Pro case or skin (see, e.g., FIG. 2.1);

FIG. 4.3 provides one embodiment of how a mounting ring, such as the ones depicted in FIGS. 4.1 and 4.2, can be used to affix a lens (see, e.g., FIG. 3.1) to a Cap Pro case or skin (see, e.g., FIG. 2.1);

FIGS. 5.1 and 5.2 depict a Cap Pro case that can be affixed to an Apple iPhone™ in accordance with one embodiment of the present invention;

FIGS. 6.1 and 6.2 depict alternate views of a Cap Pro case in accordance with certain embodiments of the present invention;

FIGS. 8.1 and 8.2 depict exemplary features (e.g., screws, brackets) that can used to affix a Cap Pro case to at least one accessory;

FIGS. 9.1 and 9.2 depict the interior architecture of a Cap Pro case in accordance with one embodiment of the present invention, including a logo locking mechanism, such as the one depicted in FIG. 1, and a padded interior base;

FIGS. 10.1-10.4 depict a multifunctional tripod in accordance with certain embodiment of the present invention, where the tripod can be affixed to a Cap Pro case;

FIGS. 11.1-11.4 depict an exemplary remote control that can be affixed to a tripod, such as the one depicted in FIG. 10.3;

FIGS. 12.1 and 12.2 depict an exemplary pivoting mechanism for a tripod;

FIG. 13.1 depicts an exemplary leg extension for a tripod;

FIG. 13.2 depicts an exemplary shoe for a tripod;

FIG. 13.3 depicts a tripod assembly in accordance with one embodiment of the present invention, including tripod leg extensions (see, e.g., FIG. 13.1), tripod shoes (see, e.g., FIG. 13.2), and a pivot arm set-up (see, e.g., FIG. 13.4);

FIG. 13.4 depicts an exemplary pivot arm set-up for a tripod;

FIGS. 14.1 and 14.2 depict, respectively, exemplary packaging and an exemplary carrying case for a Cap Pro case;

FIGS. 17.1 and 17.2 depict a Cap Pro case that can be affixed to an Apple iPhone™ in accordance with one embodiment of the present invention;

FIGS. 18.1-18.3 depict exemplary mounting ring adaptors that can be used to affix an off-the-shelf lens (e.g., a Canon™ lens, a Minolta™ lens, etc.) to a Cap Pro case;

FIGS. 19.1 and 19.2 depict certain electrical and mechanical features of a Cap Pro case in accordance with one embodiment of the present invention, including an electrical port and a logo locking mechanism (see, e.g., FIG. 1);

FIGS. 20.1-20.3 depict exemplary internal components of a logo locking mechanism (see, e.g., FIG. 1);

FIG. 21.1 depicts a Cap Pro case that can be affixed to a Google Pixel™ in accordance with one embodiment of the present invention;

FIG. 21.2 depicts a clip-in mechanism that can be used to connect a first-portion (e.g., front) of a Cap Pro case to a second-portion (e.g., back) of a Cap Pro case in certain embodiments of the present invention;

FIG. 22.1 depicts a Cap Pro case that can be affixed to a Samsung Galaxy™ S8 in accordance with one embodiment of the present invention;

FIG. 22.2 depicts a fastening mechanism that can be used to connect a first-portion (e.g., front) of a Cap Pro case to a second-portion (e.g., back) of a Cap Pro case in certain embodiments of the present invention;

FIGS. 24.1-24.3 depict exemplary features of a remote control, including charging port and bracketing;

FIGS. 27.1 and 27.2 depict, respectively, exemplary packaging and an exemplary carrying case for a Cap Pro case;

FIG. 28.1 provides an exemplary internal, side view of a carrying case, such as the one depicted in FIG. 27.2;

FIG. 28.2 provides an exemplary internal, top view of a carrying case, such as the one depicted in FIG. 27.2;

FIGS. 29.1 and 29.2 depict different tripod adapter architectures;

FIGS. 31.1 and 31.2 depict various views of a Cap Pro case in accordance with one embodiment of the present invention, where the case includes clips for attaching the case to heater and/or A/C vents (e.g., vehicle vents);

FIGS. 32.1 and 32.2 depict alternate views of the Cap Pro case depicted in FIGS. 31.1 and 31.2;

DETAILED DESCRIPTION OF THE PREFERRED EMBODIMENT

The present invention provides a system and method for using a case and/or skin having various components for improving and/or enhancing a camera (e.g., photographic, video, etc.) feature of a portable electronic device, such as a smartphone. It should be appreciated that while the present invention is described in terms of a case (e.g., a Cap Pro case) that works in conjunction or together with a smartphone, the present invention is not so limited. For example, the present invention could be used in conjunction or together with any cellular telephone, digital camera, laptop, tablet, or any other portable electronic device that includes a camera feature. It should also be appreciated that the present invention is not limited to a "case" and/or "skin" that encompasses, surrounds, and/or is affixed to a smartphone. For example, a case or skin that is in close proximity with a portable electronic device, regardless of whether the device encompasses, surrounds, and/or is affixed to the device, is within the spirit and scope of the present invention.

Figure 39:
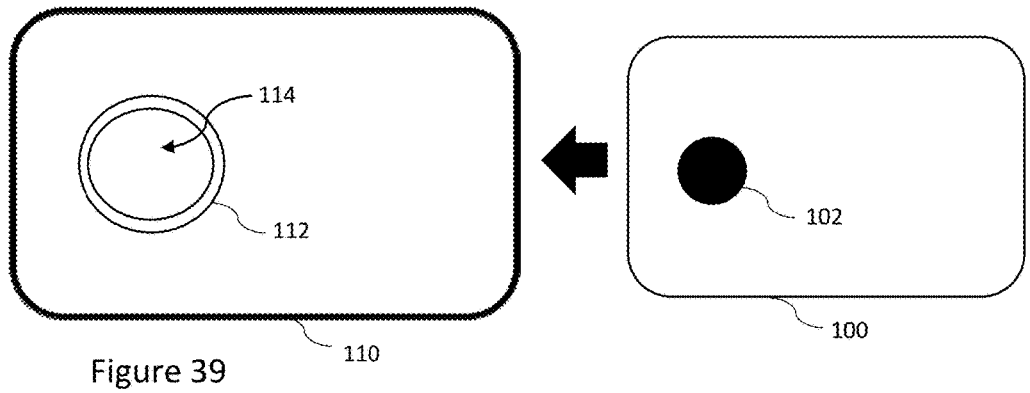
FIG. 39 depicts, prior to assembly, a top view of a smartphone and a case in accordance with one embodiment of the present invention.
Figure 40:
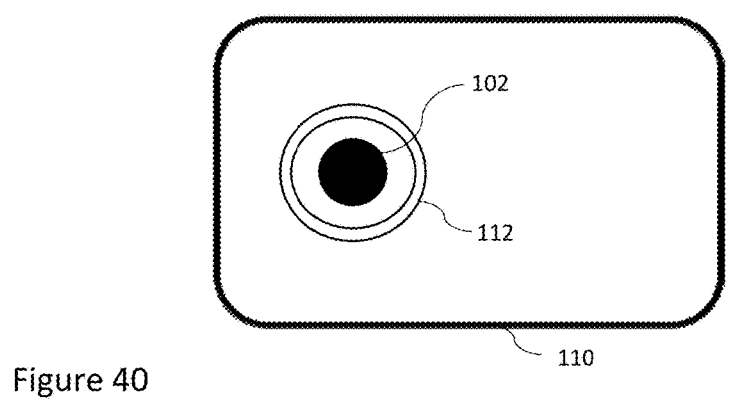
FIG. 40 depicts an assembled, top view of the case and smartphone depicted in FIG. 39.
Figure 41:
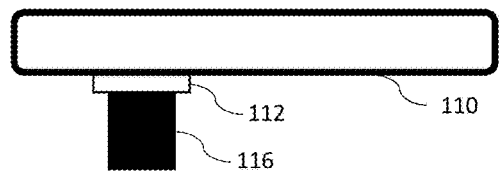
FIG. 41 provides an assembled, side view of the case and smartphone depicted in FIG. 39, with the addition of an exemplary external lens.

In one embodiment of the present invention, as shown in FIG. 39, the system includes a case 110 that is designed by Capture Professional ("Cap Pro") Photography™ and configured to encompass, surround, and/or be affix (e.g., secured) to a smartphone 100, such as an Apple iPhone™, a Samsung Galaxy™, or a Google Pixel™. The Cap Pro case 110 preferably includes an aperture 114 that, upon assembly, is aligned with a camera lens 102 of the smartphone 100 (e.g., the lens on a back side of the smartphone, the lens on a front side of the smartphone, etc.) (see, e.g., FIG. 40) and a mounting ring 112 disposed within (or around) the aperture 114. The mounting ring 112 is configured to receive (or be connected to) at least one external lens (e.g., a lens customized for the case, an off-the-shelf lens (e.g., a Canon™ lens, a Minolta™ lens, etc.), etc.) (see, e.g., FIG. 41 at 116), where the external lens 116 is substantially aligned with the camera lens 102 of the smartphone 100.

In photography (and video) there are two ways to magnify, bring closer, or zoom in on an object, i.e., using an "optical zoom" or a "digital zoom." An "optical zoom" is achieved using a telescopic lens, whereas a "digital zoom" is achieved using software. While there are benefits to an "optical zoom" over a "digital zoom," most off-the-shelf smartphones are only capable of magnifying an object using "digital zoom." However, by adding an external telescopic lens to the smartphone, the smartphone can magnify the object using the "optical zoom," the "digital zoom," or a combination thereof.

Figure 42:
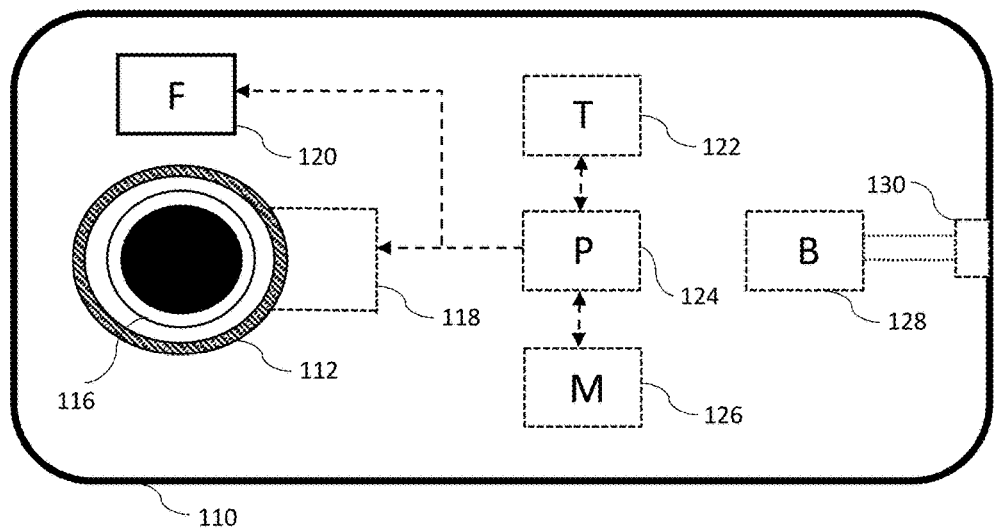
FIG. 42 provides a block diagram of an exemplary case in accordance with one embodiment of the present invention.

An exemplary block diagram of a Cap Pro case in accordance with one embodiment of the present invention is illustrated in FIG. 42. As discussed above, the case 110 includes a mounting ring, which is configured to receive (or be connected to) a lens 116. The case may include a motor 118 that is configured to mechanically move (or rotate) the lens 116 in order to focus the lens on a particular object. It should be appreciated that the present invention is not limited to the number, type, and/or location of the components shown in FIG. 42. For example, the motor 118 could be located on the case 110, and used to adjust the focal point of the lens 116 by rotating at least a portion of the mounting ring 112. By rotating the mounting ring, or portion thereof, an outer portion of the lens 116 is rotated (as can be done to manually) in order to adjust the focal point of the lens 116. Alternatively, the motor 118 can be located on the lens 116 and used to adjust the lens 116 directly (e.g., as shown in FIG. 3.1). By way of another example, components shown in FIG. 42 (e.g., processor, mounting ring, etc.) could be located elsewhere, such as on a skin that lies between the case and the smartphone.

With reference to FIG. 42, the case 110 may also include a processor 124, a memory 126, a transceiver 122, an external flash 120, and a rechargeable battery 128. The battery 128 is used to power the components included on the case 110, including the motor 128, the processor 124, the memory 126, the transceiver 122, and/or the external flash 120. The battery 128 is preferably connected to a charging port 130, which may be plugged into a power source (e.g., the smartphone, a power outlet, a portable battery charger, etc.) via a cable (not shown). It should be appreciated that the present invention is not limited to a case that includes a battery. Thus, for example, a case and/or skin that receives its power from the smartphone (or the smartphone's battery) is within the spirit and scope of the present invention.

The processor 124, which may operate on instructions stored on the memory 126, functions to control the components included on the case 110. For example, the processor 124 (in response to user commands) can be configured to control the external flash 120 (e.g., flash/shutter synchronization), to control the motor 118 (e.g., for focus), to store captured images and/or video on the memory 126, and to receive and transmit data/commands via the transceiver 122. The primary purpose of the transceiver 122 is to establish a wireless link (or connection) between the case 110 and the smartphone. As such, the transceiver 122 may comply with any wireless protocol, including Bluetooth, Bluetooth Low Energy (BLE), Wi-Fi (e.g., providing a Wi-Fi access point, etc.), Near Field Communication (NFC), ANT(+), and/or any other wireless technology or protocol, or combination of technologies or protocols, generally known to those skilled in the art. For example, the case 110 may include a BLE transceiver, an NFC transceiver, and a Wi-Fi access point. Further, or alternatively, the case may be physically connected (e.g., via the charging port 130, using an external wire) to the smartphone, allowing data/commands to be communicated via a hardwired connection. Depending on the embodiment, the hardwired connection (not shown) could be used to either supplement the transceiver 122 or replace the transceiver 122. It should be appreciated that the wired and/or wireless link(s) should preferably provide bi-directional communication, allowing the smartphone to communicate with the case and/or skin (e.g., to focus the lens on the case, to control the flash on the case, to store photographs on the case's memory, etc.) and the case and/or skin to communicate with the smartphone (e.g., to provide power to the smartphone, to provide power level to the smartphone, to provide photographs (stored in memory) to the smartphone, etc.).

Figure 43:
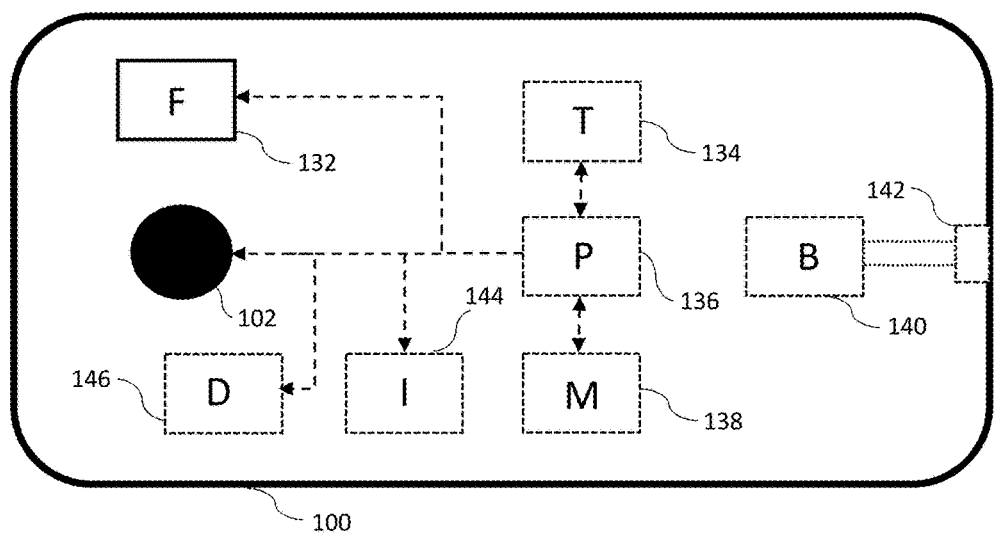
FIG. 43 provides a block diagram of an exemplary smartphone.

As discussed above, the Cap Pro case is used in conjunction with a portable electronic device, such as a smartphone. An exemplary block diagram of a smartphone is provided in FIG. 43. As shown therein, a typical smartphone 100 includes a camera lens 102, a processor 136 (e.g., for controlling components on the smartphone), at least one transceiver 122 (e.g., BLE, NFC, Wi-Fi, etc.), a memory 138 (e.g., for storing programs, applications, images, video, etc.), a rechargeable battery 140 (e.g., for powering components on the smartphone), a display 146 (e.g., LCD screen), an input device 144 (e.g., keyboard, touchscreen, etc.), and an internal flash 132. In one embodiment of the present invention, the smartphone 100 is placed inside the case 110 (or inside a skin (not shown), which is then placed inside the case 110) and a communication link is established between the two devices (e.g., via a hardwired connection, a wireless connection, etc.). An application (e.g., Cap Pro App), which can be downloaded onto the smartphone 100, can then be used to communicate with the case 110 to perform a number of functions, such as turning on/off the external flash 120, controlling (activating) the external flash 120, focusing the external lens (not shown) (via the motor 118 and the mounting ring 112), storing photographs on the memory 126, retrieving photographs from the memory 126, etc. In other words, the user can use the application on the smartphone to not only control the camera feature of the smartphone 100 (e.g., capture an image of an object, etc.), but also related features on the case 110 (e.g., adjust the lens on the case to focus on the object, etc.).

Those skilled in the art will understand that the present invention can be configured in a number of different ways, to perform a number of different functions. As such, the present invention is not limited to any particular embodiment. In an effort to demonstrate the flexibility of the present invention, and provide details on certain features and/or functions, various embodiments of the present invention will now be discussed.

FIGS. 2.1 and 2.2 depict a Cap Pro skin in accordance with one embodiment of the present invention. As discussed above, the Cap Pro skin can be configured for different smartphones, including, but not limited to, the iPhone 5, 6, 6+, 7, 7+, Samsung Galaxy™ s7, s8, Google Pixel™, and LG™ g5, g6. The positioning of camera hole and lens-mounting ring, as well as dimensions of skin and case, can be adapted to accommodate future phone iterations and other makes/models. The Cap Pro skin and by extension, the Cap Pro case, can be fitted to any cell phone's exterior architecture. The skin can be made of any number of materials or colors, silicone rubber and faux leather being exemplary design choices.

An oval opening at the base of the skin 2.1a fits into corresponding oval padding at the base of the Cap Pro case (see, e.g., FIG. 6.2 at 6.2i, FIG. 9.1 at 9.1a, and FIG. 15 at 15a) and the Cap Pro mounting case (see, e.g., FIG. 32.1 at 32.1g) for hands free driving. The sunken logo 2.1b on the back of the skin is where all logo screws (see, e.g., FIG. 5.1 at 5.1b, FIG. 5.2 at 5.2b, FIG. 6.2 at 6.2h, FIG. 9, FIG. 31.1 at 31.1b, FIG. 31.2 at 31.2c, and FIG. 32.1 at 32.1d) fasten. In one embodiment, the logo is roughly 2 mm lower than the surrounding skin, which will prevent the phone from sliding out of position when the screw is tightened.

Vent holes 2.1d, along the left and right sides of the skin, are perforations that allow for ventilation. Preventing the phone from heating excessively while in the skin and Cap Pro case is of importance, and vent holes are one step towards addressing said issue. The manual shutter release hole 2.1e and lock-button hole 2.2b provide access to the phone's exterior buttons while also functioning as additional ventilation.

These holes have been incorporated into the design without compromising the integrity of the skin's lip 2.2a. The architecture of the skin's lens corner 2.2d makes it easy to separate from phone in order to insert the lens-mounting ring, in instances when the skin is already on. Ease of use is paramount to many of the design features incorporated into the architecture of the present invention and the lens corner is one such example.

The camera hole 2.1c, which could be positioned anywhere a phone's camera is located, would allow the interior lens-mounting ring (see, e.g., FIGS. 4.1, 4.2, 4.3) to be inserted. This would provide for a streamlined version (see, e.g., FIG. 4.3), enabling a lens to be affixed to the skin itself. The skin's camera hole would also provide an unobstructed view when an additional lens is attached to any Cap Pro case. On the interior of the skin may be grooves 2.2c for the lens-mounting ring. When the mounting ring is inserted, the outer edge (see FIG. 4.1 at 4.1a and FIG. 4.2 at 4.2a) will fit into groove 2.2c and the mounting ring would be flush with the inside of the skin and perfectly positioned for taking photos.

In one embodiment of the present invention, as shown in FIGS. 4.1 and 4.2, the lens-mounting ring may have a grooved insertion point 4.1a. In this case, the mounting ring would be the female insert for the male lens components. The lens would fit into the ring insertion point and twist right to fasten. To remove the lens, turn to the left and straight out of the mounting ring. Vertical sides of 4.1b fit through 2.1c (see FIG. 2.1). In an alternate embodiment, the lens-mounting ring may have a screw insertion point 4.2b. In this instance, the mounting ring would be the male screw end for the female lens insert 3.1a (see FIG. 3.1). Mounting ring would fit into lens insertion point and again turn right to tighten and left to remove. Interior portion of 4.2a fits through 2.1c (see FIG. 2.1). In both embodiments, the lens-mounting ring is placed inside the skin, through hole 2.1c (see FIG. 2.1) and attaches to point 3.1a (see FIG. 3.1) on the outside of the skin. Similarly, both embodiments may be made out of hard plastic and/or metal components, and, as shown in FIG. 4.3, result in a streamlined system comprising phone 4.3a, skin 4.3b, lens-mounting ring 4.3c and lens 4.3d.

In other embodiments, the lens-mounting ring architecture may be built into the skin casing, making 4.3b and 4.3c one piece. With the built-in mounting ring, design options could again include either the female grooved insertion point or the male screw insert. Again, the desired result is to arrive at a streamlined version, which, in this instance, would comprise phone, skin and lens. It should be appreciated that the present invention does not require a skin, and a Cap Pro case that excludes the skin, or replaces the skin with padding on the interior or exterior of the casing is within the spirit and scope of the present invention.

The Cap Pro lens (see, e.g., FIG. 3.1, FIG. 4.3 at 4.3d) is intended for use with the Cap Pro lens-mounting ring or the Cap Pro case's built-in mounting ring (see, e.g., 5.1e). The lens' female insertion point (see, e.g., FIG. 3.1 at 3.1a) is where the connection is made with the mounting rings (as illustrated in 4.3). In addition to a standard lens, as shown in FIG. 3.1, the body may house a small motor 3.1e, a rechargeable battery 3.1b and Bluetooth machinery 3.1d, which will allow focusing from within the app. The forward and reversing motor will move the focusing ring 3.1g in two directions and as a result adjust the focus, by moving internal elements toward the front lens 3.1h or rear lens 3.1f. A micro USB port 3.1c may be added to the lens body for battery recharging purposes. The battery may in turn power the Bluetooth connectivity hardware chip, motor, and therefore the focusing ring. In the event that the battery loses charge, manual adjusting of the focusing ring will still be possible on the lens body. Different options to include standard zoom, telephoto zoom, wide angle, fish eye, macro, and more lens types may be used with the present invention. A larger version of the Cap Pro lens may be equipped with the same battery, motor, charging and Bluetooth capabilities. However, the internal lenses may be thicker and wider, and the motor, focusing ring and battery may be larger.

Remotely adjusting the lens' focusing ring requires that Bluetooth be turned on and the phone app opened. Bluetooth connection between the lens and phone is established through Phone Settings→Bluetooth→Other Devices→Select Cap Pro Lens→Enter Code 0000→Lens will now appear in My Devices (instructions for iPhone, corresponding methods would be very similar for Android and other devices). Navigate to the app and it's now possible to focus the attachment lens by swiping across the screen when in photo mode. Certain phone camera features are still functional even with an add-on lens and can be optimized through the app. For example, it may be beneficial to first focus the Cap Pro lens and then use the phone's 'tap to focus on an object' feature. This optimal order of operations may be built into the app in order to instruct operators on best photo quality methods. For example, this concept may be incorporated in the form of a tutorial mode programmed into the app that can be turned on or off. In this case, when the app is opened and photo mode selected, a notification may appear instructing operator to 'focus Cap Pro Lens.' Upon completion, it may then instruct operator to 'tap object to focus' followed by 'take photo.' In enabling operators to turn this feature off and on, it may provide novice operators with a better understanding of best photo methods while experienced operators may not require such a feature. Alternatively, there may also be a link within the app that takes operators to a written list of "Best Photo Practices."

As shown in FIG. 3.2, each Cap Pro lens may be accompanied by a fitted faux leather lens case equipped with a belt clip 3.2a. The case may be comprised of a cap 3.2f that connects, via button snap mechanism 3.2b, 3.2e and elastic strap 3.2d, to the main body with belt clip 3.2a. Padding and/or felt may line the entire interior 3.2c where the cap may also have padding for the lens. When the female button snap mechanism 3.2b attaches to the faux leather tab with male button snap 3.2e, the two halves will fasten together for safe lens transport. Unsnap the cap and lens is ready for quick and convenient use.

In one embodiment of the present invention, a cell phone with the Cap Pro skin on slides down (from the top, camera hole end of case) perfectly into the Cap Pro case (see, e.g., FIG. 5.2 at 5.2d, and FIG. 6.1) and connects to the internal electrical port (henceforth, the term internal electrical port will refer to the male lightning for Apple™, micro USB for Samsung™, USB-C for Google™ and LG™, or any future phone connection ports inside the case). Padding at the base of insertion point (see, e.g., FIG. 6.2 at 6.2i, FIG. 9.1a) fits perfectly into 2.1a (see FIG. 2.1). Once the phone is in place, the logo screw (see, e.g., FIG. 5.1 at 5.1b) is used to fasten phone in perfect positioning relative to the lens. The logo screw (see, e.g., FIG. 5.1 at 5.1b, FIG. 5.2 at 5.2b, FIG. 6.2 at 6.2h, FIG. 9.1 at 9.1b, FIG. 9.2 at 9.2c) with circular metal pad (see, e.g., FIG. 6.2 at 6.2f, FIG. 9.2 at 9.2b) on the phone side locks skin in place at 2.1b (see FIG. 2.1). Circular metal pad attached to logo screw fits perfectly into sunken logo on skin. Operator screws logo to the right to tighten and left to loosen (when looking at the case as is in FIG. 5.1). The same logo screw may be used for the Cap Pro vehicle mounting case architecture. When the phone is tightened into place by the logo screw, skin will act as a bumper that prevents markings on the phone (see, e.g., FIG. 6.1 at 6.1f). In preferred embodiments, skin and phone line up with the case, so that the phone and case do not make contact (see, e.g., FIG. 6.1 at 6.1d, FIG. 9.2 at 9.2a). This would prevent scratching of the phone screen. The Cap Pro case's ventilation holes (see, e.g., FIG. 5.1 at 5.1a, FIG. 5.2 at 5.2a, FIG. 6.1 at 6.1e) are perforations on the side of the casing that line up with holes in the skin (see FIG. 2.1 at 2.1d) allowing heat to dissipate.

In one embodiment, a cell phone may be inserted into the Cap Pro case without the use of a skin, and connect to the internal electrical port. In this embodiment, the Cap Pro case may include ventilation holes (see, e.g., FIG. 5.1 at 5.1a, FIG. 5.2 at 5.2a, FIG. 6.1 at 6.1e) on the side of the casing to allow heat to dissipate. Different architectures can be used to affix the phone (mechanically and/or electrically) to the case. For example, the cell phone (with or without skin) may be configured to slide into the electronic half of the case and connect to the internal electrical port. The other case half may then attach to the electronic portion and keep the phone in place relative to the lens. By way of another example, a cell phone may slide into a casing made of a thin metal, metal alloy or any other analogous material. In this example, the external architecture may be constructed using one piece of such material with a hinged clip-on edge at the top of the phone, when in casing.

In certain embodiments of the present invention, the Cap Pro case may be able to attach to the multifunctional tripod, pivot, tripod adapter and more Cap Pro accessories via three female screw insertion points (see, e.g., FIG. 5.1 at 5.1c, FIG. 5.2 at 5.2c, FIG. 6.1 6.1a). The left-handed screw insertion point (see FIG. 5.1 at 5.1c) would allow left-handed operators to grip the multifunctional tripod, or handle, using their left hand and focus the lens with their right. Similarly, the right-handed screw insertion point (see FIG. 5.2 at 5.2c) will enable operators to grip with their right and focus lens with their left hand, as any standard camera body would. The central screw insertion point (see FIG. 6.1 at 6.1a) may be designed with the intention of vertical photo taking. All screw insertion points (see, e.g., FIG. 8.1 at 8.1a-c, FIG. 8.2 at 8.2a-c, FIG. 5.1 at 5.1c, FIG. 5.2 at 5.2c) on the case can be used for recharging accessories with compatible charging capabilities, when case is connected to a power source (as a charging dock) or when specific battery option is selected within the app. As shown in FIGS. 8.1 and 8.2, the female screw insertion points 8.1a, 8.1c will be accompanied by male brackets 8.1b that are designed to fit into the female bracketing 8.2a on each male insertion screw 8.2b, 8.2c for accessories. When the screw and insert are lined up, the accessory will turn to the right into the casing. Once the accessory is in position, the interior brackets will touch and the accessory will be flush with exterior casing (as illustrated in 21.1c). To unscrew, turn accessory to the left until it detaches from case.

All Cap Pro screws and female screw insertion points will preferably have the same UNC thread dimensions, enabling all Cap Pro thread screws to fit all Cap Pro insertion points. This will enable the Cap Pro remote and/or pivot to be affixed to the Cap Pro case. In order for screw ports both male and female to be used as charging ports for accessories, wiring and sensors will exist to accommodate such a feature. Wiring will exist inside the case and compatible accessory attached via screw port. Electronic sensors on the male and female components will make contact, whenever the accessory is in position. This will allow for the transmission of battery charge. From a wiring standpoint, the case will have wires connecting the female insertion point sensors to both the rechargeable battery and the external electrical port. This port will then be useful as a battery booster and for charging dock purposes. The wiring required for the accessories will connect the accessory's battery to the male screw insert sensor. Additionally, in order for the Cap Pro remote to be directly wired into the case and function without Bluetooth or battery charge, wiring will be incorporated into both the case and remote to accommodate such a feature. Pertaining to the female insertion point sensors, wiring will connect sensor mechanism with the internal electrical port, in addition to the individual existing rechargeable battery and external electrical port wiring. In this instance, the remote's button press mechanism will be able to draw power from either the case or cell phone and therefore function in the absence of battery charge. When screwed into place, the corresponding male and female screw sensors will make contact and allow for signal transmission from the remote's button press mechanism to the phone app, via wiring to the internal electrical port.

As shown in FIG. 5.1, the Cap Pro case may have a built-in flash 5.1*d* and lens-mounting ring 5.1*e* at the case's camera hole 5.1*f*. In certain embodiments, the lens-mounting ring (see FIGS. 4.1, 4.2) may fit through the inside of camera hole 5.1*f* (in the same way it fits into 2.2*c*) and will attach to the lens on the outside of the case. As shown in FIGS. 6.1 and 6.2, the case will allow access to full phone functionality including home button 6.1*b*, touch screen 6.1*c* and side buttons 6.1*d*, 6.1*f*. The case's exterior architecture may incorporate a high-speed Mini-HDMI port 6.2*a*, Micro SD card reader 6.2*b*, internal 6.2*g* and external 6.2*d* electrical ports. Again, this same internal electrical port may plug directly in when phone is inserted and in place. Directly above 6.2*c* and 6.2*d* may be small perforations, or one larger hole, that will allow access to the phone's speaker while in the case. The perforations will extend through the case and line up with corresponding speaker holes on the smartphone. Neck strap loops (similar to those illustrated in FIG. 17.1 at 17.1*f*) may be added to the case's exterior design.

The case's internal architecture will comprise various electronic components. As shown in FIGS. 6.1 and 6.2, these internal mechanisms may include hardware in the form of a Bluetooth chip 6.2*c*, a Wi-Fi chip 6.2*e*, wiring for flash, wiring for external and internal electrical ports, wiring for the screw charging ports 8.1*a*, 8.1*c*, high-speed mini-HDMI components and micro SD card reader hardware all individually wired to rechargeable battery. Using a multi-wire connector terminal, any Cap Pro internal component with multiple inputs and outputs will be connected via wiring and connector terminal. In the case of the flash, external electrical port, battery, HDMI and SD card reader, wiring into the internal electrical port may exist. These wires may enable the case's internal mechanisms to interact with the phone. It should be appreciated that the case may include additional components. For example, the case may include both a micro SD card reader and an internal hard drive, which may require wiring to enable interaction with the phone. Additionally, a GPS positioning chip for a Locate Case feature would also involve wiring to more than one internal component.

The Bluetooth hardware should allow the phone, case, and accessories to all interact. The Wi-Fi hardware may provide for optimal interaction with the phone app. The micro SD card reader may provide backup storage for phone photos. Additionally, photos from a digital camera micro SD card may be accessed, cropped and transferred through the phone app, when SD is inserted into case. The external electrical port may be used to charge the case battery, as a charging dock for phone and accessories, and/or for connecting case to a computer. The internal electrical port may send signals and battery charge to the phone. The mini-HDMI may allow the case to be plugged directly into a TV for viewing photos and/or content stored on any memory device.

For the cases, and all accessories equipped with Bluetooth hardware, wirelessly connecting to the phone would be no different than any other Bluetooth device. It would simply involve pairing the devices through Bluetooth phone settings. Instructions for iPhone iOS operators would be to, navigate to Phone Settings→Bluetooth→Other Devices-→Select Cap Pro Case→Enter Code 0000. The case will now appear in list of My Devices and will display Connected to the right of the name. For the cases equipped with Wi-Fi hardware, connecting to the phone would be the same as any device utilizing a Wi-Fi access point. It would simply involve pairing the devices through Wi-Fi phone settings. Instructions for iPhone operators would be to, navigate to Phone Settings→Wi-Fi→Choose a Network→Cap Pro Case. The case would now appear under Wi-Fi with a blue check in front of the name. Instructions for Android and other phone operating systems, while quite similar, would require slightly different steps.

Figure 1:
FIG. 1 depicts the Capture Professional ("Cap Pro") Photography™ logo, which, in one embodiment of the present invention, functions to mechanically affix (or lock) a Cap Pro case to a cellular telephone, such as a smartphone.
Figure 7:
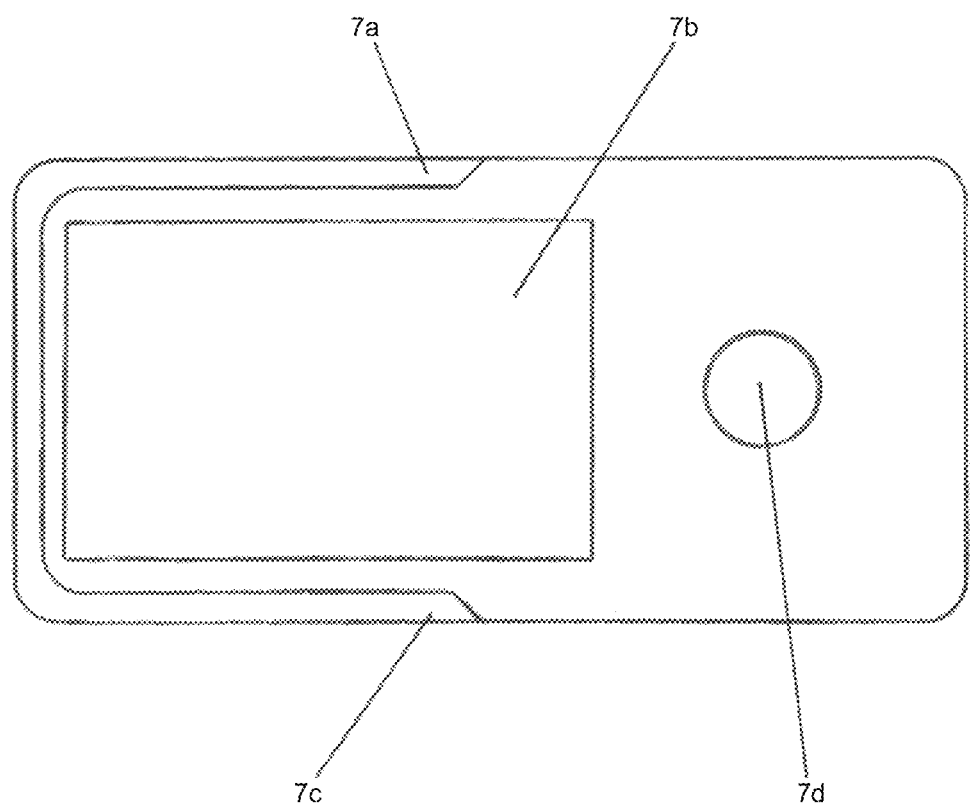
FIG. 7 depicts the interior architecture a Cap Pro case in accordance with one embodiment of the present invention, where the case can be used (at least in part) to wireless charge a cellular telephone, such as a smartphone.

As shown in FIG. 7, a Samsung Galaxy™ S7 and S8 wireless charging pad 7*b* may be used. Future phone makes and models that incorporate wireless charging capabilities will be accommodated. All exterior case features 7*a*, 7*c* would be identical to Cap Pro for Samsung Galaxy™ including an internal micro USB port and all other connectivity ports. Additional internal wiring will be required to connect the wireless charging pad to the case's battery and external electrical port. When used as a charging dock, the phone would not need to be all the way in the case to charge on the wireless dock. Exterior architecture will be designed to allow the phone to lay perpendicular on the flat case to charge. Camera hole 7*d* could be positioned anywhere depending upon future phone camera placement.

In one embodiment of the present invention, a thermometer or heat sensor may be built into the Cap Pro case. It may be located centrally and may be flush with the inside of the case. Additional internal wiring may be required to connect heat sensor mechanism with the internal electrical port. The phone and/or case may automatically shut down, or with the addition of app software, operator may be sent a phone notification indicating the internal temperature has reached a predetermined level. Operator may then be instructed to remove phone from case and power-down the phone and/or case. This may ultimately prevent the case and/or phone from overheating internally and any corresponding damage to hardware.

In accordance with another embodiment of the present invention, the Cap Pro hard drive (HD) case may feature both a micro SD card reader and an internal hard drive for memory storage. In this embodiment, the Bluetooth, Wi-Fi, rechargeable battery, mini-HDMI, micro SD reader and the camera hole may remain. This may simply demand that the overall size of the casing body be expanded in order to accommodate more internal hardware, in particular the thickness. In this embodiment, additional wiring may be required for internal hard drive connections enabling interaction with the battery, the phone and other case hardware. Additional app software may be required in order to access and manage storage of hard drive files. The micro SD card slot enables interaction with existing camera storage equipment. The internal hard drive will be able to store files of any type. This hard drive may be accessible through the app and may be used to backup the phone itself, or store photos, music, movies, shows and more. The internal hard drives may come in multiple sizes (e.g., 500 Gigabyte, 1 Terabyte, etc.), which again means that the larger drive may require a larger housing. In reference to the drive, larger refers to both storage capacity and physical size. Password protection for hard drive files may be a feature of the Cap Pro HD case. In this embodiment, stored movies or music can be accessed through the app and played on phone, streamed or mirrored on various TV devices (i.e., Apple TV™, Google Chromecast™, etc.), or accessed through a direct line to the TV via mini-HDMI port controlled by phone app. The case's external electrical port may provide a hardwired method of transferring files from a computer to the hard drive via wiring. Wireless components may provide an alternative method for moving files onto the internal drive. Wireless transfer may require internal wiring connecting the storage and connectivity devices.

As shown in FIGS. 10.1-10.4 and 11.1-11.4, the Cap Pro multifunctional tripod may come in one piece (see FIG. 10.4) and may have three distinct features. The Cap Pro handle (see FIG. 10.4) can take vertical or horizontal photos through the button press mechanism 10.4a, 11.1b when screw 10.1b, 10.3a, 10.4b is connected to case and remote is paired to phone through Bluetooth settings. The button press mechanism may work in the same way as the Wireless Beats by Dre™ headphone volume control operates. The Bluetooth component 11.1a may send a signal from the button press sensor 11.1b to the phone instructing it to take photo. The rechargeable battery 11.1d will be used to power the Bluetooth and button press mechanisms. As shown in FIGS. 8.1, 8.2, 10.4, the male bracket on case 8.1b fits into female bracket 8.2a, 10.4c on handle as the screw is turned into place. When the screw and insert point are lined up, turning handle to the right moves the male and female brackets closer together until they touch and are in place (see, e.g., FIG. 21.1 at 21.1c). Turning handle to the left will separate the brackets and will detach handle from case. All Cap Pro accessory screws and case inserts will work in this same manner 8.1, 8.2, 21.1c. The multifunctional tripod may be made using hard plastic, rubber, metal, electronic components and any other analogous materials.

The Cap Pro tripod legs (see FIGS. 10.1 at 10.1a, FIG. 10.2 at 10.2a, FIG. 10.3 at 10.3c) can be opened up and used as a fixed tripod (with some horizontal movement). As shown in FIGS. 13.1-13.4, three leg extensions can be screwed into the base of the tripod leg (see FIG. 10.4 at 10.4d) to increase the height and stability of tripod set-up. The leg extensions will be comprised of a Cap Pro thread screw 13.1d with female bracket 13.1c, leg and weighted leg sleeve 13.1b. Three tripod shoes 13.2a fit 13.2b at the base of the tripod leg (see FIG. 10.4 at 10.4d, as illustrated in FIG. 13.3) and the leg extensions 13.1a. The shoes are intended to increase stability and grip for tripod surfaces.

As shown in FIGS. 10.1-10.4 and 11.1-11.4, the Cap Pro remote can then be removed from the tripod leg and used to take photos from anywhere within Bluetooth range, when connected through phone settings. Two tracks 10.1c, 10.3b run down tripod leg 10.2a and fit into corresponding grooves 10.2b on the remote. Spring mechanism 11.1c, 11.3 at the base of the remote fits into slot 10.3d on tripod leg 10.2a to keep it in place. This spring mechanism housing 11.4 has, fitting through it, a second piece 11.4 and two springs 11.3a. The distal end of this second piece enters 10.3d and holds the remote in place vertically when on tripod leg. To release remote from tripod leg, pull the tab 11.3c, 11.4a and slide remote off. When tab is pulled, springs will contract, tab exits 10.3d and remote slides along track until it can be separated.

The remote's internal and external architecture may comprise various electronic components. Internal battery, button press mechanism and Bluetooth chip, as well as, external electrical port 10.2c and screw insertion point 10.1b, 10.3a may all require individual wires in order to connect the different machinery. The Bluetooth component and button press may be powered by the battery, and thus require wiring between them. In order for Bluetooth to send button press signal to the phone, the Bluetooth and button press sensor would need to be connected via wiring. The external electrical port and screw insert will be wired to the battery for recharging purposes. Those skilled in the art will appreciate that waterproofing of and fingerprint identification on Bluetooth remotes may be useful applications for implementation.

As shown in FIGS. 12.1-12.2 and 13.1-13.4, the Cap Pro tripod pivot may be able to function manually and via battery operated Bluetooth and motorized components. The pivot may involve a ball mechanism and wheels that can move the phone in all directions when mounted to tripod. Manual operation will be optimized using the pivot arm 13.4, allowing improved ease of use. The Bluetooth wireless feature will require pairing a separate device and the pivot through Bluetooth settings and the app, which will result in remote operation of the motorized components. The pivot design is intended to function like a baby monitor that can be controlled remotely, via separate or third device connected through the app. This third device may be another phone, tablet or computer. The pivot itself may be paired to this third device using Bluetooth, and not the Cap Pro phone, provided the third device has the app installed and opened (henceforth, the term Cap Pro phone will refer to the phone physically attached to the Cap Pro case). Additionally, this third device may connect to the Cap Pro phone being used, via Wi-Fi, and therefore be able to take photos on said phone remotely and wirelessly. The resulting accessory may be a remote-controlled tripod and camera setup (as illustrated in FIG. 13.3).

Movement of the pivot's internal wheels 12.1f, and by extension the ball mechanism 12.1a, may be controlled by two or more motors 12.2a with forward and reversing capabilities. The motors' forward and reverse functionality allows for maximum rotation, which is powered by a rechargeable battery 12.2e. Positioning of motors and wheels will allow for increased movement around the environment. One motor will control the central wheel, while the other motors control peripheral wheels. A Bluetooth hardware chip 12.2f may enable a signal to be sent to and from the phone via the app (also powered by 12.2e). The internal compartment 12.2c may house all of the electronic hardware. It should be appreciated that, Wi-Fi or any other connectivity mechanism could be utilized internally for optimal performance.

The pivot's internal and external architecture will comprise various electronic components. Internal battery, Bluetooth chip, and motors, as well as, external electrical port 12.1d, 12.2d may all require wiring in order to connect the different machinery. The motors and Bluetooth components will be powered by the battery, and thus require wiring between them. Similarly, the external electrical port may be wired to the battery for recharging purposes. Bluetooth and motor may be wired together in order to receive signal from device and operate motor based upon signaling. The motors may be connected to the wheel bracketing and wheel axles in order to spin wheels forward and backwards therefore moving the ball. From another device, the tripod pivot, and any Cap Pro case attached to it, may be moved around and photos will be taken remotely within wireless connection range.

The pivot's internal and external architecture may feature a hexagon neck 12.1b built into the ball mechanism. Neck may be screwed into or alternatively, welded into ball. At the end of the neck may be a Cap Pro thread screw 12.2b. To use the pivot arm, place the pivot arm opening 13.4c over Cap Pro thread screw and slide down into place. The pivot arm opening will preferably match the shape of the neck (could alternatively be triangular, hexagonal design not required). For manual use, pivot arm will need to be in place prior to attaching Cap Pro case. The pivot arm may be made up of the attachment head 13.4c, the neck 13.4b and grip 13.4a. The pivot's Cap Pro thread screw will preferably line up with and screw into any Cap Pro case's female insertion points. Additionally, the pivot's female screw insertion point 12.1e will fit any corresponding Cap Pro screw. In this case, the insertion point will be intended for use with the Cap Pro tripod or Cap Pro tripod adapter. Exterior features of the pivoting case may also include rubber stoppers 12.1c that help keep the phone in place both vertically and horizontally. The vertical stoppers may also serve to slow the pivot mechanism when transitioning from vertical to horizontal phone orientation.

As shown in FIGS. 14.1 and 14.2, Cap Pro case packaging 14.1 may recreate a box of Chinese medicine balls with a string and pin 14.1c, loop 14.1a and three opening edges 14.1d. Packaging may be made out of 100% recycled hard cardboard with wooden crate design and Cap Pro logo printed on 14.1b. The back of the box may specify which phone model the case is for, as well as, the colors of the case and skin. When the pin and string are removed from the loop holster, the box can be opened. Inside may be the faux leather Cap Pro carry case 14.2, the exterior of which features a handle 14.2b, zipper 14.2c and storage pocket 14.2e. The handle of the carry case is fastened to a metal loop, the other end of which is affixed to a faux leather strap sewn into case 14.2a. The zipper slider 14.2f may be used to open and close the case. A Velcro lid (or other fastening mechanism, e.g., button snap) for storage pocket 14.2d access will allow for storage of phone itself or additional SD cards, wallet, keys, etc.

Figure 15:
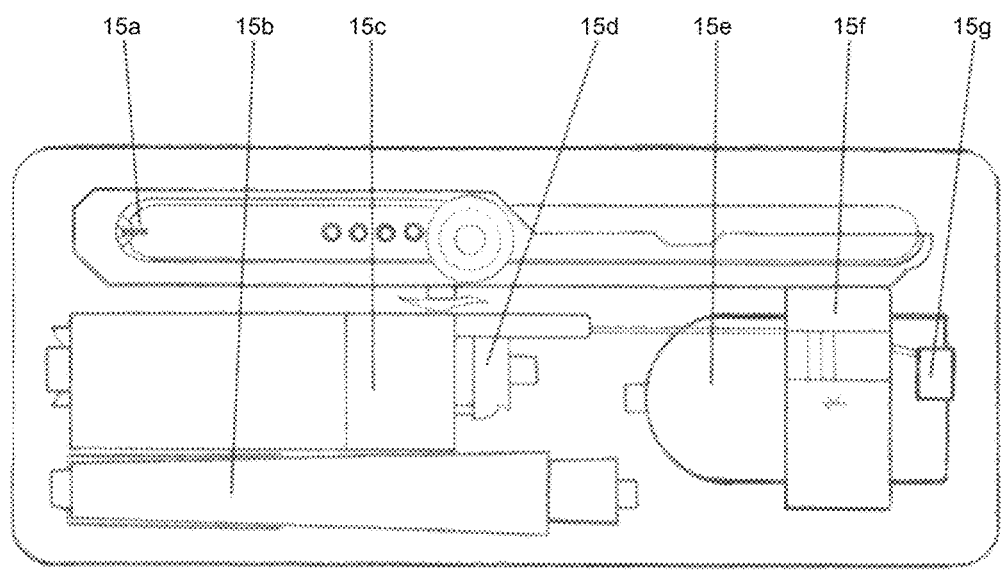
FIG. 15 provides an exemplary internal, side view of a carrying case, such as the one depicted in FIG. 14.2.
Figure 16:
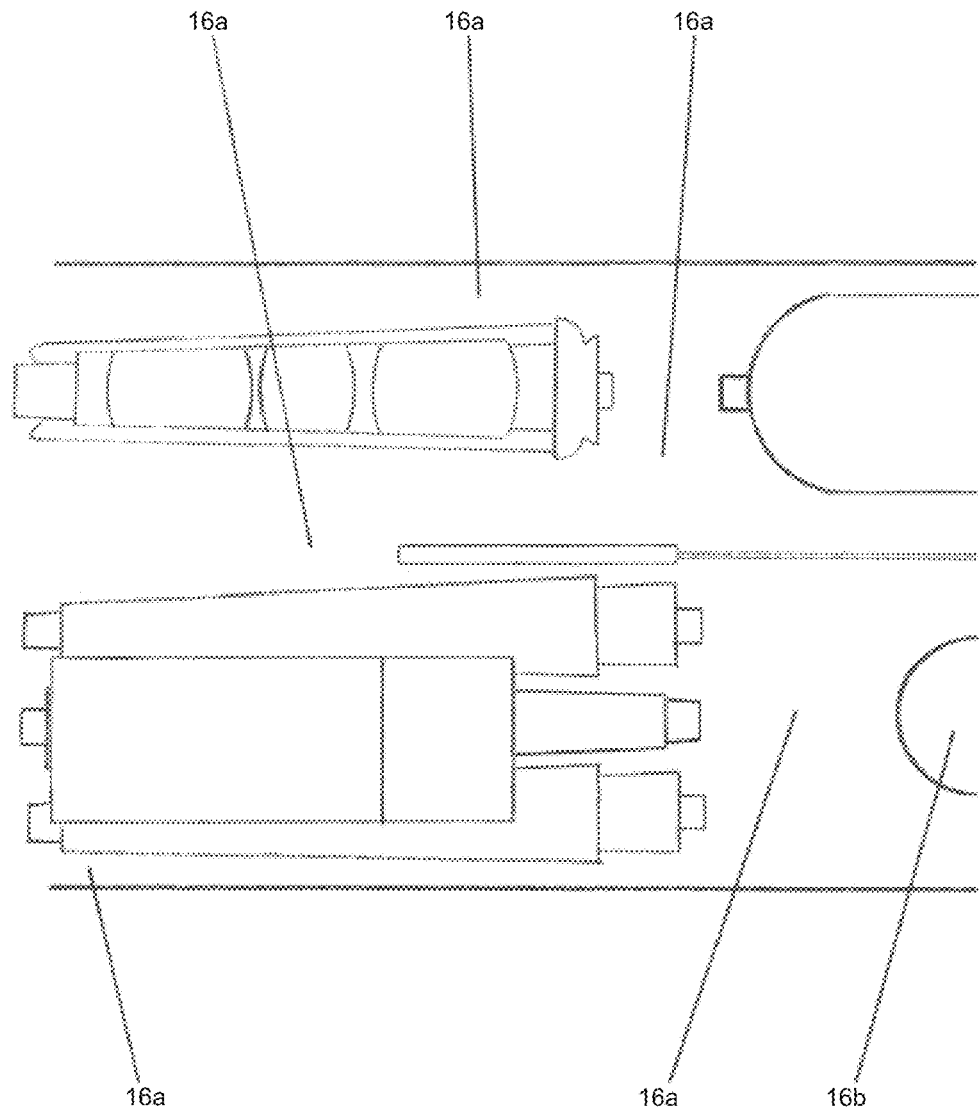
FIG. 16 provides an exemplary internal, top view of a carrying case, such as the one depicted in FIG. 14.2.

As shown in FIG. 15, when the carry case is opened up, the Cap Pro case with skin inside 15a may be the first items to appear for easy access. Once phone case is removed, the lens 15f may already be attached. Next to appear out of the carry case may be the lens case 15c, multifunctional tripod 15d, pivot 15e, pivot arm 15g and finally the three tripod extension legs 15b. Inside the lens case may be the lens-mounting ring (see FIG. 4.1 or 4.2), 4-in. micro USB to USB charging cord, three tripod shoes (see FIG. 13.2) and a lens wipe. The interior padding (see FIG. 16 at 16a) rises up for the phone case to sit on, without making contact with components below. Lens sits inside fitted hole (see FIG. 16 at 16b) for easy case access or it can be stored in the lens case 15c.

In alternate embodiments of the present invention, a cell phone with the Cap Pro skin on slides perfectly into the electronic half of the Cap Pro case and connects to the internal electrical port. Once the phone is in place, the logo locking mechanism (see FIG. 17.1 at 17.1d) will clip two halves of case together in perfect positioning relative to the lens. Then attach your handle, neck strap, and use Bluetooth settings on phone to connect remote or other compatible accessories. Skin and phone line up with the case, so that the phone and case do not make contact (see FIG. 19.1 at 19.1f). This would prevent scratching of the phone screen. Once the two halves of the case are connected, the phone is kept in place and skin acts as a bumper that prevents markings on the phone (see FIG. 6.1 at 6.1f). Various options for clipping two halves together could be utilized (see FIGS. 21.2 and 22.2). The Cap Pro case's ventilation holes (see, e.g., FIG. 5.1 at 5.1a, FIG. 5.2 at 5.2a, and FIG. 6.1 at 6.1e) are perforations in the side of the casing that line up with holes in the skin for heat dissipation. Padding at the base of insertion point (see, e.g., FIG. 6.2 at 6.2i, FIG. 9.1 at 9.1a) and internal electrical port (see, e.g., FIG. 6.2 at 6.2g) may also be used in the Cap Pro case and fit the skin (see FIG. 2.1 at 2.1a) in the same way (as illustrated in FIG. 15a).

In accordance with another embodiment of the present invention, a cell phone, without the use of a skin, slides perfectly into the two halves of the Cap Pro case and connects to the internal electrical port. In accordance with the skin-less design, padding at the base of insertion point (see FIG. 6.2 at 6.2i, FIG. 9.1 at 9.1a) and internal electrical port (see FIG. 6.2 at 6.2g) may be used in addition to added internal padding, in lieu of the skin's bumper functionality. In accordance with another embodiment of the present invention, casing design may slide over entire phone, in the form of a thicker Cap Pro case with larger camera hole. In this embodiment, the Cap Pro case may be one piece and utilize the skin and logo screw, or any other mechanism that tightens the phone in place relative to the camera hole and lens. In accordance with another embodiment, design of case may again be one piece, lock at the open edge, and be made of a thin metal (alloy or other analogous material) that houses the internal components. In accordance with the one-piece architectural designs, it would provide faster access to inserting phone and taking photos. In accordance with any embodiments of the present invention, incorporation of Climachill-type technology (Adidas™) to the interior or exterior of case (or skin in certain embodiments) may help draw heat away from phone and case. The inclusion of this sort of technology may be applied as a liner or strategically positioned near ventilation holes.

In accordance with other embodiments of the present invention, the Cap Pro case may be able to attach to the remote, pivot, tripod adapter and more Cap Pro accessories via three female screw insertion points (see FIG. 17.1 at 17.1a, 17.1c, 17.1i, as illustrated in FIG. 21.1 at 21.1c). As shown in FIG. 17.1, the left-handed screw insertion point 17.1c would allow left-handed operators to grip the remote using their left hand and focus the lens with their right. Similarly, the right-handed screw insertion point 17.1i would enable operators to grip with their right and focus lens with their left hand, as any standard camera body would. The central screw insertion point 17.1a would be designed with the intention of vertical photo taking. All screw insertion points (see, e.g., FIG. 8.1 at 8.1a-c, FIG. 8.2 at 8.2a-c, and FIG. 17.1 at 17.1a, 17.1c, 17.1i) on the case may be used for recharging accessories with compatible charging capabilities, when case is connected to a power source (as a charging dock) or when specific battery option is selected within the app. As shown in FIGS. 8.1 at 8.2, the female screw insertion points 8.1a, 8.1c will be accompanied by male brackets 8.1b that are designed to fit into the female bracketing 8.2a on each male insertion screw 8.2b, 8.2c for accessories. When the screw and insert are lined up, the accessory will turn to the right into the casing. Once the accessory is in position, the interior brackets will touch and the accessory will be flush with exterior casing (as illustrated in FIG. 21.1 at 21.1c). To unscrew, turn accessory to the left until it detaches from case. All screws and female inserts would preferably have the same UNC thread dimensions, enabling all Cap Pro thread screws to fit any Cap Pro insertion points.

As shown in FIG. 17.1, the exterior architecture may also include a left-handed shutter release 17.1g (see also FIG. 28.1 at 28.1a), standard shutter release 17.1b, manual access to phone's shutter release 17.1j, lens-mounting ring hole 17.1e (see also FIG. 28.1 at 28.1d), camera hole 17.1k and neck strap loops 17.1f. A flash 17.1h, micro SD card reader (see FIG. 19.1 at 19.1a), mini HDMI (see FIG. 19.1 at 19.1b), and an internal electrical port (see FIG. 19.1 at 19.1c), in this case lightning, may additionally be incorporated in the architecture. The design provides access to full phone functionality including home button, reverse camera, touch screen 17.2*a*, 17.2*b*, 17.2*d* and the manual shutter release. The built-in shutter release buttons may operate in the same manner as the button press mechanisms in the Cap Pro remotes. Additionally, button press sensor may be individually wired directly to the phone using the interior electrical port, wired to the Bluetooth component and wired to the case's battery. This would allow for a signal to be sent wirelessly and hardwired through the case to the phone app. Both shutter release buttons could be used on the Cap Pro Case, provided additional wiring is added to the interior housing to accommodate such a feature. Additionally, the neck strap loops featured could allow for maximized utilization of camera equipment. The Cap Pro case may have four loops that accommodate right-handed, left-handed and vertical orientation of phone with any neck strap.

The Cap Pro case's ventilation holes (see FIG. 5.1 at 5.1*a*, 5.2*a*, and FIG. 6.1 at 6.1*e*) are perforations in the side of the casing that allow heat to dissipate. The case features small perforations, or one larger hole (directly above 6.2*c* and 6.2*d* in FIG. 6.2), that allow access to the phone's speaker while in the case. On one side of the central female insert (see FIG. 17.1 at 17.1*a*), these perforations enable access to the speaker and have the dual purpose of allowing heat to escape. The perforations may extend through the case and line up with corresponding speaker holes on the iPhone 6, 6 Plus, 6s, 6s Plus, 7 and 7 Plus, Samsung Galaxy™ S7, S8, etc. It should be appreciated that speaker perforations can be moved anywhere on case to accommodate positioning of phone speakers.

The case's internal architecture may comprise various electronic components. These internal mechanisms include hardware in the form of a Bluetooth chip, a Wi-Fi chip, wiring for flash, wiring for external and internal electrical ports, wiring for the screw charging ports (see FIG. 8.1 at 8.1*a*, 8.1*c*), wiring for the two shutter release button press mechanism, high-speed mini-HDMI output and micro SD card reader hardware, all individually wired to rechargeable battery. In the case of the flash, external electrical port, shutter releases, battery, HDMI and SD reader, additional wiring to the internal electrical port may exist. These wires would enable the case's internal mechanisms to interact with the phone app.

The Wi-Fi network created by the case enables interaction with the phone and by extension the app. This Wi-Fi access point does not require a home Wi-Fi or Internet connection to function. Bluetooth capabilities allow for increased connectivity between phone, case and accessories. The micro SD card reader may allow added storage capacity and the ability to access digital camera photos from SD reader using the app. An internal hard drive for added storage may be added, in accordance with one embodiment of the present invention. A high-speed mini-HDMI port may provide easy connectivity to any HDTV. A flash for use in low-light situations and environments may be hardwired to the phone for app communication. The rechargeable battery can serve multiple functions, all controllable from within app settings. For example, it can be used to power the internal case components and be used as a battery booster for phone and compatible accessories. Various options may exist within the app that controls the case's battery charge usage. An external electrical port for charging of the case battery, for using the case as a charging dock, or for connecting your case to a computer may be built in. An internal electrical port, to connect case with phone via hardwiring and as one component of the charging dock may also be utilized.

As shown in FIGS. 18.1-18.3, the Cap Pro lens-mounting ring adapter is an essential component for the utilization of existing camera equipment. Lens adapters can be made for Cannon™ 18.1, 28.1*f,* Minolta™ 18.2, 28.1*f,* Nikon™, Leica™, Fujifilm™ Olympus™, Panasonic™, Sony™, Bell & Howell™ and more. Mounting rings may be made of either hard plastic, metal, some combination of or another analogous material. Three pins 18.1*b*, 18.2*b*, 18.3*a* fit into three corresponding holes on the interior of the case. The inner ring 18.3*b*, 18.3*c* fits through lens-mounting ring hole (see FIG. 17.1 at 17.1*e*, FIG. 19.2 at 19.2*a*). The number of pins on the mounting ring could be increased and design not limited by number of pins used in this example. The lens-mounting ring is kept in place by the three pins fitted to holes in casing and the flat outer ring 18.1*a*, 18.2*c*, 18.3*d*. The proper lens would then attach to the mounting ring on the exterior of the Cap Pro case, using clip in mechanisms 18.1*c*, 18.2*a*. In accordance with another embodiment of the present invention, the lens-mounting ring may be built into casing. While this would restrict the flexibility and variability of being able to switch between different mounting rings, it aims to provide more stability to the casing. In accordance with the two-piece Cap Pro designs, the non-electronic lens-attaching half of the case may be treated as the lens-mounting ring and made for different camera lens manufacturers.

The Cap Pro logo locking mechanism (see, e.g., FIG. 17.1 at 17.1*d*, FIG. 19.1 at 19.1*d*) may be used to lock two halves of the Cap Pro case together, in accordance with multiple embodiments of the present invention. As shown in FIGS. 19.1 and 19.2, the locking mechanism metal bracketing and exit hole 19.1*e* compartment may house the spindle, lock pin, spring mechanism, spindle bracketing and logo handle. The female locking mechanism bracketing 19.2*b* and entry hole 19.2*c* may be located on the other half of the Cap Pro case.

As shown in FIGS. 20.1-20.3, the spindle bracketing 20.2 is welded into locking mechanism bracketing and has two main components. The lower bracket 20.1*d*, 20.2*c* with solid bottom 20.2*d* keeps the base of the spindle 20.1*a*, 20.3*h* in position 20.1*d* horizontally and at the solid bottom. The upper bracket 20.1 *b*, 20.2*a* has a hole that the spindle fits through. This hole is accompanied by a lip 20.2*b*, for which the top of spring 20.1*c*, 20.3*d* rests on the interior of bracketing (as illustrated in FIG. 20.1*b*). The spindle has going through it the lock pin 20.1*e*, 20.3*c*, 20.3*f* and around it the spring, which rests on the internal lip of 20.2*b*. The bottom of spring 20.1*c* rests on the top of lock pin.

A main component is the spindle, the base of which is kept in place by the lower bracket. In one embodiment, the top half of the spindle is fixed in place horizontally by the upper bracket and kept in place vertically via the spring and lock pin. As the logo handle (see FIG. 17.1 at 17.1*d*, FIG. 19.1 at 19.1*d*) at the top of the spindle is pulled out and away from case, the tightly wound spring contracts further and eventually lock pin hits the top of locking mechanism bracketing and prevents spindle from being pulled further. The lock pin makes contact with bracketing before the bottom of spindle rises above vertical rim of 20.2*c*. When unlocked (as illustrated by 20.3*f*), the logo handle turns to the right forcing lock pin out of exit hole 20.3*e* and into entry hole 20.3*a* on the other half of the Cap Pro case. As the spindle continues to spin right, the lock pin makes contact with exit hole lip 20.3*g* forcing it up vertically and the spring to contract further. Lock pin remains in this elevated position as it continues to turn to the right and over entry hole lip (see FIG. 19.2 at 19.2*d*, FIG. 20.3 at 20.3*b*). When the lock pin reaches the far edge of lip 20.3*b*, the spring will expand and snap the pin down into its locked position (see FIG. 19.2 at 19.2*e*, as illustrated at 20.3*c*). At this point, the design of spring, spindle, lock pin, entry lip and locking mechanism brackets keep the two halves of Cap Pro case locked together. To unlock the case, pull the logo handle up until it reaches its maximum height (determined by bracketing) and turn left. Lock pin remains in this elevated position until exit hole lip 20.3*g*, at which point the spring will expand forcing lock pin down into exit hole. Continue to turn logo handle to the left until in position 20.3*f* and the two halves of Cap Pro case come apart. This locking mechanism is neither required nor is it exclusively applicable to the Apple iPhone™ Cap Pro case.

In accordance with one embodiment of the present invention, a Google Pixel™ version will exist. A Google Pixel™ phone with the Cap Pro skin on slides perfectly into the electronic half of the Cap Pro for Pixel case and connects to the internal electrical port. In this embodiment, the internal and external electrical ports may be USB-C. Cap Pro for Google Pixel™ (see FIG. 21.1) may feature Bluetooth and Wi-Fi for connectivity, micro SD card reader (and internal hard drive) for storage, a rechargeable battery and a flash. External electrical USB-C port (as illustrated in FIG. 19.1 at 19.1*c*, or any future wired connection mechanism) is for charging of the case battery, for using the case as a charging dock, or for connecting your case to a computer. The USB-C internal electrical port (as illustrated in FIG. 6.2 at 6.2*g*) may be built in order to connect case with phone and for use as a component of the charging dock. As with all versions of the Cap Pro case, the Pixel version may have a flash (see FIG. 21.1 at 21.1*a*), ventilation holes (see FIG. 21.1 at 21.1*b*), male brackets to accompany female insertion points (as illustrated in FIG. 21.1 at 21.1*c*), neck strap loops, shutter releases, camera hole, lens-mounting ring adaptability and any feature associated with another embodiment of the present invention.

In accordance with an embodiment of the present invention, as shown in FIGS. 21.1 and 21.2, the electronic half of case 21.2*a* clips into the lens-mounting half of case 21.2*f*, via a button press to release mechanism 21.2. The two clip-in necks 21.2*e* feature angled lips 21.2*b*. When inserted into entry hole 21.2*c*, the two halves eventually clip together when lips reach final locked position. The button press release 21.1*d*, 21.2*d* is used to unlock the clip-in mechanism. As pressure is applied (to points 21.1*d* and 21.2*d*), the angled lip will be forced out of its locked position and the two halves of the Cap Pro case will separate. This clip-in mechanism is neither required nor is it exclusively applicable to the Google Pixel™ Cap Pro case.

In accordance with one embodiment of the present invention, a Samsung Galaxy™ version of the Cap Pro case will exist. A Samsung Galaxy™ phone with the Cap Pro skin on slides perfectly into the electronic half of the Cap Pro for Galaxy case and connects to the internal electrical port. In this embodiment, the internal and external electrical ports may be micro USB. Cap Pro for Samsung Galaxy™ S7 and S8 may feature Bluetooth and Wi-Fi for connectivity, micro SD card reader (and internal hard drive for storage), a rechargeable battery and a flash. External electrical Micro USB port (as illustrated in FIG. 19.1 at 19.1*c*, or any future wired connection mechanism) for charging of the case battery, for using the case as a charging dock, or for connecting your case to a computer may be built into exterior casing. Micro USB internal electrical port and wireless charging pad capabilities may exist on the external architecture of case, in order to connect case with phone and for use as a component of the charging dock. As with other versions of the Cap Pro case, as shown in FIG. 22.1, the Galaxy version may have a flash 22.1*e*, ventilation holes 21.1*b*, male brackets to accompany female insertion points 21.1*c*, neck strap loops, shutter releases, camera hole, lens-mounting ring adaptability and other features associated with present invention.

In accordance with an embodiment of the present invention, the electronic half of case will clip together with the lens-mounting half of case, via clipping mechanism 22.1*a*, 22.1*b*, 22.1*d*, 22.2. Each case half may have a rubber bumper 22.1*c*, 22.2*c* that provides padding between the cases. Lens-mounting half of case may have two metal lips 22.1*d*, 22.2*a* built into the case exterior. Similarly, the electronic half may have four metal loops 22.2*d* extending from the exterior of hard case. The number of loops, lips and by extension clips could be modified to include any number of clipping mechanisms and is not restricted to the design example of two clips. The lip on mounting half may latch onto a metal component on the other half of case 22.1*a*, 22.2*b*. Once piece 22.2*b* is placed over 22.2*a*, another metal component 22.1*b*, 22.2*e* is pulled in the direction of the electronic half of case until it snaps into place (as illustrated in FIG. 22.2). Both metal components 22.2*b*, 22.2*e* are attached to the electronic half of case via the loops 22.2*d*. In snapping 22.2*e* back into place, the two case halves will be latched together and the camera perfectly positioned for photo taking relative to lens attachment. Rubber bumpers may be required for clipping mechanism. While pulling back on 22.2*e* and before snapping into place, the two cases get closer together than the final locked position. The bumpers provide padding during this coming together of the two case halves. This clipping mechanism is neither required nor is it exclusively applicable to the Samsung Galaxy™ Cap Pro case.

Figure 23:
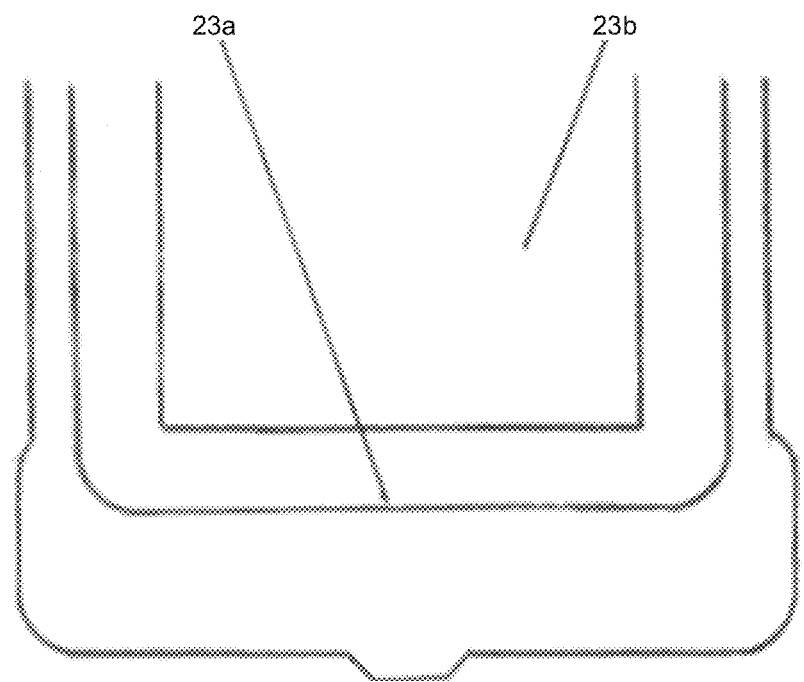
FIG. 23 depicts the interior architecture of a Cap Pro case in accordance with one embodiment of the present invention, where the case can be used (at least in part) to wireless charge a cellular telephone, such as a smartphone.

FIG. 23 shows a wireless charging Cap Pro case for Samsung Galaxy™ S7 and S8 and future phone models with wireless charging capabilities (if Apple™ or other companies incorporate this type of technology). All exterior case features would be identical to Cap Pro for Samsung, including internal electrical micro USB port (FIG. 23 at 23*a*) and all connectivity ports. The wireless charging pad (FIG. 23 at 23*b*) primarily functions as a component of the charging dock. Additional internal wiring may be required to connect the wireless charging pad to the case's battery (battery booster) and external electrical port (charging dock). When used as a charging dock, the phone may not need to be all the way in the case to charge on the wireless dock. Exterior architecture will be designed to allow the phone to lay perpendicular on the flat case to charge. If future wireless charging pads can transmit data via pad connection, other applications of the wireless case may be incorporated into the hardware and software. This may exist in the form of wiring to various ports or components and software updates to allow for future capabilities. Camera hole on casing could be positioned anywhere depending upon future phone camera placement and the wireless charging pad will accommodate such positioning.

In accordance with another embodiment of the present invention, the Cap Pro hard drive (HD) case may feature both a micro SD card reader and an internal hard drive for memory storage. In this embodiment, the Bluetooth, Wi-Fi, rechargeable battery, mini-HDMI, micro SD reader and the camera hole may all remain. This would simply demand that the overall size of the casing body be expanded in order to accommodate more internal hardware, in particular the thickness. In this embodiment, additional wiring may be required for internal hard drive connections enabling interaction with the phone and exterior ports. In particular, the hard drive may be wired to the Wi-Fi component, the mini-HDMI, internal electrical port and case battery individually in order to optimize interaction with various features of the case and app. The case's internal hard drive files may be accessible wirelessly via Wi-Fi access point created by case or via wiring to the internal electrical, HDMI, and external electrical ports. In order for hard drive usage, the case must have a power supply, which may be provided in a variety of ways. The case's battery, external electrical port plugged into wall socket via charging dock and the phone battery when connected to internal electrical port, may all be able to power the hard drive. The micro SD card slot enables interaction with existing camera storage equipment. The SD reader wiring to the internal hard drive may allow for direct transfer of SD photos to and from the drive. The internal hard drive may be able to store files of any type. This hard drive will be accessible through the app and can be used to backup the phone itself, or store photos, music, movies, TV shows and more from a computer. The internal hard drives may come in multiple sizes (e.g., 250 Gigabyte, 500 Gigabyte, 1 Terabyte, etc.), which again means that the larger drive will require a larger housing. Password protection for hard drive files may be a feature of the Cap Pro HD case. In this embodiment, stored movies or music can be accessed through the app and played on phone. Similar to the Cap Pro mounting case, auxiliary ports (see FIG. 32.1 at 32.1*b*, 32.1*i*) may be added to the exterior architecture that will allow easy headphone plug-in for use with stored audio hard drive files.

A version of the Cap Pro remote may feature Bluetooth connectivity and a button press mechanism powered by a rechargeable battery. The battery may be rechargeable via exterior electrical port or screw insertion sensor mechanisms. When connected to the phone via Bluetooth settings, the remote will be a photo-taking handle to grip, as well as, a remote-controlled shutter release that can be used anywhere within Bluetooth range. As a handle screwed on to the case, the remote may function in multiple ways. For instance, it may function via its battery and Bluetooth connection to the phone. It may additionally (or alternatively) function using the case or phone's battery, via screw sensors and internal wiring. When Cap Pro case is attached to a tripod, handle can also be used as a remote control. In this instance, operator could be in the photo while taking said photo. Remote may be made using hard plastic, rubber, metal, electronic components and any other analogous materials.

As shown in FIGS. 24.1-24.3, the exterior architecture of the remote may incorporate finger grooves 24.1*a* and an index finger button 24.1*c*, 24.3*a* designed for grip and ease of photo taking purposes. The external electrical port 24.3*b* may be used for charging the remote's battery 24.2*a*. Additional exterior features include a female bracket 24.1*b* at the male screw 24.2*b*. Male insertion screw angled such that the handle may be at an angle relative to the case body. Rather than parallel to the back of the case, as is the case with the Cap Pro multifunctional tripod, the Cap Pro remote may be fixed at a slight angle for gripping purposes when screwed into case. In physically connecting the remote and Cap Pro case, the male and female sensors touch and an electrical connection is made (see FIG. 21.1 at 21.1*c*). The top of remote screw 24.2*b* and the base of female insertion point (see FIG. 8.1 at 8.1*a*) have electrical sensors that touch when screwed in (as illustrated in FIG. 21.1 at 21.1*c*) and can transmit electrical signals.

The interior architecture may house wiring individually connecting various components that optimize the functionality of the remote. The rechargeable battery will be wired both to the exterior electrical port and the screw sensors 24.2*b* for recharging purposes. The battery may additionally be individually wired to the Bluetooth component 24.2*c* and index finger button mechanism with internal button press sensor 24.1*c*. The button press mechanism is then connected via to the Bluetooth component and screw sensor mechanism. Those skilled in the art will appreciated that waterproofing of and fingerprint identification on Bluetooth remotes may be useful applications for implementation.

Figure 25:
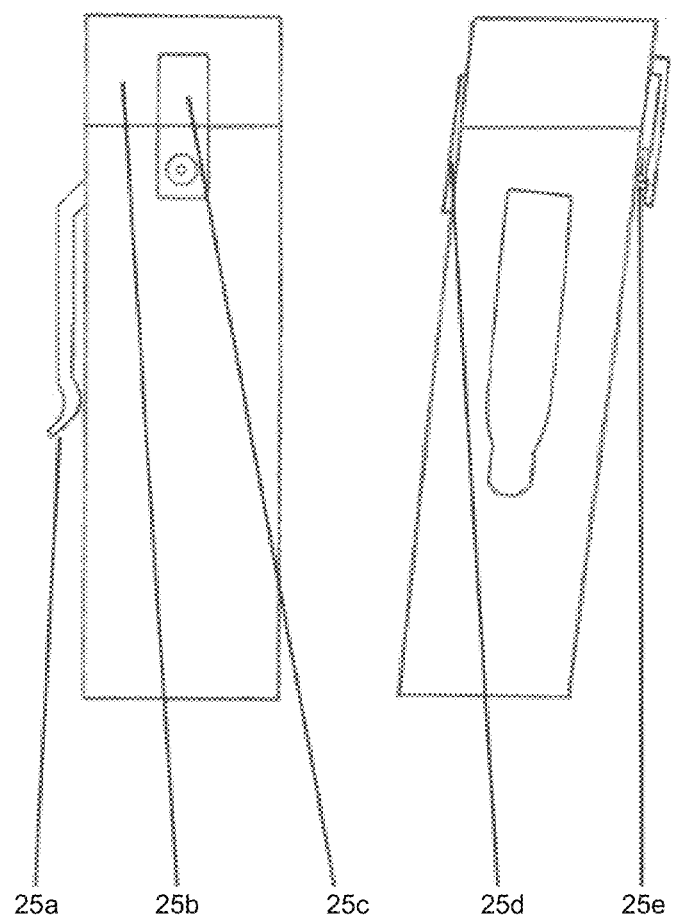
FIG. 25 depicts an exemplary case for housing a remote control, such as the one depicted in FIGS. 24.1.

As shown in FIG. 25, the remote may be accompanied by a faux leather carry case with belt clip 25*a* and internal padding. The carry case is similar in design and function to the Cap Pro lens case, although angled to fit the handle architecture. The case has a cap with internal padding 25*b*, a button snap mechanism 25*e* with male and female button ends that connect. The male button snap may be attached to a faux leather tab 25*c* connected to the cap. An elastic band attached to the cap and case 25*d* allows for fast removal of the remote without concern for where the cap will end up.

Figure 26:
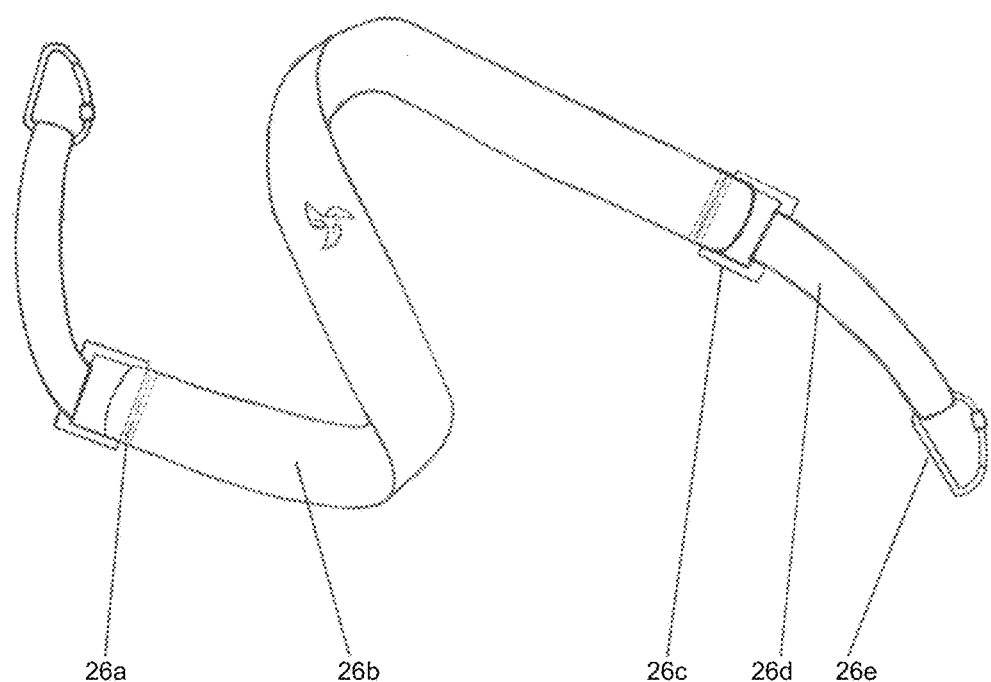
FIG. 26 depicts an exemplary neck strap for a Cap Pro case in accordance with one embodiment of the present invention.

As shown in FIG. 26, Cap Pro neck strap is for use with Cap Pro case and consists of a carabiner 26*e* that connects to neck strap loop (see FIG. 17.1 at 17.1*f*) on Cap Pro. The carabiner may be attached to a strap 26*d* and metal square connector 26*c*. The actual neck strap 26*b* portion with logo is sewn onto metal square connector 26*a*. The carabiner and square connector may be metal, while the neck strap and additional strap could be made of any number of materials.

As shown in FIGS. 27.1 and 27.2, Cap Pro packaging may recreate a box of Chinese medicine balls with a string and pin 27.1*c*, loop 27.1*b* and three opening edges 27.1*d*. Packaging may be made out of 100% recycled hard cardboard with trunk design and Cap Pro logo printed on 27.1*a*. The back of the box may specify which phone model the case is for, the colors of the case and skin, as well as, the lens-mounting ring adapter model. When the pin and string are removed from the loop holster, the box can be opened. Inside may be the faux leather Cap Pro carry case, the exterior of which features a handle 27.2*c*, zipper 27.2*e* and two belt straps 27.2*g* with corresponding buckles 27.2*d*. The handle of the carry case is fastened to a metal loop 27.2*b*, the other end of which is affixed to a faux leather strap sewn into case 27.2*a*. The zipper slider 27.2*f* is used to open and close the case. The belt straps and buckles are for use with an existing lens case. Most quality lenses have their own cases and these belts will enable a lens case to fasten onto the Cap Pro carry case for convenient transport. The larger Cap Pro lens and lens case may also be able to strap into these belts for easy transport.

When the carry case is opened, as shown in FIGS. 28.1 and 28.2, the Cap Pro case with skin inside may appear first for easy access 28.1*c*. Once phone case is removed, the lens-mounting adapter 28.1*f* may sit in a fitted hole in the carry case 28.2*b*. At the base of this fitted hole 28.2*c* may be the three tripod logo shoes 28.1*g*, a 4-in. charging cord with USB to any internal electrical port option 28.1*h* and a lens wipe. The neck strap 28.1*i*, tripod for charging dock purposes 28.2*d*, and remote inside of the remote case 28.1*e* are other items that may be included in the carry case. The interior padding 28.2*a* may rise up for the phone case to sit on, without making contact with components below.

Two Cap Pro tripod adapters are designed for use with existing camera tripods an operator may already own. Most consumer cameras have ¼ in.-20 UNC thread screw inserts, meaning the tripod screw has a width of ¼ inch and has 20 UNC threads per inch. As a result, there is a tripod adapter with a ¼ in-20 UNC thread screw insert at the base and a Cap Pro thread screw at the top. As with other accessories, as shown in FIGS. 29.1 and 29.2, a female bracket 29.2*a* may accompany each adapter's Cap Pro screw 29.1c, 29.2b. Some professional camera set-ups have ⅜ in.-16 UNC thread screw inserts, to accompany tripod screws with a width of ⅜ inch and 16 UNC threads per inch. The resulting tripod adapter has a ⅜ in-16 UNC thread screw insert at the base 29.1b and a Cap Pro thread screw at the top 29.1c. All tripod adapter screws and inserts are made of metal, while the adapter bodies 29.1a may be made of metal, hard plastic or another analogous material. The result will be the full utilization of camera equipment, in this case intended for tripods and any piece of Cap Pro equipment.

Figure 30:
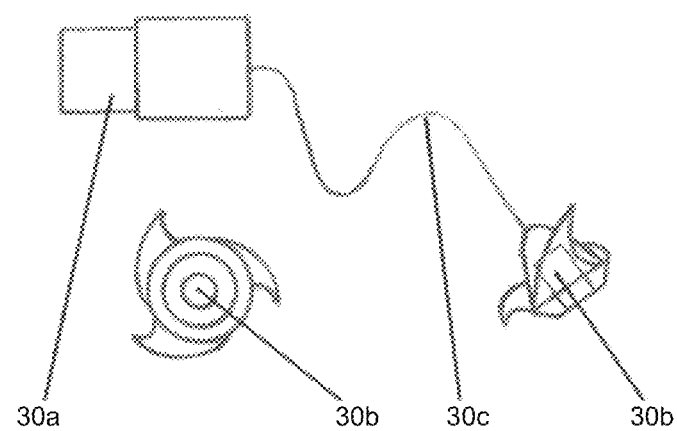
FIG. 30 depicts an exemplary charging cord for an accessory with screw port rechargeable battery connectivity.

As shown in FIG. 30, Cap Pro charging cord for accessories with screw port rechargeable batteries enables operators to charge multiple accessories at the same time, if desired. A male USB port 30a is connected via a 4 in. electronic charging cord 30c to a female screw insert for Cap Pro thread screws 30b equipped with rubber logo for holding onto while inserting accessory. Accessories can be charged using the external electrical port, via the Cap Pro's charging dock and battery booster capabilities, or using the Cap Pro accessory charger (similar to an e-cigarette battery charger) when devices are compatible. As mentioned previously, the female insert may have electronic sensors that make contact with corresponding sensors on the accessory screws in order for charge to pass from one mechanism to another. The charging cord could be plugged into a vehicle's USB port or any wall socket charger with USB port.

The Cap Pro vehicle mount (FIGS. 31-33) provides Cap Pro operators multiple options for automobile phone transport in the age of hands free driving laws. The Cap Pro air conditioning vent clip-in mount (FIGS. 31-32) and the Cap Pro cup-holder mount (FIG. 33) being two distinct possibilities. In both iterations, the Cap Pro mounting case may be utilized as a holster for the phone. As with other Cap Pro products, the exterior architecture of the mounting case will be able to accommodate the thickness and shape of any cell phone and therefore, different mounting cases will exist for any cell phone models available. Simple electronic wiring will connect the featured components of the case.

As shown in FIGS. 31.1-32.2, the Cap Pro mounting case's external 32.1e and internal 31.2e, 32.1h electrical ports, connected via internal wiring, enable charging dock capabilities for the vehicle mounting case. For operators who charge their phone in their vehicles, simply plug phone's charging cord into mounting case. Auxiliary (AUX) ports allow for easy audio cord connection to the case and by extension cell phone. Internally, the auxiliary mechanism will be no different than an AUX cord extender, whereby the female input extends straight up through the case to the male output. In the case of the iPhone 7 and 7 Plus' exterior architecture, the AUX port has been removed entirely. Therefore, audio signal is sent from the phone to the lightning port, which is then sent through the internal electrical port on the mounting case. The lightning internal electrical connects via wiring to the AUX external port, rather than the aforementioned AUX cord extender wiring mechanism. The resulting mounting cases for iPhone 7 and 7 Plus may have exterior lightning and AUX ports, however, the only interior port may only be lightning. It should be appreciated that any features applicable to the Cap Pro case could be utilized on the mounting case. This includes but is not limited to the incorporation of an internal hard drive on the mount that could be accessed through the phone application. Operators would thus be able to play music stored on the internal hard drive while in the car. Additionally, a rechargeable battery may be incorporated to power said drive, both of which may require additional internal wiring.

Any internal hardware additions may require expansion of the physical size of the case itself. Such modifications to the size and weight may require repositioning of exterior case features (e.g., NC vent clips or screw insertion points) to accommodate for changes in weight distribution.

The mounting case exterior also features two screw insertion points 31.1d, 31.2d, 32.1a, 32.1c, 32.2a that function like any other Cap Pro insertion point and will have the same UNC threads. Pertaining to the mounting case, these screw insertion points serve two purposes; recharging accessories and attaching to the cup holder mount. In the former case, recharging capabilities, additional wiring may be required to accommodate such a feature. Specifically, wiring to connect the individual screw insertion point's electrical sensors and the exterior electrical port. The resulting charging ports for accessories require vehicle battery connection. As it relates to the cup-holder mount (see FIG. 33), both screw insertion points attach to the cup-holder mounting screw (see FIG. 33 at 33d). When insertion point 31.1d is used, the phone will be held in place horizontally. Conversely, when insert 31.2d is screwed into mounting screw, the phone will be fixed in a vertical orientation. Similar to the Cap Pro and Cap Pro HD, perforations exist on the mounting case exterior that may allow for speaker access. These holes may extend through the case in order to accommodate speaker use while in vehicle.

In accordance with an embodiment of the present invention, a cell phone with Cap Pro skin on slides perfectly into the Cap Pro mounting case and plugs into internal electrical port(s). In accordance with another embodiment of the present invention, a cell phone without the use of a skin slides perfectly into the Cap Pro mounting case and plugs directly into the internal electrical port(s). In both embodiments, the phone plugs into internal electrical 31.2e, 32.1h and AUX ports 31.2b, 32.1i, when applicable. When connected to a power source via vehicle's USB port or 12V socket and the phone's charging cord (lightning, micro USB, USB-C, etc.), mounting case acts as a charging dock. In line with a central theme of all Cap Pro products, the AUX port inclusion allows for the utilization of existing equipment. Many vehicles have Bluetooth integration of the stereo system that people use for music purposes, however, some operators use an AUX cord to plug directly into their phone for listening. The mounting case architecture allows operators to plug their AUX cord into the case, rather than the phone itself. Operators using a Bluetooth connection for music in their vehicle could simply ignore the AUX port entirely. The inclusion of AUX ports could be applied to any Cap Pro, Cap Pro HD architecture, incorporating the same male AUX port 31.2b inside the case (except iPhone 7/7 Plus) and an exterior female AUX port 32.1b for easy headphone plug-in. Internal wiring may be required to connect the male and female AUX ports, or in the case of iPhone 7/7 Plus wiring from the exterior female AUX port to the internal electrical port.

In accordance with an embodiment of the present invention, the Cap Pro logo screw may again be used to fasten phone in place. The logo screw 31.1b, 32.1d for mounting case may operate in the same manner as described previously (see, e.g., FIG. 5.1 at 5.1b, FIG. 5.2 at 5.2b, FIG. 6.2 at 6.2h, FIG. 9.1 at 9.1b, FIG. 9.2 9.2c). As shown in FIG. 2.1, when skin is utilized, the circular metal pad 31.2c would fit into skin at 2.1b. Skin hole 2.1a would fit perfectly into mounting case padding 32.1g, as illustrated in FIG. 15 at 15a, while simultaneously plugging into internal electrical and AUX ports (when AUX port is applicable). When the phone is tightened into place by turning right on the logo screw, skin acts as a bumper that prevents markings on the phone 32.1f. In embodiments whereby skin is eliminated, padding may be added to the inside of the mount and on the metal pad in lieu of a logo screw. The present invention is not limited to use of the logo screw, nor skin, and can utilize any fastening mechanism that prevents phone from moving around while inside the mounting case.

The exterior features of the Cap Pro A/C mount include screws, lock nuts, washers, and spring clamps. The number of clamps is not restricted to the four clamps used in the following example and could be increased to include any number of clamping mechanisms. The four screws with flat points 31.2a first fit through four dock washers 31.2f, then the corresponding holes in the mounting case and finally through elongated openings in the L-shaped metal, or L-bracket 31.1c, 32.2c on the back of case. Similar to the metal pad used for logo screw, the four dock washers and corresponding screws will ideally be one piece of metal welded together. The four dock washers internally flush with flat head of screw and the case itself, attach to the four lock nuts 31.1a, 32.2d and tighten the L-bracket in place on the back of case. This allows for repositioning of L-bracket, and by extension the spring clamps, which provides maximum range of positioning options for the clamps. Many A/C clip-in vehicle mounts exist that are designed to fit horizontal A/C vents and are effectively useless if a vehicle has, for instance, circular A/C vents. Different vehicle manufacturers all utilize varying sizes and shapes of A/C vent slats, which not all phone mounts account for. The aforementioned design would accommodate most A/C vent slats and the mount will work both vertically and horizontally, which again not all mounts allow.

The L-brackets may be made of titanium (other metal, alloy, or analogous material) and feature a hole extending down one leg and a padded tip at the end of the other leg 31.1c, 32.2c. Elongated hole provides an insertion point for the screw and lock nut to fasten metal piece onto case. The elongated shape of the hole allows for variability in the positioning of A/C vent clamps. The use of lock nuts for the mounting case prevents gradual loosening of the nut and clamp mechanism, while still allowing for readjustments and repositioning. The padded end of bracket leg may be fastened onto a spring 32.2e, which connects (in the same manner) to a second piece of titanium (or analogous material) with padded tip 32.2f.

The two pieces of metal with spring 32.2c, 32.2e, 32.2f form a clamp protruding from the back of case, the four of which may be moved and tightened to accommodate most A/C vent slats. To reposition, start by loosening the four lock nuts, then line up clamps with the A/C vent slats, tighten lock nuts and the A/C Mount will now fit into a vehicle's unique vent slats.

The Cap Pro Cup-Holder Mount (see FIG. 33) utilizes the same Cap Pro Mounting Case as the A/C version, however, in this iteration fastening into the vehicle's cup holder. Unscrew the four lock nuts, remove the four clamps and reattach the lock nuts on the mounting case. Save the clamps in order to switch back to the A/C vent mount if desired. Use either screw insertion point 31.1d or 31.2d to attach the mounting case to the cup-holder mount. Once attached, place the mount with case connected into any vehicle cup holder. Lift the cup-holder mount's cap and the spring legs will fasten into position, keeping the mounting case and by extension phone tightly in place. Access to all external case ports and phone features, as well as the horizontal and vertical optionality, increase the adaptability and interaction between phone and vehicle mount.

The cup-holder mount architecture may be comprised of a screw insert and bracketing lid, cap, neck, base, and legs. The number of legs is not restricted to the three legs used in the following example and could be increased to include any number of pegs projecting out from the base and into cup holder. Additionally, the number of internal springs per leg could also be modified to include any number of springs. All components could be made with any number of materials including but not limited to metal, metal alloy, soft rubber, plastic or another analogous material. The screw, spring and neck may be made of metal or similar material.

Figure 33:
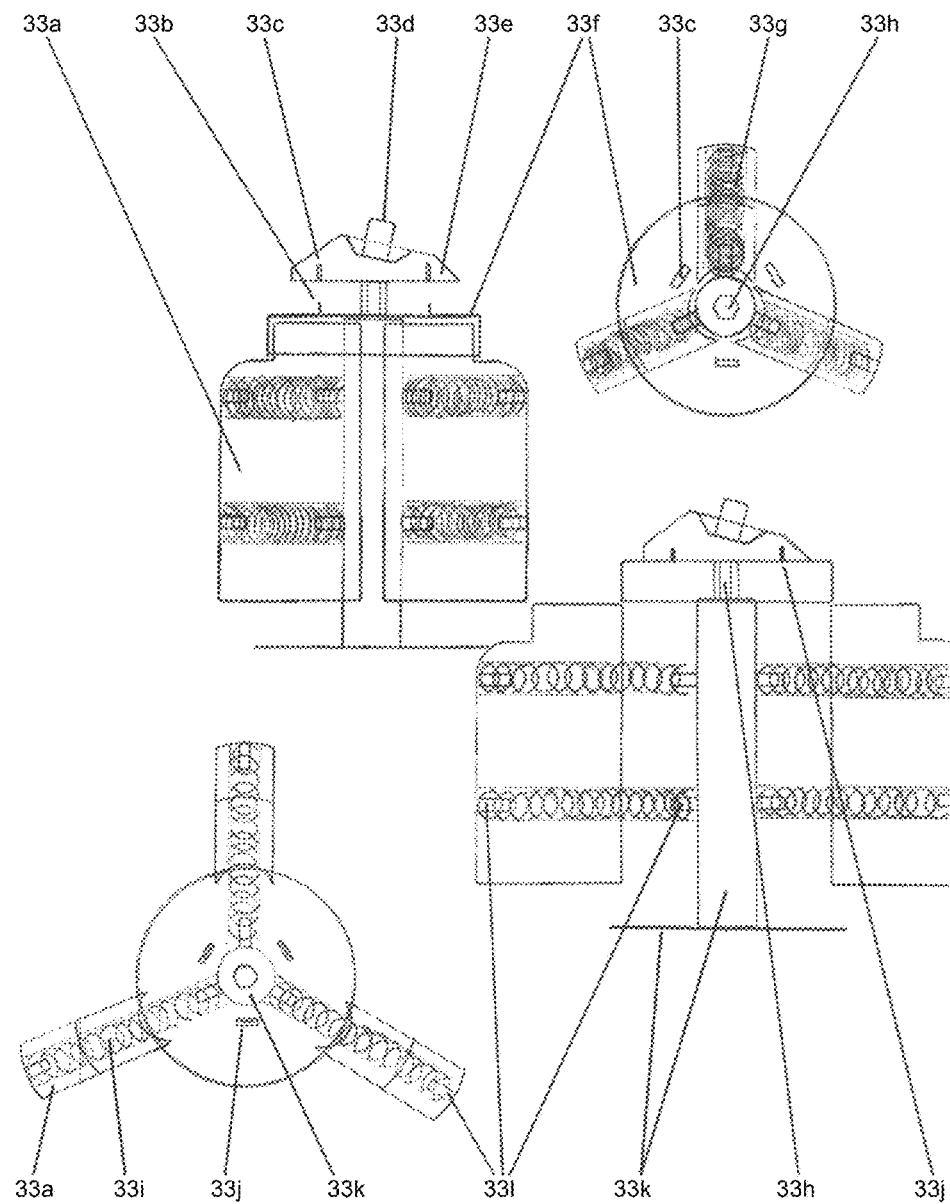
FIG. 33 depicts various views of a Cap Pro case attachment in accordance with one embodiment of the present invention, where the case includes cup-holder, spring-mount architecture.

As shown in FIG. 33, the three legs 33a connect via springs 33g, 33i to the mount base 33k. The fixed positioning of legs relative to base is by virtue of the springs and internal pegs 33l, keeping them in place. Extending upward through the center of the base is the hexagon neck 33h. Design options not limited to a hexagon, rather any shape that the corresponding cap fits around, as well as, slides up and down in a fixed lateral position (e.g., not a circle). The cap 33f has a circular outer rim with a hexagon (or other) hole in the middle fitted to the size and shape of the mount's neck. In one embodiment, the cap features three pins 33b that fit into corresponding holes 33c under the mount's lid 33e. The mount lid may be comprised of the Cap Pro thread screw 33d, the accompanying female bracket and holes underneath to match cap pins.

When in the locked, or closed position (as illustrated in FIG. 33 at 33o the legs are kept in place by the cap and springs will therefore be tightly contracted on the interior 33g. In order to release the mount and fasten into cup holder, the cap is raised vertically up the metal hexagon neck and pins insert into holes on the bottom of the lid (as illustrated in FIG. 33 at 33j). When this occurs, the springs are released and will expand out (as illustrated in FIG. 33 at 33i) thereby forcing legs into the cup holder interior. This open position fixes the mount into the cup holder contours and allows for easy cell phone vehicle mounting. To close the cup-holder mount, pinch in the legs and slide cap down into locked position (as illustrated in FIG. 33 at 33a, 33f).

In an alternate embodiment, hydraulic cylinders extending out from the mount's base may replace the aforementioned spring mechanism. When activated and in place, the hydraulic cylinders project out and into cup holder. In this embodiment, the padded end of the piston rod will be in place of the spring-loaded legs, in terms of making contact with the inside of cup holder and fastening mount in place. Similarly, the number of hydraulic cylinders, piston rods, pistons and barrels would not be restricted to any examples used previously.

While not part of the invention, Capture Professional Photography™ recycling, environmental and faux leather policies are intended to protect the very scenery people love to photograph. The planet provides the most gorgeous backdrops and Capture Professional Photography™ intends to do its part to help conserve that natural beauty. By way of example, operators may be able to send in an old skin or any Cap Pro case for recycling and get 10% off the purchase of a new skin or Cap Pro case and free shipping. Recycled cardboard and other materials will be utilized as often as possible. Additionally, 10% of all profits from blue Cap Pro cases may be donated to ocean conservation and cleanup, while 10% of profits from green Cap Pro cases may be donated to forest preservation efforts. Preferably, all products will use some form of faux or synthetic leather instead of animal to reduce the impact this invention has on the environment and the inhabiting animals.

The Capture Professional (Cap Pro) App allows photos, square photos, burst photos, videos, slow-motion videos and panoramas to be taken. There will be differing photo options for iOS and Android phones dependent upon each camera and operating system's unique features. It is common knowledge in the cell phone industry that in general Apple's iOS is more restrictive in terms of an apps' ability to engage with the operating system. On the other hand, Android operating systems allow for a more open integration of features. As a result, the apps for each phone operating system will differ in some respects. Regardless of operating system, the app and phone hardware preferably operate as part of the case's Central Processing Unit (CPU), instructing the various components within the case. For instance, in a heat prevention and battery preservation mechanism, the app software may instruct the case to power down all functions not currently being utilized. As the CPU, the app requires software for the utilization of various features the Cap Pro cases are equipped with.

Various App Settings may include, but are not limited to, managing photo storage options, turning individual shutter releases on and off, change different charging preferences for Cap Pro's built in rechargeable battery, automatically turn on HDR when app opens, turning the flash on and off, auto-unlock features that can be modified at operator's discretion, options for location services and silencing phone while using the camera mode.

Figure 35:
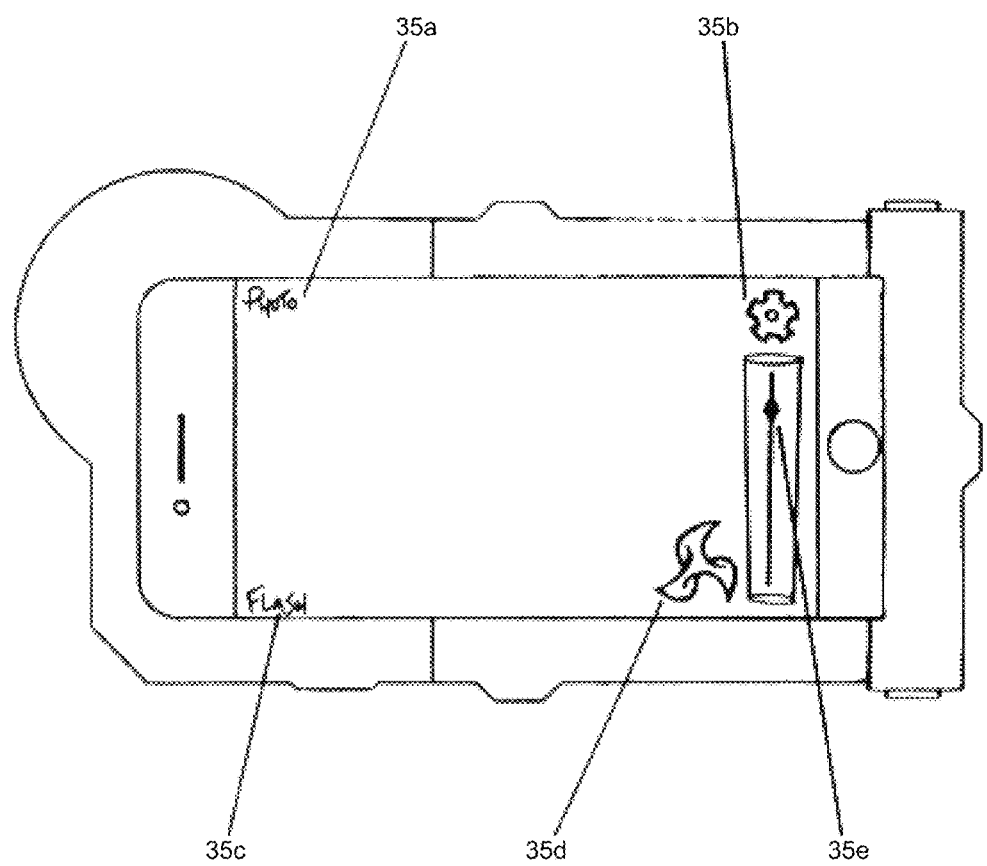
FIG. 35 depicts an exemplary screen shot of a Cap Pro application providing camera features (e.g., image capture, etc.) for a right-handed user.
Figure 36:
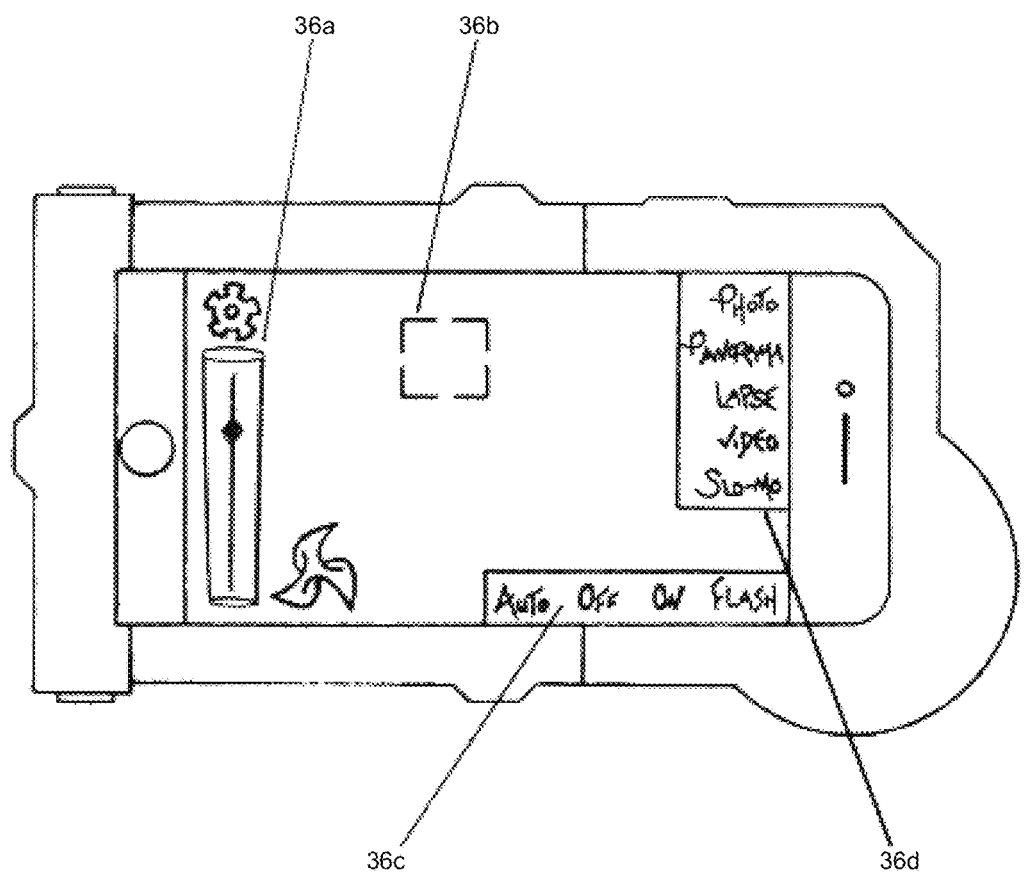
FIG. 36 depicts an exemplary screen shot of a Cap Pro application providing camera feature (e.g., image capture, etc.) for a left-handed user.

When right-handed operators are in the App camera mode (FIG. 35), various buttons and features may be accessible via touch screen. Alternatively, for left-handed operators (FIG. 36) the same touch screen buttons are flipped for ease of use (see, e.g., FIG. 36 at 36a), based upon the phone's horizontal orientation. In camera mode, when 'photo' (FIG. 35a) is pressed a vertical drop down menu appears (see, e.g., FIG. 36 at 36d) with different photo and video options. Simply tap photo, panorama, lapse, video, slow-motion, square photo, or other (fisheye, wide-angle, etc.). When selected, drop down menu disappears and current selection remains displayed. The 'flash' button (FIG. 35 at 35c) also has an options menu (FIG. 36 at 36c) that appears and disappears once selection is made. The Cap Pro logo (FIG. 35 at 35d) acts as a touch screen shutter release. The lens icon (FIG. 35 at 35e) may feature a touch screen sliding mechanism. When the diamond is adjusted along the slider, internal motor moves the focusing ring inside the lens in order to focus from the phone screen. The settings button (FIG. 35 at 35b) has a link to the App's internal settings, whereby various photo options are modifiable. In addition to the focusing of the Cap Pro Lens, a 'tap screen to focus' feature (FIG. 36 at 36b) isolates an object within the zoomed in image for the phone's camera to focus upon. This feature would be identical to the phone's own built-in 'tap to focus' mechanism.

Figure 37:
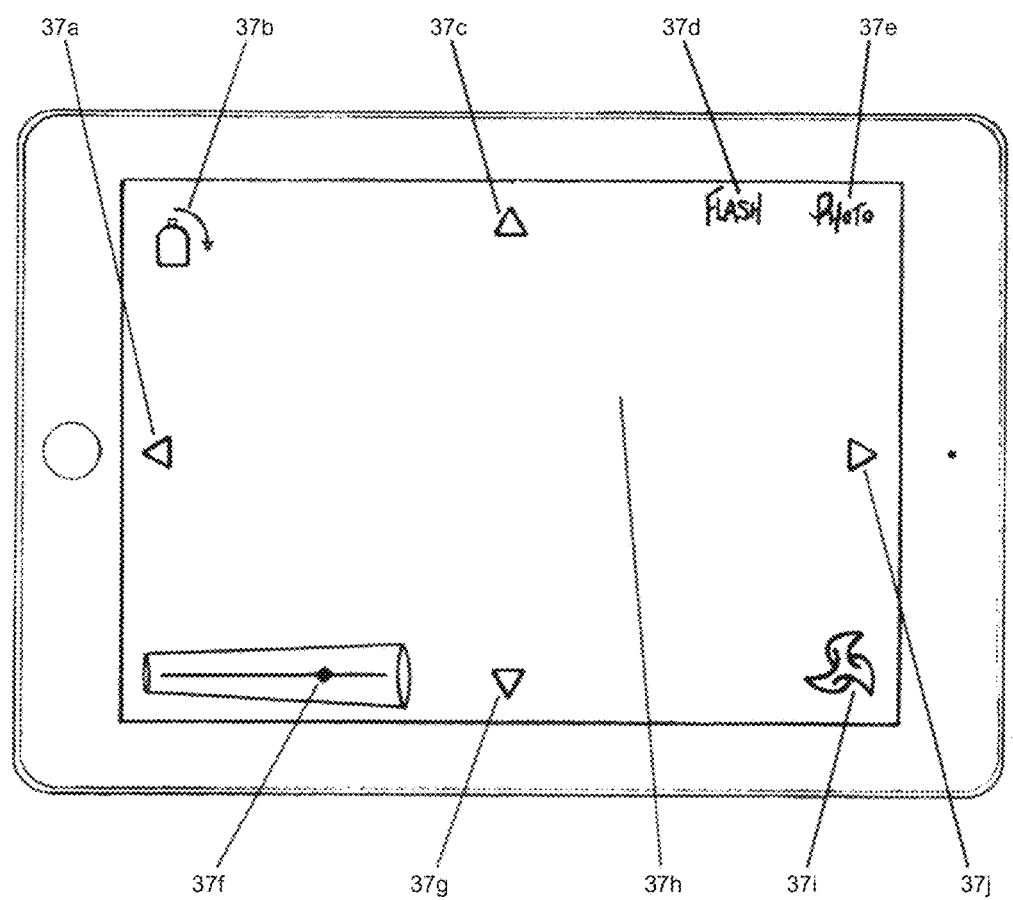
FIG. 37 depicts an exemplary screen shot of a Cap Pro application providing remote controls (e.g., tripod pivot, lens focus, etc.)

As shown in FIG. 37, the App can connect an additional device (such as another phone, iPad™, Samsung™ or Google™ tablet, etc.) through the Wi-Fi network created by the case. Similar to the Go Pro™ App, the Wi-Fi access point created by the Cap Pro enables communication with this third device, which can then control various functions. The same photo options 37e, flash options 37d, lens-focusing slider 37f, shutter release 37i and settings button are accessible via the third device. Additionally, the 'tap screen to focus' 37h may be controlled via the app and the separate device. Relevant applications for this concept include but are not limited to moving the Bluetooth pivot, focusing the Bluetooth lens, taking and managing photo storage while within Bluetooth and Wi-Fi range. As it pertains to moving the Bluetooth pivot for tripod, two arrows 37a, 37j may be used to adjust positioning of camera to the left and right when oriented vertically. The pivot icon 37b when pressed, transitions the phone from vertical to horizontal orientation, and vice versa. Additional app software may allow for programming that moves the phone orientation to vertical when Panorama is selected. When horizontally positioned, two additional buttons 37c, 37g move the camera up and down in the environment, while the left and right arrows maintain their function of moving the camera horizontally.

App signaling to control pivot motors, and thus, positioning of the phone's camera may be sent to the Bluetooth component within the pivot architecture. The case's Wi-Fi access point could transmit the Bluetooth signal to the pivot for example. Conversely, the Wi-Fi and Bluetooth connections can operate independently whereby the Bluetooth gadgets are connected via additional device and signals are then sent separately, when within range. As a result, operators are able to move the Cap Pro pivot, focus the Cap Pro lens, tap screen on object of focus, and take a photo on the phone, all controlled by the third device. With this additional device connected, other interesting features can be utilized such as Photo Booth Mode, communication between devices (via Airdrop or similar mechanism programmed into app) and others. In embodiments where the phone is hardwired while inside the case, via internal electrical port, the Wi-Fi signal created by the case may not be needed and that function can turn off to save battery, unless connected to a third device. This will again rely on CPU programming code to instruct various features to shut down at certain points during case usage.

Easily connect Cap Pro case to your TV via the high-speed mini-HDMI port and show your photos on the big screen. When case is hardwired to TV through HDMI, the phone app acts as a remote control for navigating to different storage locations and for viewing photos. Using the app's built in connectivity to TV devices or existing phone features (such as AirPlay Mirroring), connect to an Apple TV™, Google Chromecast™ or any other internet-streaming device. In order to wirelessly connect to a TV, select the case's Wi-Fi access point in phone settings, open the app and display photos from phone or SD card via a streaming device.

Auto-unlock features include double tapping any shutter release to manually engage the following steps, unlock phone→open app→turn on HDR→queue up the photo experience. Auto-unlock features could all be modified from within the app per operator's discretion and allow for auto-unlocking via connected Bluetooth remotes and case shutter releases. Again, as it pertains to differing operating systems, there may exist variability in terms of permitting an app to access a phone's security features. For instance, an operator may enter their phone's passcode into the Cap Pro App. In which case, pressing a shutter release or Bluetooth remote button would automatically unlock said phone, when connected to case and/or to wireless remotes. As it relates to different operating systems, some may allow such a feature to interact with the phone's security software while another may not. The resulting apps may again have slightly different features dictated by the operating system itself. Furthermore, auto-unlock features automatically turn off when the case and phone are no longer connected physically or when Bluetooth devices are wirelessly disconnected.

The app may have various settings for using case's battery to recharge phone and accessories. Settings include but are not limited to, charging phone once it drops below 25% battery life, charging screw compatible Bluetooth remotes when connected to case and below 25%, and turning off all case features while using camera to conserve battery. While being used as a charging dock, various settings may exist to control charger priorities, such as, what devices charge first when dock set-up is enabled. The percentage values used are for example purposes, demonstrating that the app can control various aspects of the case's battery usage. Values used could be modified to instruct the internal battery to switch on and send power to different components at any battery status level. The turning off of features not in use will also serve the purpose of reducing internal heat of case. These features remain dormant until the app software signals for said features to turn on. If the battery and internal hard drive were constantly running in the background, the functioning of internal mechanisms would cause the temperature to rise internally while also draining the battery unnecessarily. In accordance with embodiments involving an internal thermometer, hardware and software may be required to receive signal from thermometer and send warning notifications concerning the temperature inside the case. A thermometer sensor connects via wiring to the internal electrical port, which then sends information to the phone. Software may be required to determine what course of action to take dependent upon what information is received from temperature gauge.

Using iCloud™, Airdrop™, Dropbox™, Google Drive™ and similar sharing or cloud storage technologies from within the phone, photos may be stored, backed up, shared or pushed to other devices. In one such instance, the phone's internal capabilities act as the storage device mechanism, particularly relating to cloud storage options. With cloud storage embroiled in controversy over issues of ownership and privacy, there still exists a need and interest in having a physical backup of data. The app may transfer and backup photos to micro SD card or built in hard drive, to provide an alternative to cloud storage. While the digital age has provided operators with a multitude of online file storage options, there are operators preferring instead to store photos locally on SD cards or hard drives. As such, options are provided to allow for maximum flexibility in terms of storing and transferring photos. The versatility allows for multiple storage destinations, backing photos up on a computer, SD card, internal hard drive, cloud, as well as, the phone itself.

Figure 38:
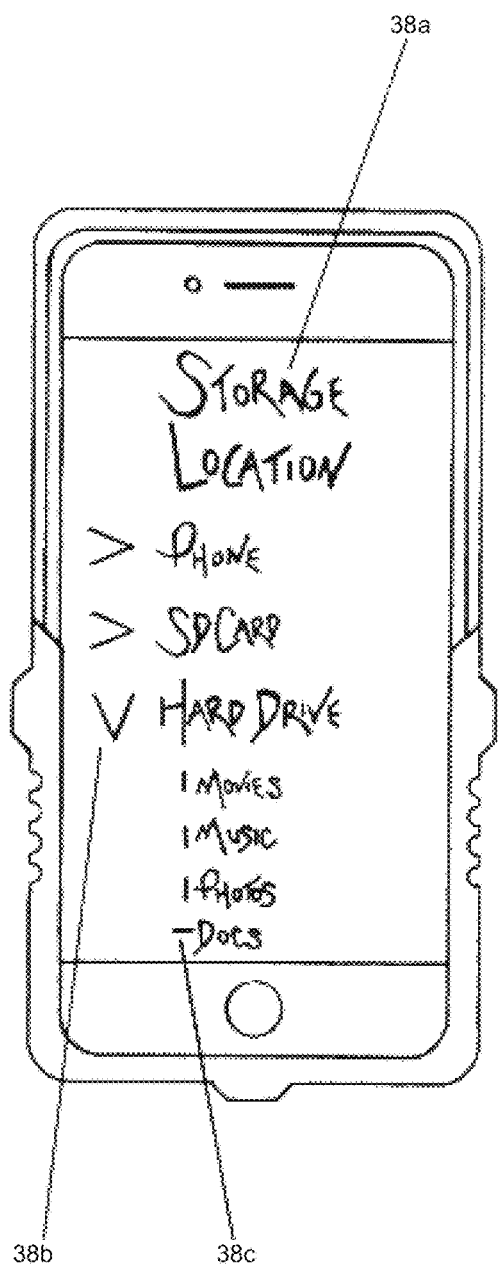
FIG. 38 depicts an exemplary screen shot of a Cap Pro application providing accessibility to content from various storage locations and file types.

As it pertains to the Cap Pro cases, app software may provide access to, organization and connectivity of files stored on the SD Card and the HD case's internal hard drive. As shown in FIG. 38, storage location 38a for Cap Pro photos can be modified and accessed from the app. Hard drive storage is not exclusive to photos and would be able to accommodate any file type. By pressing the arrow 38b or the word 'hard drive' itself, a drop down list appears with the various file types, categories or organized folders. These folders may be opened by pressing the dash 38c or by pressing on the folder's name. The app therefore needs to enable access to, management of, as well as, the transferring of files stored on the hard drive. Additionally, password protection of files is an important feature that can be turned on or off as per operator discretion. Software for the HD/S Cases incorporates preferences for photo storage destination, settings that are modifiable anytime within the app. For instance, operator may be able to instruct app to store photos on the phone, on the case's internal hard drive, on the SD card, or using any cloud storage service. Operators would be able to display photos from phone, SD card or internal hard drive via connection to a streaming device or TV. Software for cases without hard drives also allows for storage destination preferences to be changed, although the hard drive option will not exist in this instance. Additionally, battery usage software may be applicable to the HD/S cases, whereby the app instructs the internal hard drive to power down whenever not in use. Being able to access and play movies or music off of the hard drive may require connection to a video or audio player. The app may connect to a video or music software program already incorporated into the phone, or it may have corresponding features built-in to the app programming code.

Figure 34:
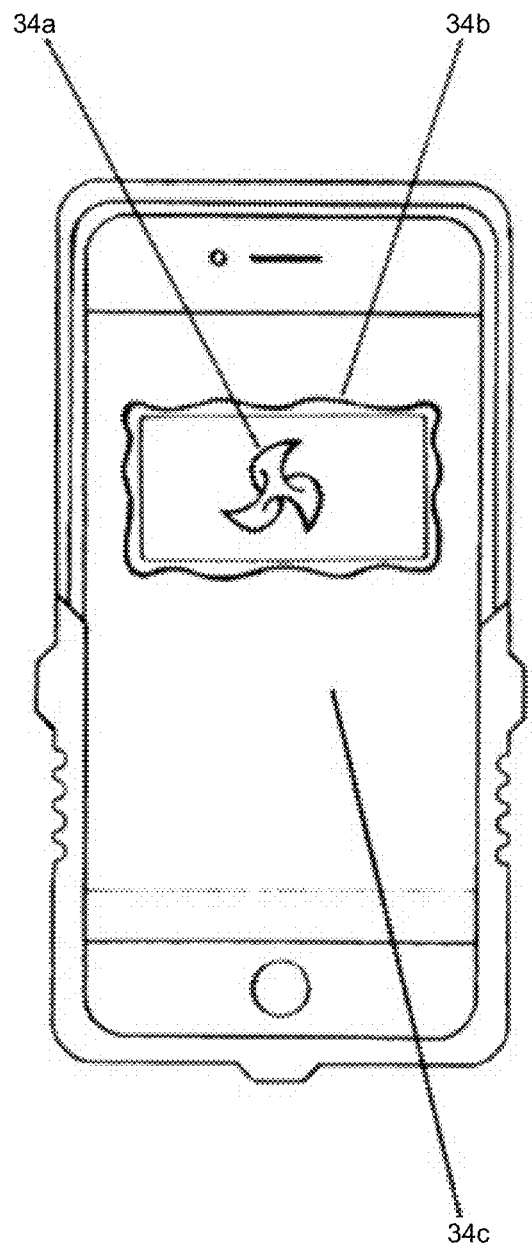
FIG. 34 depicts an exemplary screen shot of a Cap Pro application providing photo-sharing features.

The app may also provide a method and location for sharing photos with friends or posting them publicly. A gallery of Cap Pro photos submitted by operators with various reaction-emoji and a comment feature accompany the photo posting capabilities. As shown in FIG. 34, when entering photo share mode, there may be a blank wall 34c (or a living room/bedroom setup) with a frame 34b for a piece of photography to be hung. The photo share feature is viewable both vertically and horizontally on the phone. Various frame options may be available for customization purposes. Tap the Cap Pro logo 34a inside the frame to import your own photography. Operators would be able to take a picture of a wall in their home and show photos as they appear on said wall (if interested in doing so). This would enable operators to paste any piece of furniture (bookshelf, chest, dresser, etc.) onto their custom wall (also available in various color options). Photo share feature can also post photos to Instagram™, Facebook™, Snapchat™ and the like, when linked through the app and requested to do so. In using certain location services, photos can instantly be tagged with location, date, time, etc. and that information can also be added to any online posts (if preferred). Various privacy options allow operators to choose whether their posts are public or shared with friends only. Furthermore, posts may be shared with a select group of friends if desired. With the inclusion of a GPS positioning chip to the case hardware, the app could have a case locator function similar to Find My iPhone. Once more, the inclusion of any additional hardware may involve the expansion of case exterior and internal wiring to accommodate such features.

The app's Tutorial mode may instruct operators on best photo quality methods and optimal order of operations for Cap Pro cases. This concept may be programmed into the app and may be turned on or off. In the event that tutorial mode is on when the app is opened and photo mode selected, a notification may appear instructing operator to 'focus Cap Pro Lens.' Upon completion, it may then instruct operator to 'tap object to focus' followed by 'take photo.' In enabling operators to turn this feature off and on, it may provide novice operators with a better understanding of best photo methods while experienced operators wouldn't require such a feature. Alternatively, there may also be a link within the app that takes operators to a written list of 'Best Photo Practices.' The app's Photo Booth Mode, active when an additional device is connected to the Cap Pro through the app, provides a fun feature that acts as a photo booth set-up, similar to that at a wedding, birthday party or the like. The second device may be used for choosing different backgrounds (e.g., up to 5) and to start a countdown, which leads to a series of 5 photos or video clips being taken. Photos can then be printed from the second device using a wireless printer, provided the printer is within range. When video clip option is chosen, snapshots taken at the beginning of the 5 videos are used for the printed photo experience. Photo booth photos and video clips can be linked together in the same 5 by 1 format (one column with five photos arranged vertically) and posted online through the app. After print and post options are selected, that second device would get passed on to the next group and the cycle would repeat, choose backgrounds→select photo or video clip mode→start countdown→take 5 photos or video clips with a short interval in between→option to print photos→option to post Photo Booth images to the app. The Cap Pro case with phone would be setup and could go untouched for the duration. Post your photo booth photos and video clips to the app, and enter username to tag photos to operator's account. Rather than be confined by size restrictions, the photos appear on a blank gallery wall (or room layout) and when tapped the photos enlarge to fit screen proportional to original photo dimensions and orientation, either horizontal or vertical. With photo booth's 5×1 layout on the gallery wall, tap on the photo print out image and swipe down to scroll through the series of 5 photos or video clips.

The Capture Professional Photography™ website may demonstrate the photo quality enhancement provided by the Cap Pro cases. Additionally, operators are able to purchase and upgrade equipment, view and post photos, as well as, learn about Cap Pro and its policies. Home page layout consists of 5 photos taken with the normal phone camera displayed. Photos appear on the same blank gallery wall that the app features for posting. Under the images it may read, "See what Cap Pro Cases can do for your photo/video library." When the computer's cursor goes over each image, it may enlarge into a bubble with the Cap Pro version of the same photo. One of the circles may have a bubble that plays a video clip, the first segment of which is filmed with the normal phone camera and the second with the Cap Pro case. The videos may be clipped together to play as one continuous video.

The upgrade equipment feature is essential to the purpose of the invention, utilizing equipment a person already has. With that in mind, the upgrade equipment feature tells the operator exactly what they need in order to use any older Cap Pro and/or camera products. With the rapidly evolving cell phone market where upgrades happen quite frequently, buying an entirely new Cap Pro case package would seem less appealing when one was purchased within the last two years. The present invention is intended to last longer than the average person keeps a certain cell phone model. This is where the recycling program and upgrade feature will work together to minimize the financial impact of getting a new cell phone and by extension a new Cap Pro case. All product items will be available individually, which enables someone with a new phone to use most of their old Cap Pro items while purchasing only what they need. As opposed to requiring an entirely new package, this concept would allow someone to return their old skin and case in exchange for 10% off of the exact item(s) they need to utilize their older equipment. In the event that the mounting-ring architecture changes from one model of Cap Pro case to the next, adapters would be made to allow for use of old lenses with the new size mounting fixture. If the Cap Pro thread size were ever to change, adapters would be manufactured to allow for use of older screw inserts, similar to the aforementioned tripod adapters.

The order products online portion of the website is similar to any product website and will be equipped with security features. Security features are for safe entering of credit card information and transmission of purchasing order. Individual emails will be sent confirming the credit card transaction and to notify of order shipment.

The website's gallery of photos submitted by operators allows for posting and sharing of images captured using Cap Pro products. Photos and videos of any size may be accepted and displayed in an art gallery. This gallery and the app gallery will be comprised of the same submitted photos. Connect with Facebook, Instagram and Snapchat friends or make new friends based on photo interests. With some social networks, it can be viewed as odd to send a stranger a friend request. This practice would be encouraged to connect people with similar photography interests. As with cloud storage, various social networks have privacy and ownership issues involving photos submitted by users. At some point in time, Facebook started selling photos to advertising companies that users were posting. In this instance, Facebook was claiming ownership and profiting off of photos they did not produce or create. In line with a central theme of the invention, using semi- and professional camera equipment with a cell phone, the issue of ownership will not be a concern with the Cap Pro app nor website. Operators would be encouraged to share their best photos and there may even be a stamp feature, whereby a signature, or stamp, created by the operator may be placed on any images for protection of ownership. Alternate usernames may be used to increase safety and privacy. The cost of software update requirements could effectively be paid for when purchasing equipment or through the app store and will not come in the form of Cap Pro claiming ownership of operators' work, essentially avoiding the social network plagiarism that exists. In this respect, the Cap Pro photo gallery would be viewed more as an art portfolio sharing mechanism or a photographer's version of Linkedin™, than it would a social network per se.

Tabs on the homepage will link to Shop, Upgrade, Gallery, and an About us section. The upgrade and adaptor information, as well as, recycling and faux leather policies will be explained within the 'About us' tab.

A mobile site version will have the Cap Pro logo followed by 5 tabs; See what Cap Pro can do for your photo library, Shop, Upgrade, Gallery, and About us. Tab 1 would link to 8 photos and 2 videos. As the operator swipes through the photos they will be ordered normal photo 1, Cap Pro photo 1, normal photo 2, Cap Pro photo 2, normal photo 3, Cap Pro photo 3, normal photo 4, Cap Pro photo 4, normal video 1, Cap Pro video 1. The other tabs would link to the same information as the main website displayed in a mobile site version.

The foregoing description of a system and method for using a case and/or skin having various components for improving and/or enhancing a camera (e.g., photographic, video, etc.) feature of a portable electronic device, such as a smartphone, has been presented for the purposes of illustration and description. It is not intended to be exhaustive or to limit the invention to the precise forms disclosed, and many modifications and variations are possible in light of the above teachings. Those skilled in the art will appreciate that there are a number of ways to implement the foregoing features, and that the present invention is not limited to any particular way of implementing these features. The invention is solely defined by the following claims.

What is claimed is:

1. A system for capturing an image of at least one object, comprising:

an assembly comprising a first electronic device substantially surrounded by a case removably affixed on a stand, said stand being configured to support said first electronic device in relation to a surface and including a first motor for moving said first electronic device in relation to said stand, said first electronic device including a camera feature for capturing said image of said at least one object and said case comprising a lens and a second motor for adjusting a focal point of said lens; and a second electronic device comprising:
  at least one transceiver configured to communicate wirelessly with said assembly; and
  a display device for displaying said image of said at least one object, as captured by said first electronic device; and
wherein an application operating on said second electronic device uses said at least one transceiver to communicate with said first motor on said stand and said second motor on said case, said application being interacted with by a user to (i) control operation of said first motor, thereby moving said first electronic device to a position that allows said first electronic device to capture said image of said at least one object, and (ii) control operation of said second motor to focus said lens on said at least one object.

2. The system of claim 1, wherein said stand further includes at least a second transceiver, said at least one transceiver being configured to communicate wirelessly with said second transceiver.

3. The system of claim 1, wherein said first electronic device further includes at least a second transceiver, said at least one transceiver being configured to communicate wirelessly with said second transceiver, and said first electronic device being configured to communicate with said stand via a communication path therebetween.

4. The system of claim 3, wherein said assembly further comprises a connector, said connector being used to affix said first electronic device on said stand and to function as said communicate path therebetween.

5. The system of claim 3, wherein said first electronic device further includes at least a third transceiver and said stand further includes at least a fourth transceiver, said third and fourth transceivers functioning as said communication path therebetween, said communication path therebetween being a wireless communication path.

6. The system of claim 1, wherein said application is further configured to control a shutter on said first electronic device, allowing said first electronic device to capture said image of said at least one object.

7. The system of claim 1, wherein said application is further configured to control a flash feature on at least one of said first electronic device and a case for said first electronic device, said case being affixed to said first electronic device.

8. The system of claim 1, wherein said application is further configured to control at least one focal point of said camera feature by further adjusting a digital zoom.

9. The system of claim 1, wherein said stand comprises a tripod that includes a plurality of adjustable and extendable legs.

10. A method for capturing an image of at least one object, comprising:
  inserting a first electronic device into a case, said smartphone having a first lens that, when inserted into said case, is substantially aligned with a second lens on said case;
  affixing laid first electronic device on a stand, said stand being configured to support said first electronic device in relation to a surface and including a first motor for rotating said first electronic device, said first electronic device including a camera feature for capturing said image of said at least one object;
  opening an application on a second electronic device, said second electronic device including at least a display device and a first transceiver, and said application being used at least in part to display said image of said at least one object on said display device; and
  connecting at least said first transceiver to at least a second transceiver in at least one of said first electronic device and said stand;
  wherein said application is interacted with by a user to operate said first motor to move said first electronic device in relation to said stand to a position where said camera feature can be used to capture said image of said at least one object and a second motor on said case to focus said second lens on said at least one object.

11. The method of claim 10, wherein said stand further includes said second transceiver.

12. The method of claim 10, wherein said first electronic device further includes said second transceiver, said first electronic device being configured to communicate with said stand via a communication path therebetween.

13. The method of claim 12, wherein said step of affixing said first electronic device on said stand further comprises using a connection feature to physically conned said first electronic device on said stand, said connection feature further being used to function as said communication path therebetween.

14. The method of claim 12, further comprising the step of connecting a third transceiver in said first electronic device to a fourth transceiver in said stand, said third and fourth transceivers functioning as said communication path therebetween.

15. The method of claim 10, wherein said application is further configured to control a shutter on said first electronic device, allowing said first electronic device to capture said image of said at least one object.

16. The method of claim 10, wherein said application is further configured to control a flash feature on at least one of said first electronic device and a case for said first electronic device, said case being affixed to said first electronic device.

17. The method of claim 10, wherein said application is further configured to control a focal point of said camera feature by further adjusting a digital zoom.

18. The method of claim 10, wherein said second electronic device is one of a laptop, a tablet, and a smartphone.

19. A system for capturing an image of at least one object, comprising:
  an assembly comprising a first electronic device substantially surrounded by a case, said case being affixed on a stand, said stand being configured to support said first electronic device and including a fit motor for moving said first electronic device in relation to said stand, said first electronic device including a camera feature for capturing said image of said at least one object, and said case comprising a lens and a second motor for adjusting a focal point of said lens; and
  a second electronic device comprising:
    at least one transceiver configured to communicate wirelessly with said assembly; and
    a display device for displaying said image of said at least one object, as captured by said first electronic device; and
  wherein an application operating on said second electronic device uses said at least one transceiver to communicate at least a first command to said first electronic device and at least a second command to said stand, said first command being used to control operation of said second motor to focus said lens on said at least one object, said second command being used to control operation of said first motor, thereby moving said first electronic device to a position to capture said image of said at least one object.

20. The system of claim 19, wherein both of said first and second commands are communicated over said transceiver to one of said first electronic device and said stand, and one of said first and second commands are communicated over a communication path between said first electronic device and said stand.

* * * * *